(12) United States Patent
Nakayama

(10) Patent No.: US 6,952,501 B2
(45) Date of Patent: Oct. 4, 2005

(54) IMAGE PROCESSING APPARATUS, IMAGE ENCODING APPARATUS, AND IMAGE DECODING APPARATUS

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 09/791,545

(22) Filed: Feb. 26, 2001

(65) Prior Publication Data

US 2003/0043907 A1 Mar. 6, 2003

(30) Foreign Application Priority Data

| Feb. 24, 2000 | (JP) | .................................... | 2000-048147 |
| Feb. 24, 2000 | (JP) | .................................... | 2000-048148 |
| Feb. 24, 2000 | (JP) | .................................... | 2000-048149 |
| Jun. 2, 2000 | (JP) | .................................... | 2000-166395 |
| Jun. 15, 2000 | (JP) | .................................... | 2000-180371 |
| Jan. 16, 2001 | (JP) | .................................... | 2001-007822 |
| Jan. 16, 2001 | (JP) | .................................... | 2001-007823 |
| Jan. 16, 2001 | (JP) | .................................... | 2001-007824 |
| Jan. 16, 2001 | (JP) | .................................... | 2001-007825 |

(51) Int. Cl.$^7$ ................................................ G06K 9/36
(52) U.S. Cl. .................................. 382/243; 375/240.08
(58) Field of Search ................................ 382/232–233, 382/238, 243; 375/240, 240.08, 240.16; 710/69

(56) References Cited

U.S. PATENT DOCUMENTS

| 5,581,373 | A | | 12/1996 | Yoshida ...................... 358/476 |
| 5,801,650 | A | | 9/1998 | Nakayama .................... 341/67 |
| 5,818,970 | A | | 10/1998 | Ishikawa et al. ............ 382/248 |
| 5,841,381 | A | | 11/1998 | Nakayama .................... 341/67 |
| 5,986,594 | A | | 11/1999 | Nakayama et al. ......... 341/107 |
| 6,078,694 | A | * | 6/2000 | Takahashi et al. .......... 382/238 |
| 6,092,130 | A | * | 7/2000 | Horiike ....................... 710/69 |
| 6,259,732 | B1 | * | 7/2001 | Lee .............................. 375/240 |
| 6,577,771 | B1 | * | 6/2003 | Okuno et al. ............... 382/243 |
| 6,636,644 | B1 | * | 10/2003 | Itokawa ...................... 382/243 |
| 6,665,340 | B1 | * | 12/2003 | Kimoto ................. 375/240.08 |

* cited by examiner

Primary Examiner—Kanji Patel
(74) Attorney, Agent, or Firm—Fitzpatrick, Cella, Harper & Scinto

(57) ABSTRACT

This invention provides an image processing apparatus for executing padding processing at a high speed. For this purpose, the image processing apparatus of this invention is an image processing apparatus for processing image data on the basis of shape information, which includes a left propagation processing section (121) for propagating, of a plurality of pixel data which construct one-dimensional image data, pixel data specified by shape information to the left, a right propagation processing section (123) for propagating, of the plurality of pixel data which construct the one-dimensional image data, the pixel data specified by the shape information to the right, and a calculator group (131) for calculating the average between an output from the left propagation processing section (121) and an output from the right propagation processing section (123) to generate output pixel data.

69 Claims, 47 Drawing Sheets

FIG. 2A
BINARY SHAPE INFORMATION

| 0 | 1 | 0 | 0 | 1 | 1 | 0 | 0 | 1 | 0 |
|---|---|---|---|---|---|---|---|---|---|

FIG. 2B
INPUT PIXEL DATA

| 0 | 174 | 0 | 0 | 156 | 164 | 0 | 0 | 42 | 0 |
|---|---|---|---|---|---|---|---|---|---|

FIG. 2C
SELECTOR OUTPUT (LEFT PROPAGATION PROCESSING SECTION)

| 174 | 174 | 156 | 156 | 156 | 164 | 42 | 42 | 42 | 42 |
|---|---|---|---|---|---|---|---|---|---|

FIG. 2D
SELECTOR OUTPUT (RIGHT PROPAGATION PROCESSING SECTION)

| 174 | 174 | 174 | 174 | 156 | 164 | 164 | 164 | 42 | 42 |
|---|---|---|---|---|---|---|---|---|---|

FIG. 2E
AVERAGE VALUE OUTPUT

| 174 | 174 | 165 | 165 | 156 | 164 | 103 | 103 | 42 | 42 |
|---|---|---|---|---|---|---|---|---|---|

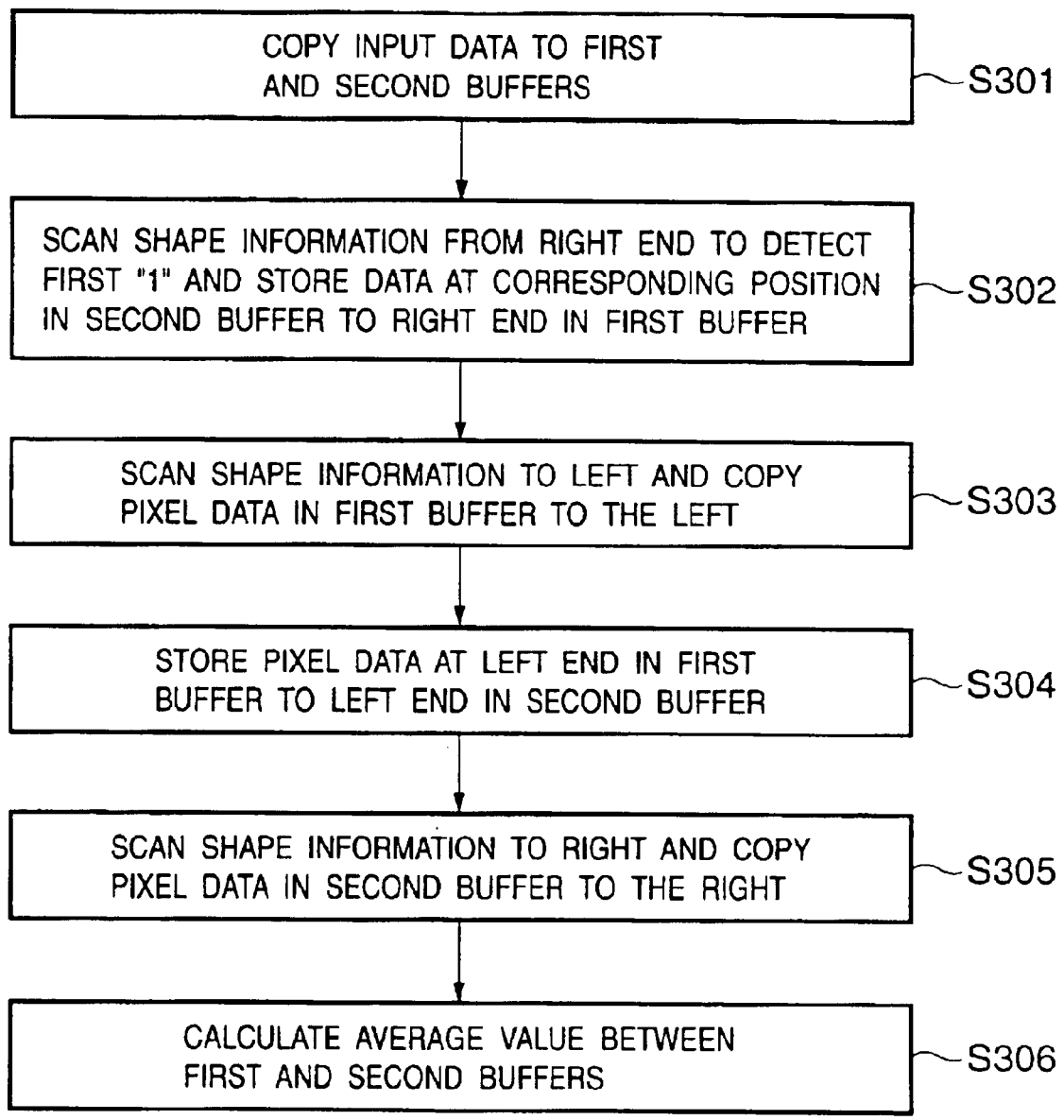

FIG. 10
PRIOR ART

| (a) SHAPE INFORMATION | 0 | 1 | 1 | 0 | 0 | 0 | 1 | 1 | 1 | 0 | 0 | 1 | 0 | 0 | 0 |
|---|---|---|---|---|---|---|---|---|---|---|---|---|---|---|---|
| (b) PIXEL DATA | | 78 | 74 | | | | 56 | 60 | 64 | | | 42 | | | |
| (c) PIXEL DATA AFTER PADDING PROCESSING | 78 | 78 | 74 | 64 | 64 | 64 | 56 | 60 | 64 | 53 | 53 | 42 | 42 | 42 | 42 |

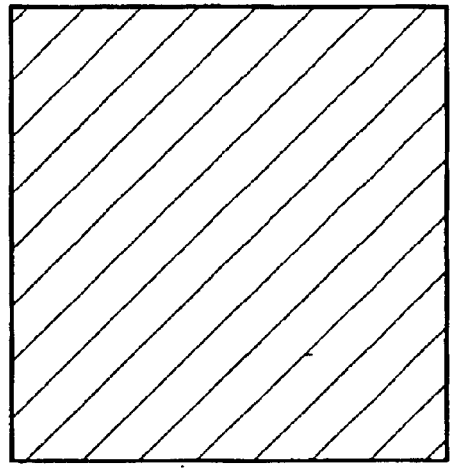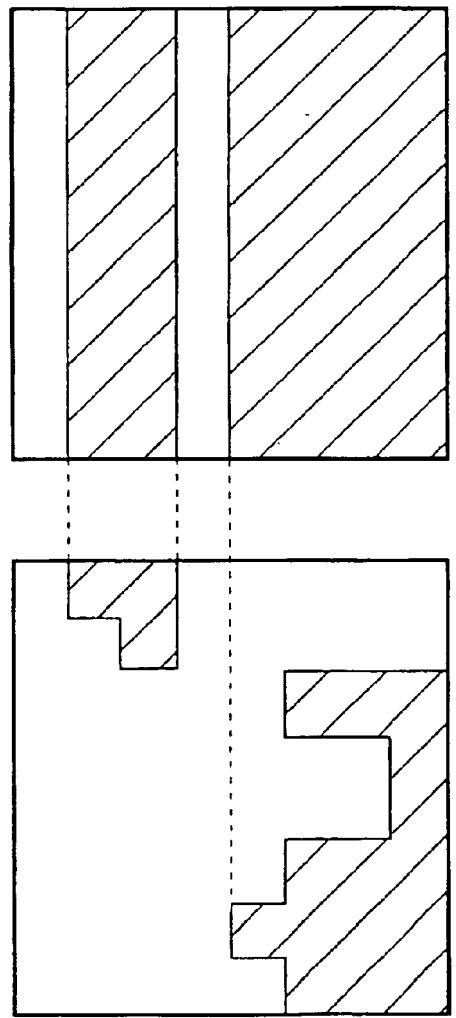
FIG. 11C PRIOR ART — AFTER VERTICAL PADDING PROCESSING
FIG. 11B PRIOR ART — AFTER HORIZONTAL PADDING PROCESSING
FIG. 11A PRIOR ART — BEFORE PADDING PROCESSING

| FIG. 13A BINARY SHAPE INFORMATION | 0 | 1 | 0 | 0 | 1 | 1 | 0 | 0 | 1 | 0 |
|---|---|---|---|---|---|---|---|---|---|---|
| FIG. 13B INPUT PIXEL DATA | | 174 | | | 156 | 164 | | | 42 | |
| FIG. 13C SELECTOR OUTPUT (LEFT PROPAGATION PROCESSING SECTION) | 174 → | 174 | 174 | 156 | 156 | 164 | 42 | 42 | 42 | |
| FIG. 13D SELECTOR OUTPUT (RIGHT PROPAGATION PROCESSING SECTION) | | 174 | 174 | 174 | 156 | 164 | 164 | 164 | 42 | 42 |
| FIG. 13E AVERAGE VALUE OUTPUT | 174 | 174 | 174 | 165 | 156 | 164 | 164 | 103 | 42 | 42 → 42 |

FIG. 32

| SHAPE INFORMATION OF PIXEL TO BE PROCESSED | SUCCEEDING PROXIMAL PIXEL FLAG | PRECEDING PROXIMAL PIXEL FLAG | OUTPUT PIXEL |
|---|---|---|---|
| 1 | — | — | PIXEL TO BE PROCESSED |
| 0 | 1 | 1 | AVERAGE VALUE OF PRECEDING AND SUCCEEDING PROXIMAL PIXELS |
| 0 | 1 | 0 | SUCCEEDING PROXIMAL PIXEL |
| 0 | 0 | 1 | PRECEDING PROXIMAL PIXEL |
| 0 | 0 | 0 | ANY VALUE (PROCESSING IS IMPOSSIBLE) |

FIG. 34

| SHAPE INFORMATION OF PIXEL TO BE PROCESSED | SUCCEEDING PROXIMAL PIXEL FLAG | FIRST PIXEL DESIGNATION SIGNAL | OUTPUT PIXEL |
|---|---|---|---|
| 1 | — | — | PIXEL TO BE PROCESSED |
| 0 | 1 | 1 | SUCCEEDING PROXIMAL PIXEL |
| 0 | 1 | 0 | AVERAGE VALUE (MAY EVENTUALLY BE SUCCEEDING PROXIMAL PIXEL) |
| 0 | 0 | 1 | ANY VALUE (PROCESSING IS IMPOSSIBLE) |
| 0 | 0 | 0 | PRECEDING PROXIMAL PIXEL HELD IN REGISTER 2711 (PROCESSING MAY BE IMPOSSIBLE) |

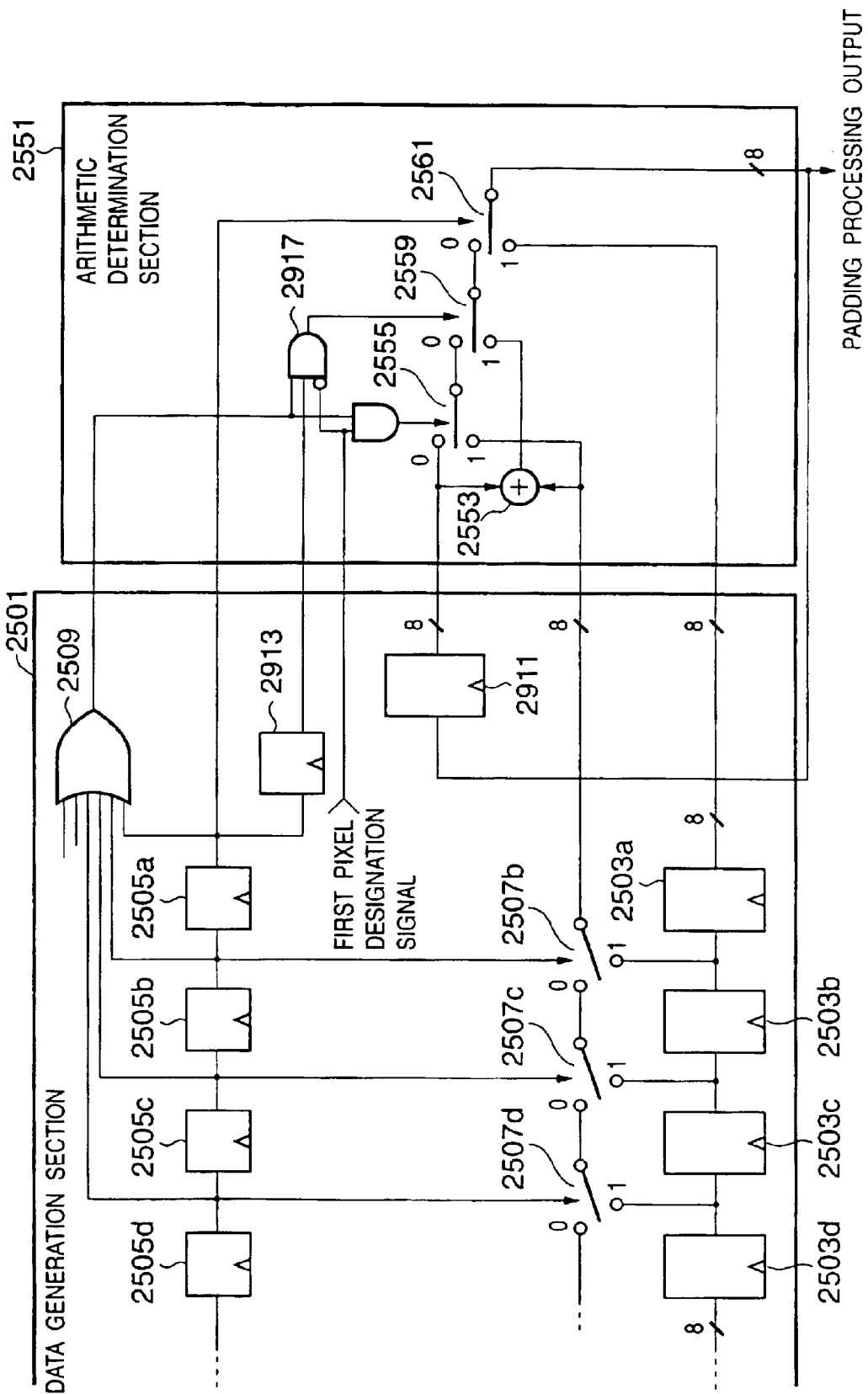

FIG. 36

| SHAPE INFORMATION OF PIXEL TO BE PROCESSED | SUCCEEDING PROXIMAL PIXEL FLAG | FIRST PIXEL DESIGNATION SIGNAL | SHAPE INFORMATION OF IMMEDIATELY PRECEDING PIXEL | OUTPUT PIXEL |
|---|---|---|---|---|
| 1 | — | — | — | PIXEL TO BE PROCESSED |
| 0 | 1 | 1 | — | SUCCEEDING PROXIMAL PIXEL |
| 0 | 1 | 0 | 1 | AVERAGE VALUE OF ADDER OUTPUTS |
| 0 | 1 | 0 | 0 | AVERAGE VALUE HELD IN REGISTER 2911 |
| 0 | 0 | 1 | — | ANY VALUE (PROCESSING IS IMPOSSIBLE) |
| 0 | 0 | 0 | — | PRECEDING PROXIMAL PIXEL HELD IN REGISTER 2911 (PROCESSING MAY BE IMPOSSIBLE) |

FIG. 39

| SHAPE INFORMATION OF FIRST PIXEL TO BE PROCESSED | SHAPE INFORMATION OF SECOND PIXEL TO BE PROCESSED | SUCCEEDING PROXIMAL PIXEL FLAG | PRECEDING PROXIMAL PIXEL FLAG | FIRST OUTPUT PIXEL |
|---|---|---|---|---|
| 1 | — | — | — | FIRST PIXEL TO BE PROCESSED |
| 0 | 0 | 1 | 1 | AVERAGE VALUE OF PRECEDING AND SUCCEEDING PROXIMAL PIXELS |
| 0 | 1 | 1 | 1 | AVERAGE VALUE OF PRECEDING PROXIMAL PIXEL AND SECOND PIXEL TO BE PROCESSED |
| 0 | 0 | 1 | 0 | SUCCEEDING PROXIMAL PIXEL |
| 0 | 1 | 1 | 0 | SECOND PIXEL TO BE PROCESSED |
| 0 | 0 | 0 | 1 | PRECEDING PROXIMAL PIXEL |
| 0 | 1 | 0 | 1 | AVERAGE VALUE OF PRECEDING PROXIMAL PIXEL AND SECOND PIXEL TO BE PROCESSED |
| 0 | 0 | 0 | 0 | ANY VALUE (PROCESSING IS IMPOSSIBLE) |
| 0 | 1 | 0 | 0 | SECOND PIXEL TO BE PROCESSED |

| SHAPE INFORMATION OF FIRST PIXEL TO BE PROCESSED | SHAPE INFORMATION OF SECOND PIXEL TO BE PROCESSED | SUCCEEDING PROXIMAL PIXEL FLAG | PRECEDING PROXIMAL PIXEL FLAG | SECOND OUTPUT PIXEL |
|---|---|---|---|---|
| — | 1 | — | — | SECOND PIXEL TO BE PROCESSED |
| 0 | 0 | 1 | 1 | AVERAGE VALUE OF PRECEDING AND SUCCEEDING PROXIMAL PIXELS |
| 1 | 0 | 1 | 1 | AVERAGE VALUE OF SUCCEEDING PROXIMAL PIXEL AND FIRST PIXEL TO BE PROCESSED |
| 0 | 0 | 1 | 0 | SUCCEEDING PROXIMAL PIXEL |
| 1 | 0 | 1 | 0 | AVERAGE VALUE OF SUCCEEDING PROXIMAL PIXEL AND FIRST PIXEL TO BE PROCESSED |
| 0 | 0 | 0 | 1 | PRECEDING PROXIMAL PIXEL |
| 1 | 0 | 0 | 1 | FIRST PIXEL TO BE PROCESSED |
| 0 | 0 | 0 | 0 | ANY VALUE (PROCESSING IS IMPOSSIBLE) |
| 1 | 0 | 0 | 0 | FIRST PIXEL TO BE PROCESSED |

| | | | | | | | | | |
|---|---|---|---|---|---|---|---|---|---|
| FIG. 42A BINARY SHAPE INFORMATION | 0 | 1 | 0 | 0 | 1 | 1 | 0 | 1 | 0 |
| FIG. 42B INPUT PIXEL DATA | | 174 | | | 156 | 164 | | 42 | |
| FIG. 42C SELECTOR OUTPUT (LEFT PROPAGATION PROCESSING SECTION) | 174 | 174 | 174 | 174 | 156 | 164 | 42 | 42 | 42 |
| FIG. 42D SELECTOR OUTPUT (RIGHT PROPAGATION PROCESSING SECTION) | 174 | 174 | 174 | 156 | 156 | 164 | 164 | 42 | 42 |
| FIG. 42E AVERAGE VALUE AFTER PADDING PROCESSING | 174 | 174 | 174 | 165 | 156 | 164 | 103 | 42 | 42 |

IMAGE PROCESSING APPARATUS, IMAGE ENCODING APPARATUS, AND IMAGE DECODING APPARATUS

FIELD OF THE INVENTION

The present invention relates to an image processing apparatus, image encoding apparatus, and image decoding apparatus which process image data on the basis of attribute data thereof.

BACKGROUND OF THE INVENTION

An image (especially a moving image) has a very large data amount. Hence, compression processing of largely decreasing the data amount is indispensable for storage or transmission of an image. As processing of compressing (encoding) a moving image, international standards such as MPEG-1 or MPEG-2 are already defined. These schemes are applied to only an image in a rectangular region, which is sensed with, e.g., a TV camera.

Images have various characteristic features. There are many images each formed from background and an object to be sensed (object) before the background. Generally, a background image exhibits no large motion but moves as a whole as the camera used for sensing moves, or various components in the background exhibit delicate movement. To the contrary, an object sometimes largely moves. That is, an object and background have different features.

MPEG-4 which is being standardized next to MPEG-1 and MPEG-2 is designed to form an active relationship to an image and allow new expressions by separately treating an object and background, reusing a useful object to increase the productivity of a moving image content, and preparing an environment that allows an image viewer side to manipulate an object.

However, since an object has not a rectangular shape but an arbitrary shape, the compression technique used in the conventional MPEG-1 or MPEG-2 cannot be directly applied.

In compressing a moving image, the data amount is further reduced using correlation between frames. Use of correlation between frames means that in encoding data of the current frame of an object, a strongly correlated region in another frame is referred to, and the difference value between the frames is encoded.

When an object has an arbitrary shape, the object in another frame to be referred to also has an arbitrary shape, and no value is present outside the object, so motion vector information for each block cannot be obtained.

In this case, padding processing is executed for the object of interest to extend it to a rectangular region, and then, a motion vector is searched for in units of blocks.

Padding processing for image data in a two-dimensional range is implemented by sequentially executing one-dimensional padding processing in the horizontal and vertical directions. The one-dimensional padding processing is executed in the following way.

An external region (row or column) sandwiched between a plurality of objects is replaced with the average value of pixel data in the objects at the two ends of that region. Another region outside the objects is replaced with pixel data in the object in contact with the region.

FIGS. 10A to 10C are views showing an example of the padding processing. FIGS. 10A to 10C show binary shape information (attribute data) and pixel data of one row in a block to explain horizontal (lateral) padding processing. Since pixel data in a region outside an object is replaced with another value, the original value is almost insignificant. Hence, pixel data values in regions outside objects are omitted.

FIG. 10A shows binary shape information, and FIG. 10B shows pixel data in object regions. In this example, the number of pixels of one row in a block is 16. The 16 pixels has four regions outside the objects. More specifically, the regions outside the objects are a region formed from one pixel on the left side of a pixel with a pixel value "78", a region formed from four pixels between a pixel with a pixel value "74" and a pixel with a pixel value "56", a region formed from two pixels between a pixel with a pixel value "64" and a pixel with a pixel value "42", and a region formed from three pixels on the right side of the pixel with a pixel value "42".

Since the regions at the two ends are replaced with pixel data in the objects in contact with these regions, the pixel at the left end is replaced with a pixel with a pixel value "78", and the three pixels at the right end are replaced with a pixel with a pixel value "42".

The two remaining regions are sandwiched by pixels in the objects on the left and right sides. Hence, the four pixels on the left side are replaced with a pixel having an average value "65" of the pixel values "74" and "56", and the two pixels on the right side are replaced with a pixel having an average value "53" of the pixel values "64" and "42". Pixel data as shown in FIG. 10C is obtained as a result of padding processing.

Block data is formed from a plurality of row data. When the horizontal padding processing is executed for each row data, pixel data in object regions shown in FIG. 11A are extended to those shown in FIG. 11B. Each hatched portion represents regions in the objects and pixel regions where data are padded by padding processing.

Vertical padding processing is executed next to the horizontal padding processing. The vertical padding processing method is the same as the horizontal padding processing method except that the processing unit changes from a row to a column. After the vertical padding processing, the entire block is filled with significant pixel data, as shown in FIG. 11C.

SUMMARY OF THE INVENTION

The present invention has been made in consideration of the above situation, and has as its object to provide, e.g., an image processing apparatus and method which increase the padding processing speed. It is another object of the present invention to reduce the apparatus scale for the apparatus and method.

To solve the above problem, for example, an image processing apparatus of the present invention has the following arrangement.

An image processing apparatus according to the first aspect of the present invention is an image processing apparatus for processing image data on the basis of attribute data, characterized by comprising first propagation means for propagating, of a plurality of pixel data which construct one-dimensional image data, pixel data specified by the attribute data in a first direction, second propagation means for propagating, of the plurality of pixel data which construct the one-dimensional image data, the pixel data specified by the attribute data in a second direction opposite to the first direction, and arithmetic means for executing arithmetic processing for an output from the first propagation means and an output from the second propagation means to generate a plurality of pixel data which construct image data as a processing result.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A to 2E are views showing processing in the image processing section according to the first embodiment;

FIG. 3 is a flow chart showing processing when the processing according to the first embodiment is implemented by software;

FIG. 10 shows an example of padding process;

FIGS. 11A to 11C shows block date after the horizontal padding processing and the vertical padding processing;

FIGS. 13A to 13E are views showing padding processing;

FIG. 32 is a table showing the relationship between control signals and padding processing outputs in the 18th embodiment;

FIG. 34 is a table showing the relationship between control signals and padding processing outputs in the 19th embodiment;

FIG. 35 is a block diagram showing the circuit arrangement according to the 20th embodiment;

FIG. 36 is a table showing the relationship between control signals and padding processing outputs in the 20th embodiment;

FIG. 39 is a table showing the relationship between control signals and padding processing outputs in the 22nd embodiment;

FIGS. 42A to 42E are views for explaining operation on the padding processing circuit using detailed numerical values;

DETAILED DESCRIPTION OF THE PREFERRED EMBODIMENTS

Preferred embodiments of the present invention will be described below.

[First Embodiment]

In this embodiment, one-dimensional padding processing is executed for data each row of which is formed from 10 pixels. This embodiment can be extended to one-dimensional padding processing for an arbitrary number of pixel data.

Figure 1:
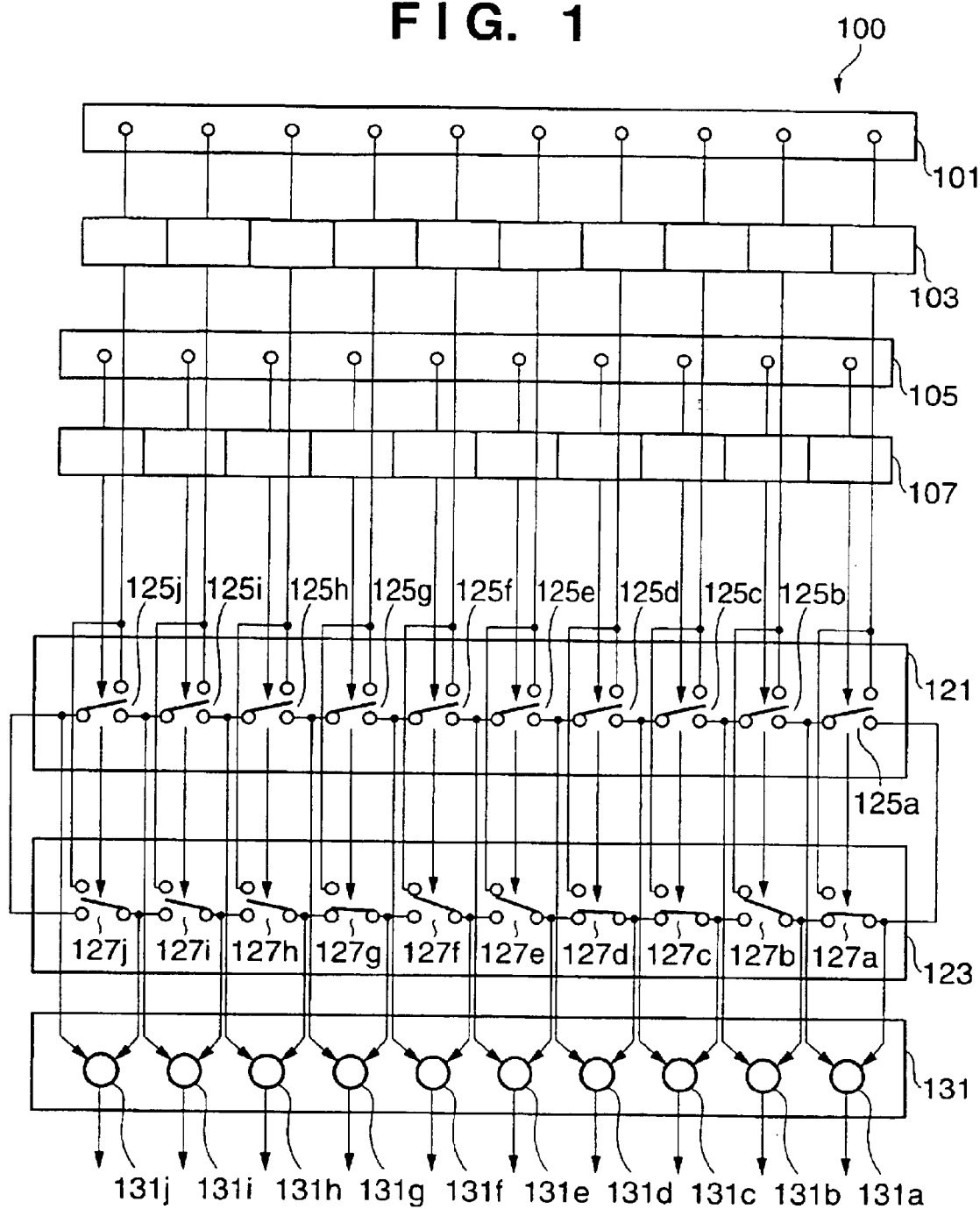
FIG. 1 is a block diagram showing the arrangement of an image processing section according to the first embodiment.

FIG. 1 is a block diagram showing the arrangement of an image processing section according to the first embodiment of the present invention. An image processing section 100 can be suitably used as part of an image processing apparatus such as a computer.

Referring to FIG. 1, a terminal group 101 inputs a plurality of pixel data that construct one-dimensional image data to be subjected to padding processing. A register group 103 holds the plurality of pixel data that construct the one-dimensional image data. A terminal group 105 inputs pieces of shape information (1 bit per pixel) as attribute data, each of which represents whether a pixel related to pixel data of the one-dimensional image data is a pixel in or outside an object. A register group 107 holds the pieces of shape information. A left propagation processing section 121 propagates each pixel data to the left on the basis of corresponding shape information. A right propagation processing section 123 propagates each pixel data to the right on the basis of corresponding shape information. Selectors 125a to 125j constitute the left propagation processing section 121. Selectors 127a to 127j constitute the right propagation processing section 123. A calculator group 131 includes calculators 131a to 131j for calculating the average value between two pixel data.

Ten pixel data to be subjected to padding processing and 10 pieces of binary shape information corresponding to the pixel data are input from the terminal groups 101 and 105 one by one or simultaneously and held by the register groups 103 and 107, respectively. Shape information (binary) "1" represents that the pixel is in an object, and "0" represents that the pixel is outside an object.

The plurality of pixel data held by the register group 103 are input to corresponding selectors in the left propagation processing section 121 and right propagation processing section 123. The pieces of shape information held by the register group 107 are input as control signals for corresponding selectors in the left propagation processing section 121 and right propagation processing section 123.

Each selector selects the pixel data input from the register group 103 when the control signal is "1", and selects the pixel data selected by the selector on the input side when the control signal is "0". Thus, the pixel data propagate such that a pixel in an object is replaced with pixel data in the object.

In the left propagation processing section 121, the pixel data in the objects propagate to the left in FIG. 1. In the right propagation processing section 123, the pixel data in the objects propagate to the right in FIG. 1.

The pixel data selected by each selector is sent to a corresponding calculator in the calculator group 131. Each calculator in the calculator group 131 calculates and outputs the average value of two pixel data supplied from corresponding selectors.

FIGS. 2A to 2E are views showing a detailed example of processing in the image processing section 100 shown in FIG. 1. FIG. 2A shows binary shape information, FIG. 2B shows input pixel data (a pixel outside an object has a value "0" because it can take any value), FIG. 2C shows the output values from selectors in the left propagation processing section 121, FIG. 2D shows the output values from the selectors in the right propagation processing section 123, and FIG. 2E shows the average value outputs from the calculator group 131.

The output value from the selector 125a at the right end of the left propagation processing section 121 is "42" because the output data from the selector 127a at the right end of the right propagation processing section 123 is input to the selector 125a at the right end of the left propagation processing section 121, and this value is selected and output. The output value from the selector 127j at the left end of the right propagation processing section 123 is "174" because the output data from the selector 125j at the left end of the left propagation processing section 121 is input to the selector 127j at the left end of the right propagation processing section 123, and this value is selected and output.

As the output values from the remaining selectors, for a pixel having shape information "1" (in the object), the input pixel data is directly output. For a pixel having shape information "0", a value obtained by propagating the pixel data in the object to the left or right is output. In this way, the image processing section 100 has two selectors for one pixel so that the average value of the outputs from the selectors is calculated by the calculator and output as a result of padding processing.

With this above processing, an external region sandwiched between objects is replaced with the average value of pixel data in the objects on the left and right sides of the region. Another region outside the objects is replaced with pixel data in an object in contact with the region.

The above description is related to a case wherein the hardware scale matches the number of pixels to be processed. However, padding processing can also be executed when the number of pixels is smaller than the hardware scale, i.e., for an arbitrary number of pixels fewer than 10. This is implemented by fixing shape information corresponding to a terminal having no pixel input to "0".

Processing of implementing the above processing by software will be described next. FIG. 3 is a flow chart showing the flow of padding processing by software.

In step S301, input image data is stored in first and second buffers. In step S302, shape information is scanned from the right end to the left, and pixel data in the second buffer at the same position as that of information "1" detected for the first time is stored as pixel data at the right end of the first buffer. In step S303, shape information "0" is detected by scanning it from the right end to the left, and pixel data in the first buffer at the same position as that of the closest shape information "1" on the right side of the information "0" is copied to the first buffer as pixel data at the same position as that of the information "0" (i.e., the pixel data is propagated to the left). In step S304, the pixel data at the left end of the first buffer is copied to the left end of the second buffer. In step S305, shape information "0" is detected by scanning it from the left end to the right, and pixel data in the second buffer at the same position as that of the closest shape information "1" on the left side of the information "0" is copied to the second buffer as pixel data at the same position as that of the information "0" (i.e., the pixel data is propagated to the right). In step S306, the average value of corresponding pixel data in the first and second buffers is calculated.

The first buffer corresponds to the left propagation processing section 121, and the second buffer corresponds to the right propagation processing section 123.

In step S301, initial values before propagation of image data are stored in the first and second buffers.

It is inefficient to completely trace hardware processing by software processing. For this reason, in software processing shown in FIG. 3, step S302 is executed instead of inputting the output data at the right end of the right propagation processing section to the left propagation processing section. In step S302, pixel data which should be output data at the right end of the right propagation processing section is detected first, and the detected pixel data is stored as the pixel data at the right end of the first buffer, which corresponds to the input to the left propagation processing section.

Step S303 directly traces the operation of the left propagation processing section 121. Step S304 corresponds to processing of inputting the output data at the left end of the left propagation processing section to the right propagation processing section 123. Step S305 traces the right propagation processing section 123, and step S306 traces the calculator group 131.

[Second Embodiment]

The first embodiment does not suppose a case wherein all the 10 pixels are outside the objects because if all the 10 pixels are outside the objects, padding processing is unnecessary.

However, in simple pipeline processing, all pixel data must be processed by a padding processing circuit independently of the necessity of padding processing. In such a case, the first embodiment is not preferable in terms of operation because when all the 10 pixels are outside the objects, a closed loop is formed by all selectors in the left and right propagation processing sections.

In the second embodiment, an improvement is done not to form any closed loop when all the 10 pixels are outside the objects. More specifically, in this embodiment, an input section for inputting the outputs from a left propagation processing section 121 to a right propagation processing section 123 has a mask circuit for masking the all the outputs from the right propagation processing section 123 to zero. The masking condition is that all pieces of shape information are "0".

Figure 4:
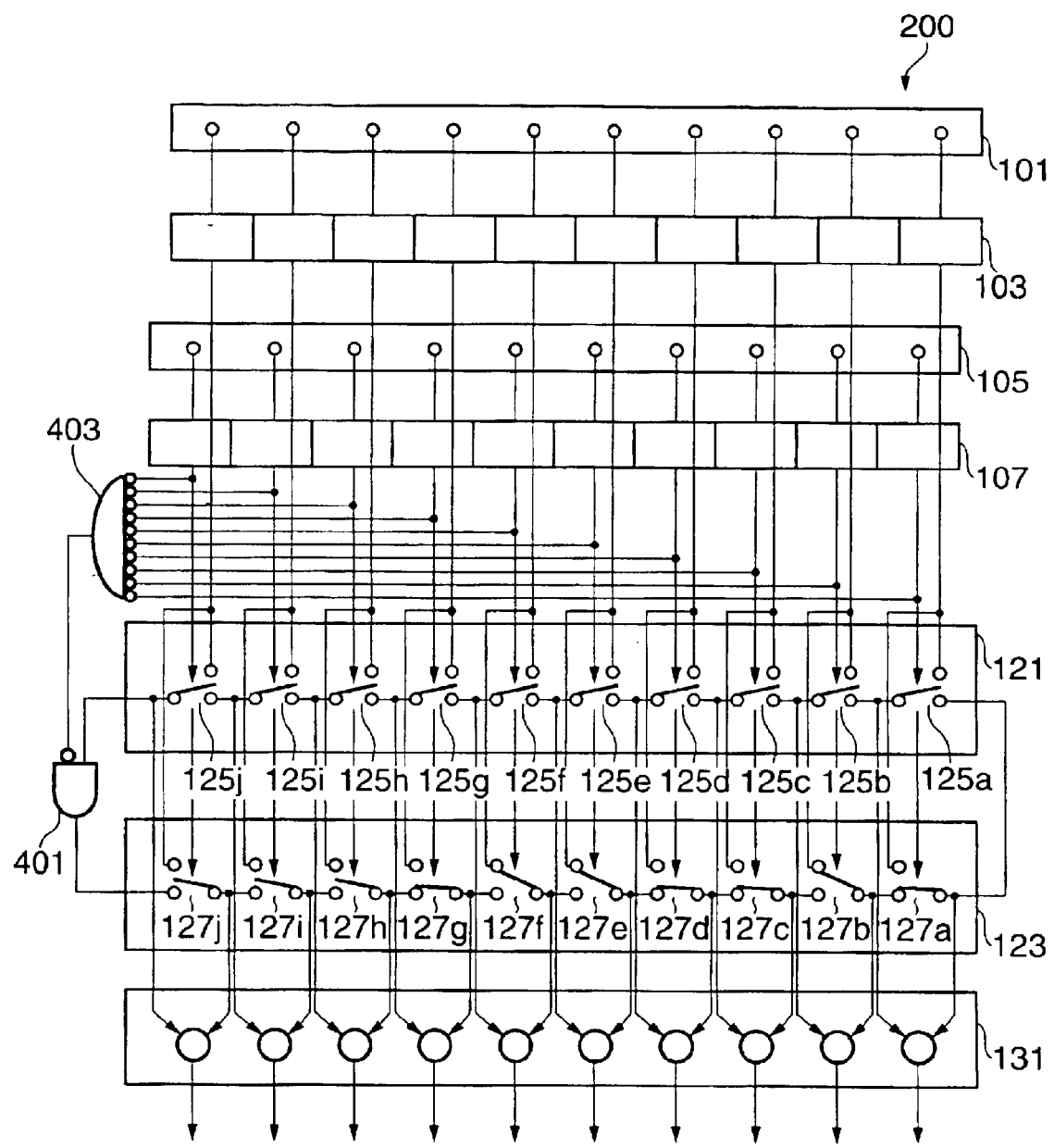
FIG. 4 is a block diagram showing the arrangement of an image processing section according to the second embodiment.

FIG. 4 is a block diagram showing the arrangement of an image processing section according to the second embodiment of the present invention. An image processing section 200 can be suitably used as part of an image processing apparatus such as a computer.

Referring to FIG. 4, reference numeral 401 denotes a mask circuit; and 403, a NOR circuit for detecting that all pieces of shape information are "0". The remaining components are the same as in the first embodiment.

The mask circuit may also be arranged in the input section for inputting the outputs from the right propagation processing section 123 to the left propagation processing section 121 or may be arranged only in that input section.

In this embodiment as well, padding processing can be executed even for an arbitrary number of pixels fewer than 10, as in the first embodiment.

For pixel data at the left and right ends in FIG. 4, the average value between two pixels is insignificant. This is because two pixel data that sandwich the pixel data at each end cannot be present.

Hence, calculators at the two ends of a calculator group 131 are unnecessary. The right-end pixel data after padding processing can be output from a selector 127*a*, and the left-end pixel data can be output from a selector 125*j*.

Since the output from a selector 125*a* always has the same value as that of the output from the selector 127*a* (the control signal (i.e., when corresponding shape information) for the selector is "0", the value of pixel data propagated to the right is output, and when the control signal is "1", the value of the original pixel data is output), the selector 125*a* can be omitted. A selector 127*j* can also be omitted due to the same reason as described above.

Figure 7:
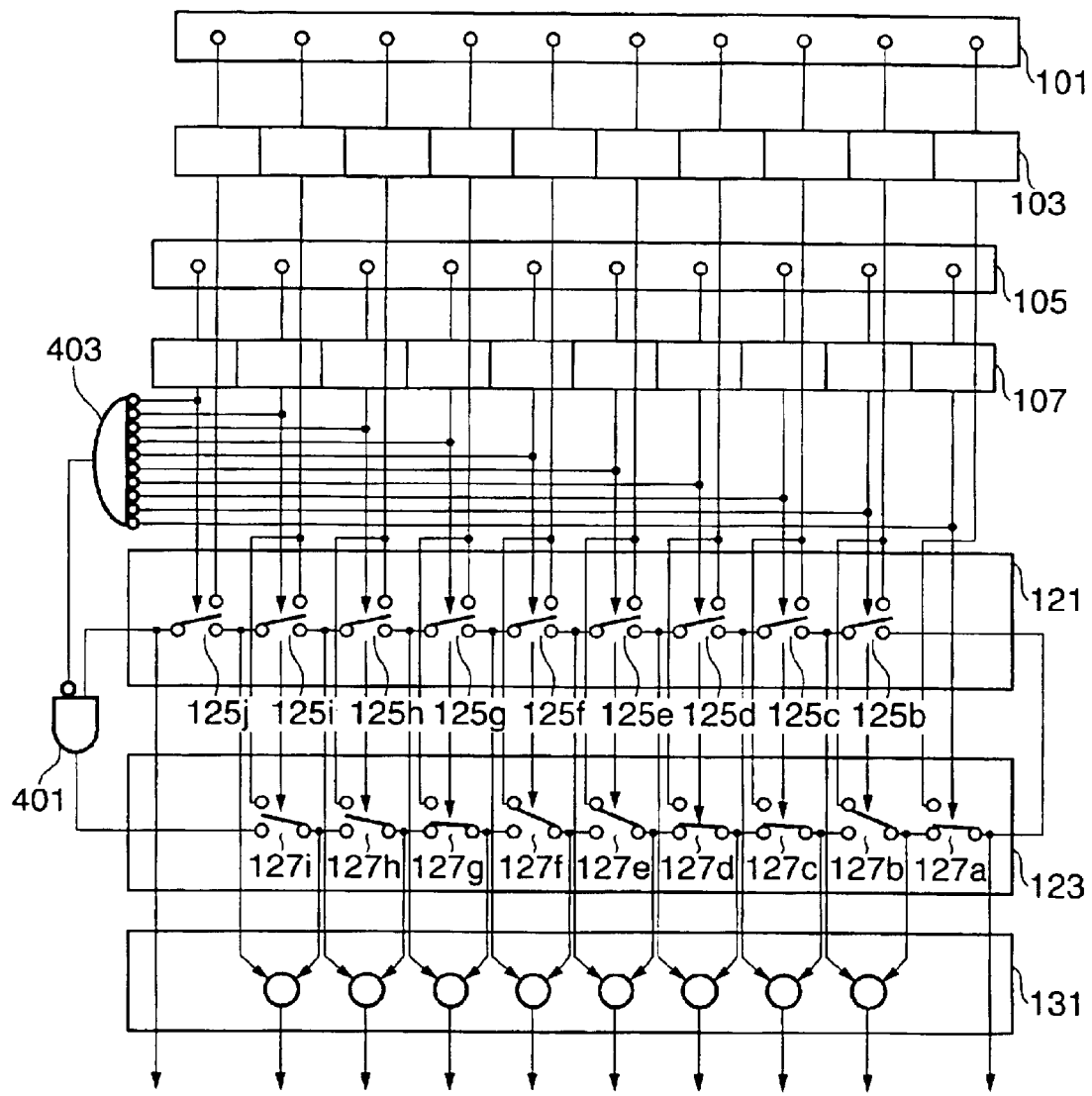
FIG. 7 is a block diagram showing the arrangement of an image processing section according to a modification to the second embodiment.

FIG. 7 is a block diagram showing an arrangement without the calculators at the left and right ends of the calculator group 131, the right-end selector of the left propagation processing section 121, and the left-end selector of the right propagation processing section 123.

[Third Embodiment]

This embodiment provides an image processing section for executing two-dimensional padding processing for a block having N horizontal pixels×N vertical pixels. More specifically, in this embodiment, one-dimensional padding processing is executed in the horizontal and vertical directions.

The block to be subjected to padding processing is normally a square block having the same size in the vertical and horizontal directions. In this embodiment, not only a square block but also a rectangular block can be processed, as will be described later.

In this embodiment, a one-dimensional padding processing unit is commonly used at the first stage where horizontal padding processing is executed and at the second stage where vertical padding processing is executed.

At the first stage, padding processing is continuously executed for pixel data of one block input in units of rows, and in parallel to the padding processing, the processed pixel data of one block are stored in units of rows.

At the second stage, the stored pixel data of one block are read out while changing their direction by 90°, and vertical padding processing is continuously executed for the pixel data of one block.

Figure 5:
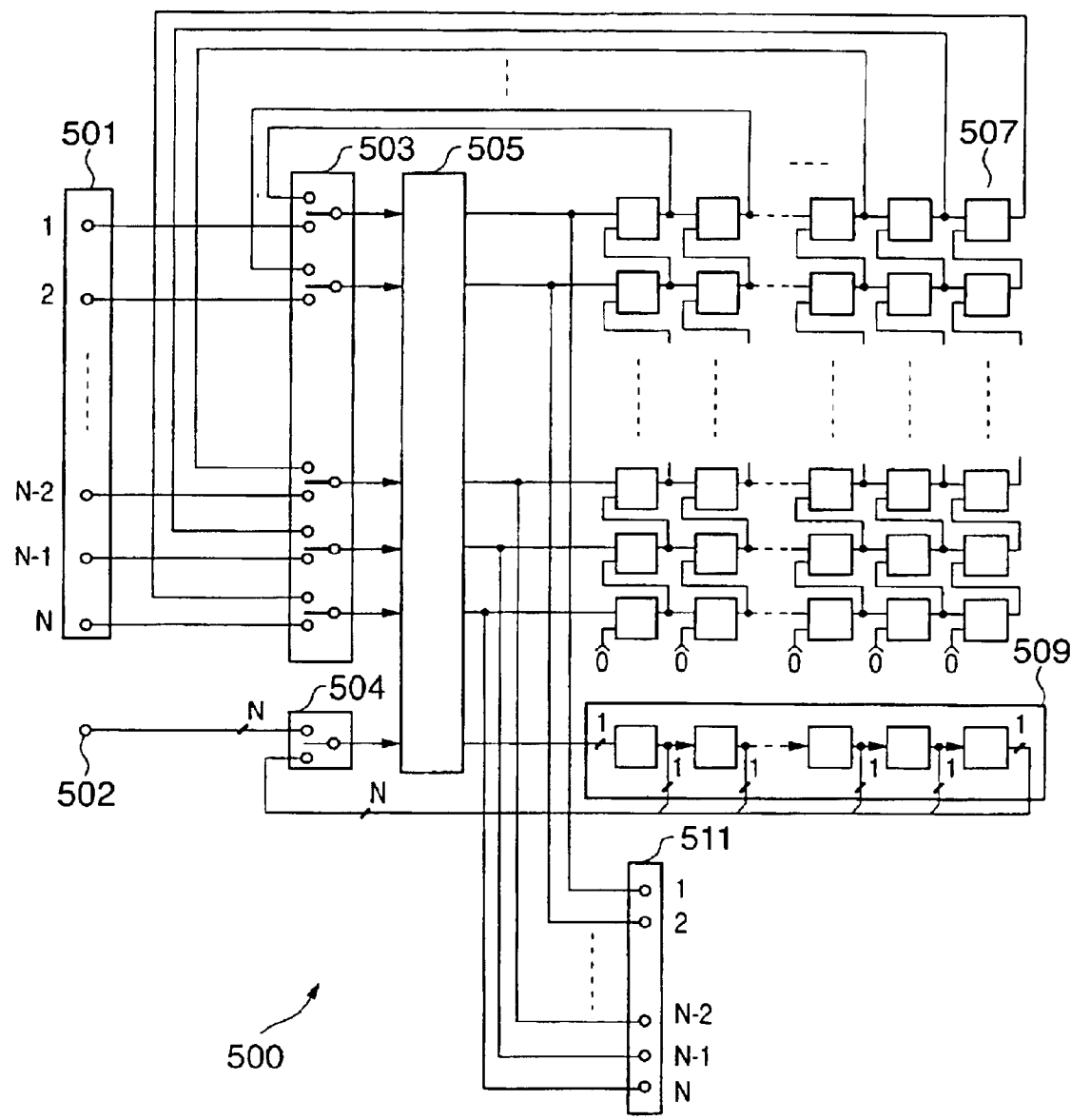
FIG. 5 is a block diagram showing the arrangement of an image processing section according to the third embodiment.

FIG. 5 is a block diagram showing the arrangement of an image processing section according to the third embodiment. An image processing section 500 can be suitably used as part of an image processing apparatus such as a computer.

Referring to FIG. 5, a terminal group 501 inputs in units of rows a plurality of pixel data that constitute two-dimensional image data of one block. A terminal 502 inputs pieces of shape information of the pixels of one row at once. A selector group 503 selects the plurality of pixel data input in units of rows or a plurality of pixel data read out in units of columns. A selector 504 selects shape information of pixels of one row or shape information of pixels of one column. A padding processing unit 505 is the padding processing unit (image processing section 200) described in the second embodiment. A data holding unit group 507 has an array of data holding units each having first and second pixel data input terminals, a selector for selecting one of pixel data input from the two pixel data input terminals, and a register for holding the selected pixel data. A shift register 509 holds shape information after the first padding processing. A terminal group 511 outputs the pixel data that have undergone the two, vertical and horizontal padding processing operations.

At the first stage, pixel data of one row input from the terminal group 501 are selected by the selector group 503 and sent to the padding processing unit 505. The padding processing unit 505 executes padding processing for the pixel data of one row, as in the second embodiment, and sends the pixel data to the first input terminals of corresponding data holding units of one column at the left end (left end on the drawing) of the data holding unit group 507.

Each of data holding units except the uppermost row and rightmost column of the data holding unit group 507 sends the held data to the first input terminal of the data holding unit on the right side and the second input terminal of the data holding unit on the upper side. At the first stage, each data holding unit controls the selector such that the data on the first input terminal side is received by the register, and moves the pixel data to the right every time pixel data of one row undergo the padding processing.

In this embodiment, since padding processing is executed again for the padded data while changing their direction, pieces of shape information for the second padding processing are necessary. However, the initial shape information cannot be directly used.

The shape information need be changed such that no data is padded by the second padding processing to a pixel position where data has already been padded by the first padding processing. For this purpose, shape information at a pixel position where data has been padded is changed from "0" to "1".

The shape information change processing need not be executed in units of pixels and only need be performed in units of rows. More specifically, when row data to be subjected to padding processing contains no pixels in the objects, shape information for that row data is changed to "0". When even one pixel in an object is contained, the shape information for that row data is changed to "1". Such changed shape information can be obtained by, e.g., inverting the outputs from a NOR circuit 403 (FIG. 4) in the padding processing unit 505.

The 1-bit shape information output from the padding processing unit 505 in units of rows is sequentially sent to the shift register 509, so N-bit information is finally stored in the shift register 509 in correspondence with N rows. In parallel to this processing, pixel data of N rows which have undergone the padding processing are stored in the data holding unit group 507.

When the horizontal padding processing (first stage) for the pixel data of N rows of one block is ended, the pixel data are extracted from the data holding unit group 507 in units of columns, input to the padding processing unit 505 again through the selector group 503, and subjected to padding processing again (second stage).

At the second stage, the pieces of shape information stored in the shift register 509 are parallelly read out, and the same pieces of shape information are supplied through the selector 504 each time for all columns to be processed at the second stage. The pixel data which have undergone the padding processing are output from the padding processing unit 505 to the terminal group 511 in units of columns.

At the second stage, each data holding unit in the data holding unit group 507 controls the selector such that the data from the second input terminal is received by the register whereby the moving direction of the pixel data changes from right to upward. Hence, when the pixel data of the first column are extracted from the uppermost stage, the pixel data of the second column move to the uppermost stage. Data "0" or "1" are input to the lowermost data holding units because any values can be input to their second input terminals without any influence.

When the target block has even one pixel data in an object, data are padded to all pixels outside the objects in the block, and the final shape information is "1" for all pixel data. However, when no pixel data in the objects are present, actual padding processing is not executed at all, and the final shape information is "0" for all pixel data.

It can be determined by looking up this information whether actual padding processing has been executed.

However, it is wasteful to execute the padding processing of this embodiment when the block contains no pixel data in the objects.

It is effective to execute the padding processing only when it is determined by pre-check that the block contains pixel data in the objects. In this case, since the final shape information after the padding processing is always "1", this information need not be looked up.

To process a block having a size of L×M (L and M<N), shape information corresponding to a terminal without any pixel input is fixed to "0", as described in the first embodiment. In extracting pixel data from the data holding unit group 507 in units of columns, to obtain an output "0" from the shift register 509 corresponding to a column having no data, all pieces of information in the shift register 509 are initialized to "0"s at the start of padding processing for the block. With this operation, values in the same number as bits corresponding to the number of rows that have undergone the padding processing are stored in the shift register 509, and the remaining values are kept at "0".

[Fourth Embodiment]

In this embodiment, two-dimensional padding processing can be executed for a block having N horizontal pixels×N vertical pixels, as in the third embodiment. In this embodiment, however, the processing speed is increased by preparing two padding processing units.

Figure 6:
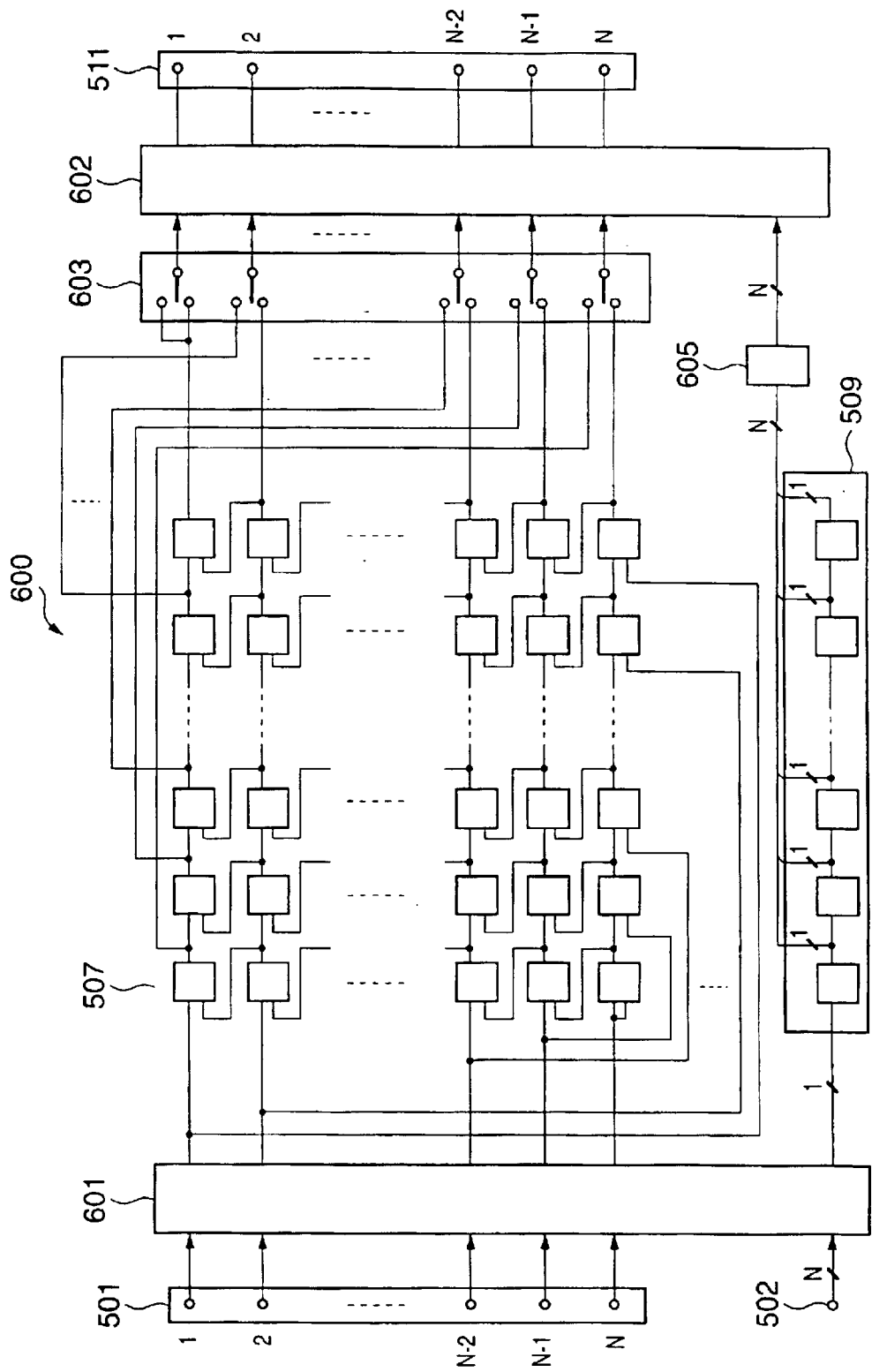
FIG. 6 is a block diagram showing the arrangement of an image processing section according to the fourth embodiment.

FIG. 6 is a block diagram showing the arrangement of an image processing section according to the fourth embodiment of the present invention. An image processing section 600 can be suitably used as part of an image processing apparatus such as a computer.

Referring to FIG. 6, a first padding processing unit 601 (image processing section 200 described in the second embodiment) executes only horizontal padding processing. A second padding processing unit 602 (image processing section 200 described in the second embodiment) executes only vertical padding processing. A selector 603 selects column data to be supplied to the second padding processing unit 602. A register 605 holds the outputs received at once from a shift register 509 for holding shape information after horizontal padding processing, and continuously supplies the information to the vertical padding processing unit 602.

The remaining constituent units are the same as those with the same reference numerals in the third embodiment shown in FIG. 5.

In the fourth embodiment, padding processing at the first stage and padding processing at the second stage in the third embodiment are simultaneously executed. However, a block to be subjected to the processing at the second stage is a block that has already undergone the processing at the first stage.

The processing method is the same as in the third embodiment until the first stage for the first block, though the processing at the second stage is different from that in the third embodiment.

At the second stage for the first block, in a data holding unit group 507, each selector is switched such that data from the second input terminal is received by the register. With this operation, the pixel data moving direction changes from right to upward.

The pixel data of one row processed by the first padding processing unit 601 are also sent to the second input terminals of the lowermost data holding units in the data holding unit group 507. Hence, for the second block, pixel data that have undergone the horizontal padding processing move upward from the lower side in the data holding unit group 507.

In synchronism with this operation, the pixel data of one column of the first block are sequentially output from the uppermost units in the data holding unit group 507. The pixel data are sent to the second padding processing unit 602 through the selector 603, undergo the vertical padding processing, and are output to a terminal group 511.

When the padding processing data of one block are output from the terminal group 511, the data holding unit group already stores the pixel data of the next block. However, although the pixel data of the first block are stored while moving from the left to the right, the pixel data of the second block are stored while moving from the lower side to the upper side.

To extract the pixel data of the second block from the data holding unit group 507 in units of columns, the pixel data are extracted from the rightmost data holding units in the data holding unit group 507, and simultaneously, the selector in each data holding unit is switched such that the pixel data moves from the left to the right.

The data of the third block which has undergone the horizontal padding processing are also stored while moving from the left to the right in the data holding unit group 507, as in the first block.

As described above, the pixel data moving direction in the data holding unit group 507 is switched for each block, thereby continuously executing conversion from data in units of rows to data in units of columns. Hence, the two padding processing units 601 and 602 can be continuously operated without intermission, and padding processing of pixel data in units of blocks can be efficiently executed.

Since this embodiment is based on the third embodiment, the data holding unit group 507 for storing pixel data after horizontal padding processing need be prepared for only one block. However, with this arrangement, the horizontal padding processing unit on the input side and the vertical padding processing unit on the output side must be synchronously operated.

To eliminate this constraint, for example, data holding unit groups are prepared for two blocks, and while pixel data are stored in one data holding unit group, pixel data are read out from the other data holding unit group. With this arrangement, the two padding processing units need not be completely synchronously operated.

[Fifth Embodiment]

Figure 8:
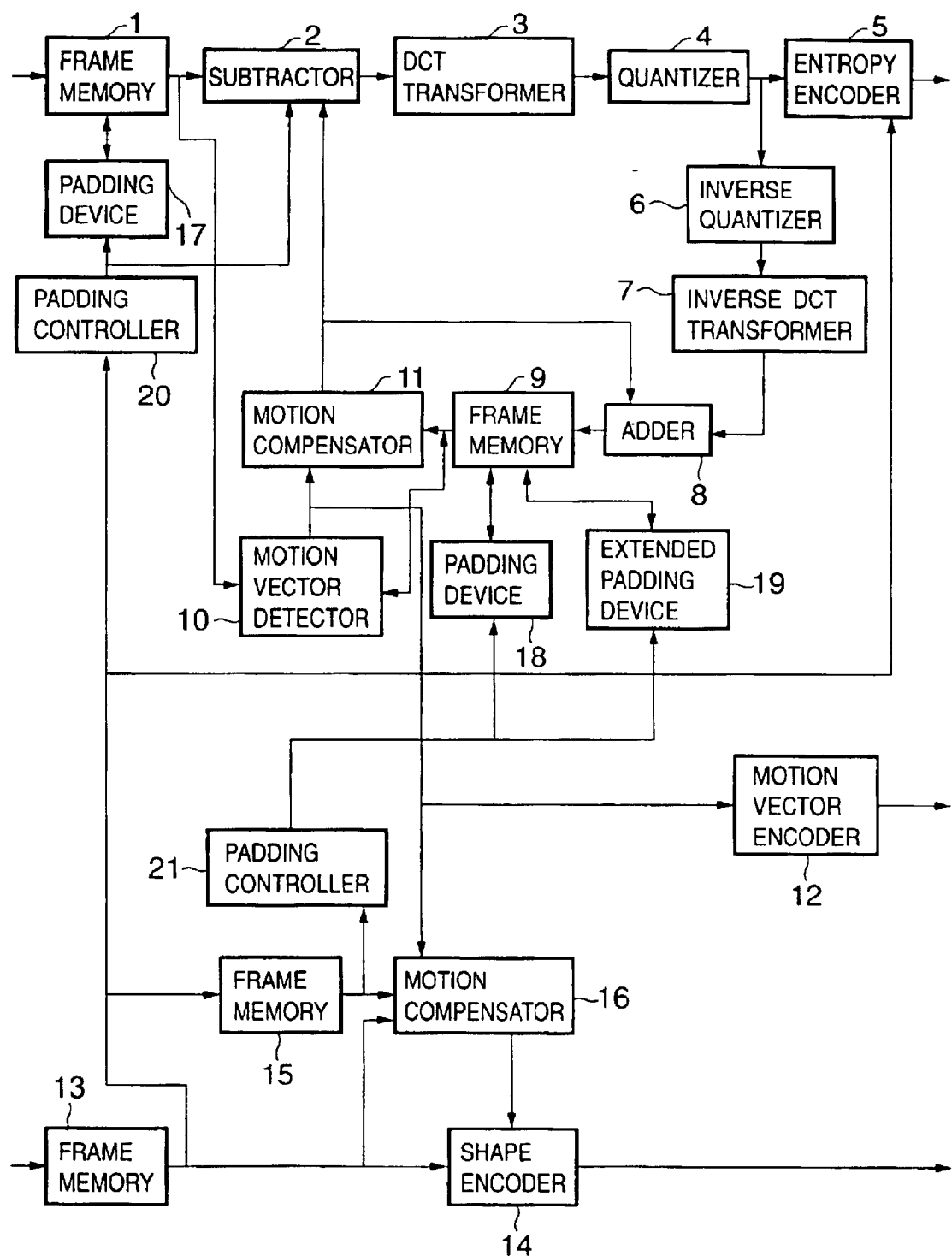
FIG. 8 is a block diagram showing the arrangement of an image encoding apparatus according to the fifth embodiment.

FIG. 8 is a block diagram showing the arrangement of an image encoding section according to the fifth embodiment of the present invention.

Referring to FIG. 8, a frame memory 1 stores image data of one frame and outputs it in units of macroblocks in accordance with the procedure of MPEG-4. A subtractor 2 subtracts a predicted value (to be described later). A DCT transformer 3 performs DCT transformation. A quantizer 4 quantizes a transform coefficient. An entropy encoder 5 entropy-encodes a quantization result. An inverse quantizer 6 returns the quantization result to the transform coefficient. An inverse DCT transformer 7 reconstructs pixel data from the transform coefficient. An adder 8 adds the predicted value. A frame memory 9 stores a reconstructed image.

A motion vector detector 10 detects a motion vector from the input pixel data of the macroblock and the pixel data stored in the frame memory 9. A motion compensator 11 calculates a predicted value for each macroblock in accordance with the detected motion vector. A motion vector encoder 12 encodes the motion vector. A binary frame memory 13 stores pieces of binary shape information for one frame and divisionally outputs them in units of macroblocks in accordance with the procedure of MPEG-4. Shape information is data representing whether a pixel is in or outside an object. A shape encoder 14 arithmetically encodes the shape information in units of macroblocks. A frame memory 15 stores shape information corresponding to the reconstructed image. A motion compensator 16 receives a motion vector from the motion vector detector 10 for a corresponding macroblock and calculates the motion vector of shape information by comparing the shape information of the input macroblock and that in the frame memory 15, thereby executing motion compensation.

Padding controllers 20 and 21 control padding on the basis of the shape information. A padding device 17 pads pixel data outside the objects in the frame memory 1 in accordance with the shape information and control by the padding controller 20. A padding device 18 pads pixel data outside the objects in the frame memory in accordance with the shape information and control by the padding controller 21. An extended padding device 19 executes extended padding.

Operation of encoding each frame of a moving image in the above arrangement will be described.

First, pixel data and shape information of one frame are stored in the frame memories 1 and 13, respectively.

When the input frame to be encoded is to be subjected to intraframe encoding, the padding controller 20 and padding device 17 operate. When the frame is to be subjected to interframe encoding with motion compensation, the padding controllers 20 and 21, padding devices 17 and 18, and extended padding device 19 operate.

The padding device 17 and padding controller 20 execute padding processing by a method called low-frequency component extrapolation in intraframe encoding, and execute no particular processing in interframe encoding. Of predicted errors output from the subtractor 2, predicted error values outside the object regions are replaced with "0" on the basis of a signal from the padding controller.

In the low-frequency component extrapolation, after a region outside an object is filled with the average value of pixels in the object, a pixel outside the object is replaced with the average value of four pixels, i.e., upper, lower, left, and right pixels of the pixel of interest. As the padding device 18, the two-dimensional padding processing unit described in the third or fourth embodiment is used.

When intraframe encoding is selected, the padding device 17 executes padding processing before encoding. The padding controller 20 detects a macroblock including an object boundary from the shape information stored in the binary frame memory 13 and supplies the position and shape information of the macroblock to the padding device 17. The padding device 17 reads out the pixel data of the macroblock including the object boundary from the frame memory 1 and calculates pixel data outside the object from the pixel data in the object using the low-frequency component extrapolation.

When interframe encoding is selected, the padding device 18 executes padding processing before encoding. The padding controller 21 detects a macroblock including an object boundary from the shape information stored in the binary frame memory 15 and supplies the position and shape information of the macroblock to the padding device 18. The padding device 18 reads out the pixel data of the macroblock including the object boundary from the frame memory 9 and generates pixel data outside the object from the pixel data in the object.

In parallel to the padding processing, the padding controller 21 detects, from the shape information stored in the frame memory 15, a macroblock whose left, right, upper and lower sides are in contact with macroblocks including pixels in the objects, and supplies the position of the macroblock to the extended padding device 19. The extended padding device 19 copies the pixel data of the adjacent macroblocks in accordance with the extended padding procedure of the MPEG-4 encoding scheme.

In the intraframe encoding, after the padding processing for the block to be encoded is ended, the pixel data are read out from the frame memory 1 in units of macroblocks. A predicted value "0" is subtracted from the pixel data by the subtractor 2. The pixel data are DCT-transformed by the DCT transformer 3. Then, the transform coefficient is quantized by the quantizer 4.

The quantization result is encoded by the entropy encoder 5 and externally output. Simultaneously, the quantization result is sent to the inverse quantizer 6 to reconstruct the DCT transform coefficient. The pixel data are reconstructed by the inverse DCT transformer 7, added with a predicted value "0" by the adder 8, and stored in the frame memory 9.

In parallel to this operation, the pieces of binary shape information in the binary frame memory 13 are encoded by the shape encoder 14 as Transparent for a macroblock outside the objects, arithmetically encoded in its shape for a macroblock including a boundary, and encoded as Opaque for a macroblock completely contained in an object, and externally output. The pieces of binary shape information are also stored in the frame memory 15 to be used for the next shape information encoding.

The outputs from the entropy encoder 5 and shape encoder 14 are externally multiplexed with encoding data such as header information necessary for the MPEG-4 format and output as MPEG-4 encoded data.

In interframe encoding, the pixel data are read out from the frame memory 1 in units of macroblocks and input to the motion vector detector 10. The motion vector detector 10 sequentially compares the pixel data of the input macroblock with a partial image of reconstructed image data stored in the frame memory 9, specifies regions with the highest similarity in the reconstructed image, and outputs the deviation as a motion vector.

The output motion vector is encoded by the motion vector encoder 12 and externally output. Simultaneously, the motion vector is also supplied to the motion compensators 11 and 16. The motion compensator 11 reads out a predicted value from the frame memory 9 in accordance with the motion vector and input the predicted value to the subtractor 2. The subtractor 2 subtracts the input predicted value from pixel data of the macroblock to be encoded.

The subtraction result is DCT-transformed by the DCT transformer 3, and the transform coefficient therefor is quantized by the quantizer 4. The quantization result is encoded by the entropy encoder 5 and externally output. Simultaneously, the quantization result is supplied to the inverse quantizer 6 to reconstruct the DCT transform coefficient. The pixel data are reconstructed by the inverse DCT transformer 7, added with the predicted value from the motion compensator 11 by the adder 8, and stored in the frame memory 9.

In parallel to this operation, the motion vector calculated by the motion vector detector 10 is supplied to the motion compensator 16. The motion compensator 16 compares the shape information in the frame memory 15 with the shape information of the macroblock to be encoded using the motion vector as a reference to calculate the motion vector of the shape information, and supplies the motion vector and shape information represented by the motion vector to the shape encoder 14 as a predicted value.

The pieces of shape information in the frame memory 13 are encoded by the shape encoder 14 as Transparent for a macroblock outside the objects, and encoded as Opaque for a macroblock completely contained in an object, and externally output.

For a macroblock including a boundary, in the interframe encoding mode, the motion vector of the shape information is encoded, and then, the shape is arithmetically encoded also with reference to the predicted value from the motion compensator 16 and externally output. In the intraframe encoding mode, the shape information is encoded without referring to the predicted value from the extended padding device 19 and externally output. The pieces of shape information are stored in the frame memory 15 to be used for the next shape information encoding.

The outputs from the entropy encoder 5, shape encoder 14, and motion vector encoder 12 are externally multiplexed with encoded data such as information necessary for the MPEG-4 format and output as MPEG-4 encoded data.

The extended padding device 19 is actually implemented by the frame memory and its memory control function and therefore can be implemented in some cases without preparing a dedicated device.

[Sixth Embodiment]

Figure 9:
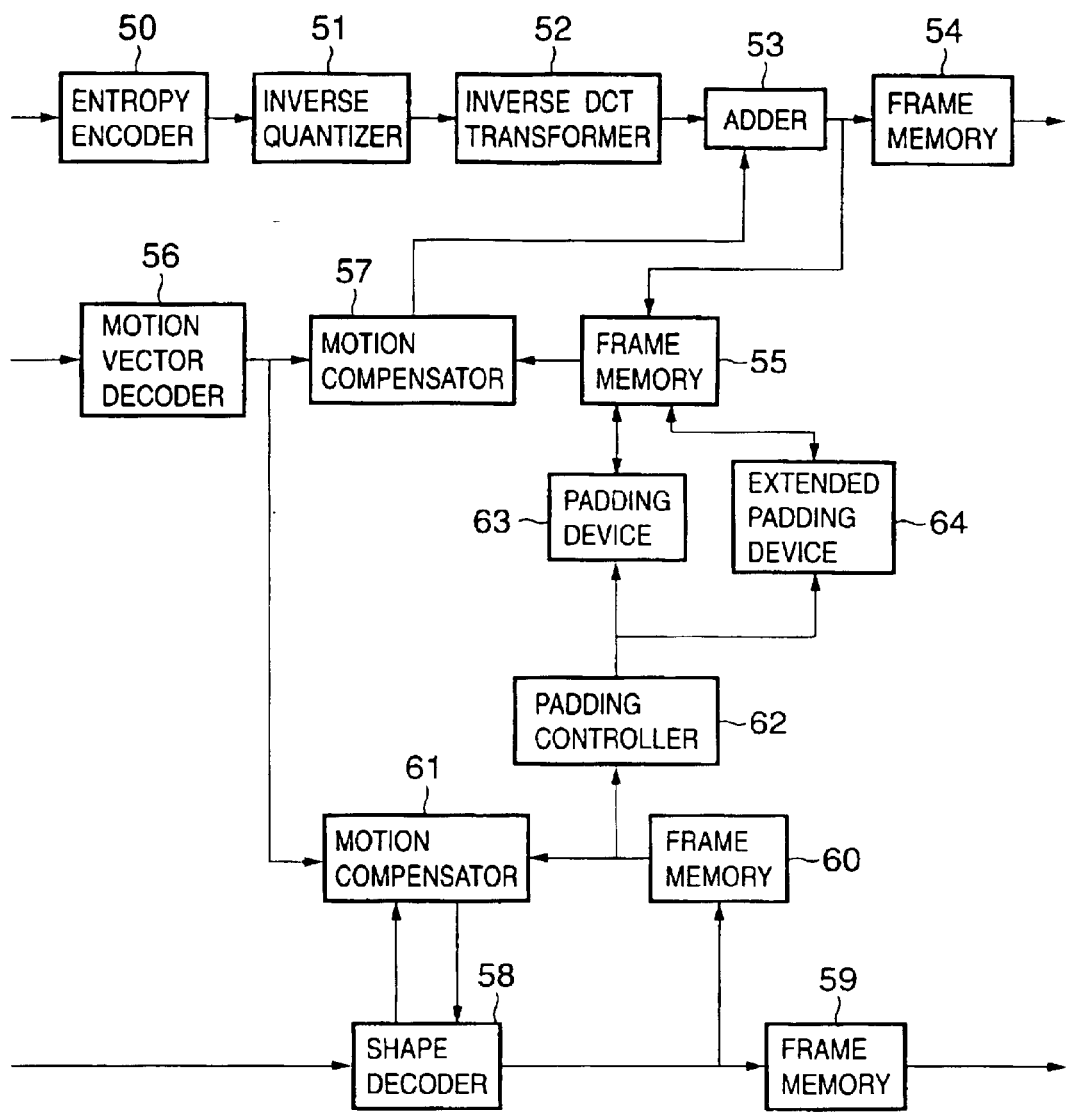
FIG. 9 is a block diagram showing the arrangement of an image decoding apparatus according to the sixth embodiment.

FIG. 9 is a block diagram showing the arrangement of an image decoding section according to the sixth embodiment of the present invention.

Referring to FIG. 9, an entropy decoder 50 receives encoded data and reconstructs the quantization result. An inverse quantizer 51 returns the quantization result to a transform coefficient. An inverse DCT transformer 52 reconstructs predicted difference pixel data from the transform coefficient. An adder 53 adds a predicted value. A frame memory 54 stores image data of one frame in units of macroblocks in accordance with the procedure of MPEG-4. A frame memory 55 stores a reconstructed image. A motion vector decoder 56 decodes and reconstructs a motion vector.

A motion compensator 57 calculates a predicted value for each macroblock in accordance with the decoded motion vector. A shape decoder 58 decodes shape data for each macroblock.

Binary frame memories 59 and 60 stores decoded binary shape information. A motion compensator 61 receives a motion vector from the motion vector decoder 56 for a corresponding macroblock and reads out shape information from the frame memory 59 in accordance with the motion vector and that of the shape information decoded by the shape decoder 58.

A padding controller 62 controls padding in accordance with the shape information. A padding device 63 pads pixel data outside the objects in the frame memory 55 in accordance with the shape information in the frame memory 59. An extended padding device 64 executes extended padding.

Operation of decoding each frame of a moving image in the above arrangement will be described.

Decoding of a frame encoded by intraframe encoding will be described first. The encoded data of shape information is input to the shape decoder 58 in units of macroblocks to decode the shape information.

For a macroblock in the Transparent mode, the shape decoder 58 always outputs "0" as shape information. Since pixel data of a macroblock corresponding to the shape information in this mode are not present, decoding processing is not executed.

For a macroblock in the Opaque mode, the shape decoder 58 always outputs all "1"s as shape information. If the shape information has been arithmetically encoded, it is decoded to reconstruct the shape information at the object boundary. The reconstructed shape information is stored in the frame memories 59 and 60.

If the mode of the shape information of a macroblock is Opaque or arithmetic encoding, the encoded data is input to the entropy decoder 50 in units of macroblocks. The entropy decoder 50 decodes the encoded data to reconstruct the quantization result. The quantization result is input to the inverse quantizer 51 to reconstruct the DCT transform coefficient. The pixel data are reconstructed by the inverse DCT transformer 52, added with a predicted value "0" by the adder 53, and stored in the frame memories 54 and 55.

When processing for one frame is ended, the contents in the frame memories 54 and 59 are externally output and appropriately synthesized.

Decoding of a frame encoded by interframe encoding will be described next.

The padding device 63 executes boundary padding processing. The padding controller 62 detects a macroblock including an object boundary from binary shape information stored in the frame memory 60, reads out the pixel data of the macroblock including the object boundary of the macroblock from the frame memory 55, and supplies the pixel data and shape information to the padding device 63.

As the padding device 63, the two-dimensional padding processing unit described in the third or fourth embodiment is used. The pixel data outside the objects are generated from the input pixel data and binary shape information.

Subsequently, the padding controller 62 detects, from the binary shape information stored in the frame memory 60, a macroblock whose left, right, upper and lower sides are in contact with macroblocks including pixels in the objects, and supplies the position of the macroblock to the extended padding device 64. The extended padding device 19 copies the pixel data of the adjacent macroblocks in accordance with the extended padding procedure of the MPEG-4 encoding scheme.

In parallel to the above decoding processing, the encoded data of shape information is input to the shape decoder 58 for each macroblock to decode the binary shape information.

For a macroblock in the Transparent mode, the shape decoder 58 always outputs "0" as shape information. Since pixel data of a macroblock corresponding to the shape information in this mode are not present, decoding processing is not executed.

For a macroblock in the Opaque mode, the shape decoder 58 always outputs all "1"s as shape information. If the shape information has been arithmetically encoded, it is decoded to reconstruct the shape information at the object boundary and stored in the frame memory 59.

For a macroblock that has undergone motion compensation, the motion vector is decoded by the motion vector decoder 56, and the decoded motion vector is input to the motion compensators 57 and 61.

If the shape information is arithmetically encoded in the interframe encoding, the shape decoder 58 decodes data used to calculate a motion vector for the shape information. The motion compensator 61 reads out the predicted value for the shape information from the frame memory 60 using the motion vector. The shape decoder 58 decodes the shape information with reference to this predicted value and stores the shape information in the binary frame memory 59.

For a macroblock encoded by intraframe encoding, decoding is performed by the above-described decoding operation for intraframe encoded data, and pixel data are stored in the frame memories 54 and 55.

If a macroblock is encoded by interframe encoding, and the mode of the shape information of the macroblock is Opaque or arithmetic encoding, the encoded data is input to the entropy decoder 50 in units of macroblocks and decoded by the entropy decoder 50 to reconstruct the quantization result.

The quantization result is input to the inverse quantizer 51 to reconstruct the DCT transform coefficient. Predicted difference pixel data are reconstructed from the transform coefficient by the inverse DCT transformer 52 and sent to the adder 53.

In parallel to this processing, the motion compensator 57 reads out a predicted value from the frame memory 55 on the basis of the motion vector decoded by the motion vector decoder 56 and supplies the predicted value to the adder 53. The above predicted difference pixel data are added with the predicted value by the adder 53 and stored in the frame memories 54 and 55.

In the intraframe encoding mode, processing is executed as in the above-described intraframe encoded data. When processing for one frame is ended, the contents in the frame memories 54 and 59 are externally output and appropriately synthesized.

The present invention may be applied to a system constituted by a plurality of devices or an apparatus comprising a single device.

The object of the present invention is achieved even by supplying a storage medium (or recording medium) which stores software program codes for implementing the functions of the above-described embodiments to the system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operation system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

According to the present invention, for example, padding processing can be executed at a high speed. Hence, encoding and decoding in the fifth and sixth embodiments can be executed at a high speed.

[Seventh Embodiment]

The above-described padding processing circuit executes one-dimensional padding processing for row data having 10 pixels. This principle can be expanded to one-dimensional padding processing for, e.g., an arbitrary number of pixel data.

Figure 12:
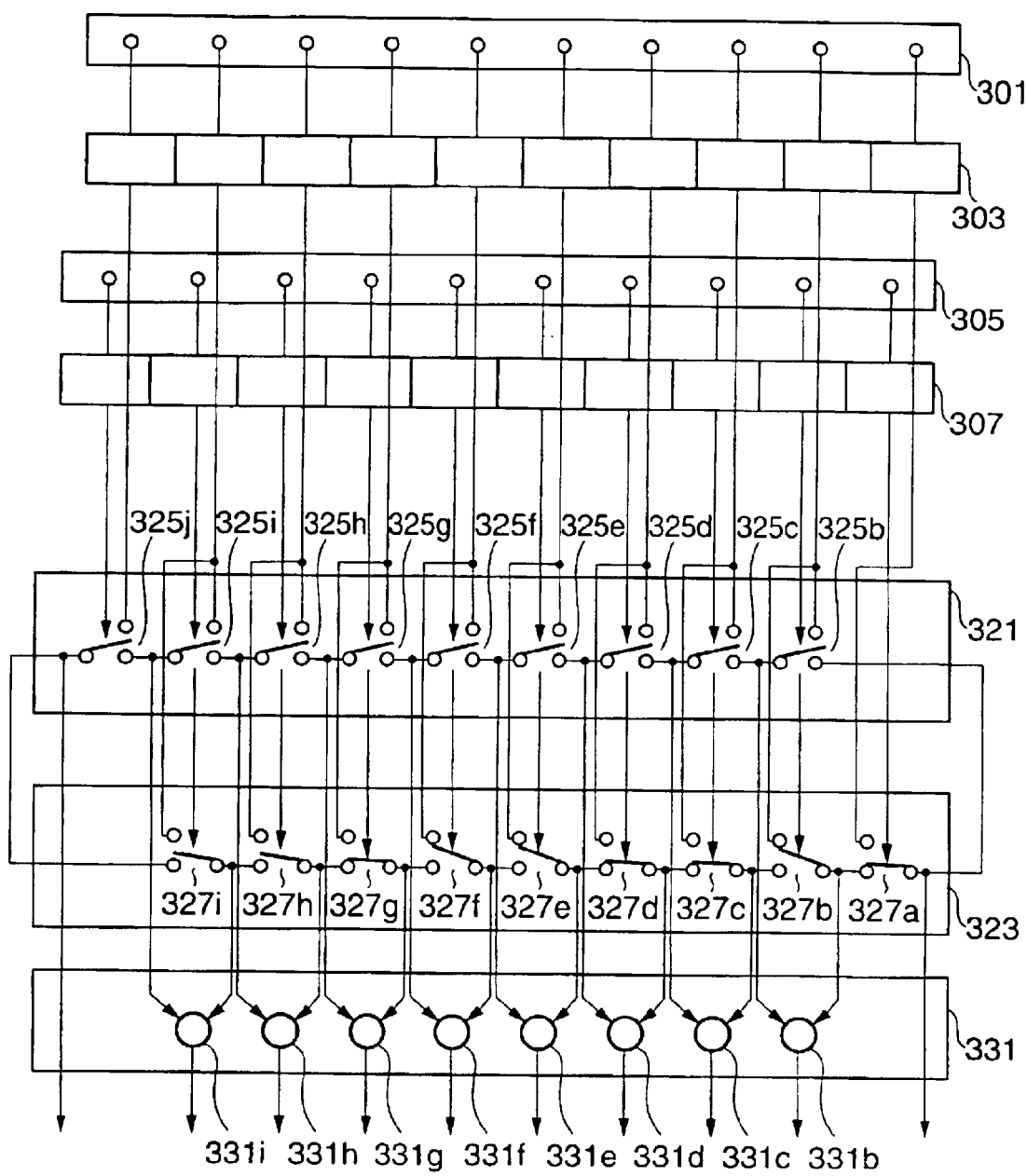
FIG. 12 is a block diagram showing the arrangement of an image processing section for padding processing disclosed in the first embodiment.

FIG. 12 is a block diagram showing the arrangement of the image processing section described in the first embodiment. Referring to FIG. 12, a terminal group 301 inputs a plurality of pixel data that construct one-dimensional image data to be subjected to padding processing. A register group 303 holds the plurality of pixel data that construct the one-dimensional image data. A terminal group 305 inputs pieces of shape information (1 bit per pixel) as attribute data, each of which represents whether a pixel related to pixel data of the one-dimensional image data is a pixel in or outside an object. A register group 307 holds the pieces of shape information. A left propagation processing section 321 propagates each pixel data to the left on the basis of corresponding shape information. A right propagation processing section 323 propagates each pixel data to the right on the basis of corresponding shape information. Selectors 325b to 325j constitute the left propagation processing section 321. Selectors 327a to 327i constitute the right propagation processing section 323. Calculators 331b to 331i calculate the average value between two pixel data.

Ten pixel data to be subjected to padding processing and 10 pieces of binary shape information corresponding to the pixel data are input from the terminal groups 301 and 305 one by one or simultaneously and held by the register groups 303 and 307, respectively. Shape information (binary) "1" represents that the pixel is in an object, and "0" represents that the pixel is outside an object.

The plurality of pixel data held by the register group 303 are input to corresponding selectors in the left propagation processing section 321 and right propagation processing section 323. The pieces of shape information held by the register group 307 are input as control signals for corresponding selectors in the left propagation processing section 321 and right propagation processing section 323.

Each selector selects the pixel data input from the register group 303 when the control signal is "1", and selects the pixel data selected by the selector on the input side when the control signal is "0". Thus, the pixel data propagate such that a pixel in an object is replaced with pixel data in the object.

In the left propagation processing section 321, the pixel data in the objects propagate to the left in FIG. 12. In the right propagation processing section 323, the pixel data in the objects propagate to the right in FIG. 12.

The pixel data selected by each selector is sent to a corresponding calculator in a calculator group 331. Each calculator in the calculator group 331 calculates and outputs the average value of two pixel data supplied from corresponding selectors.

FIGS. 13A to 13E are views showing a detailed example of processing in the image processing section shown in FIG. 12. FIG. 13A shows binary shape information, FIG. 13B shows input pixel data (a pixel outside an object is insignificant and therefor is not illustrated), FIG. 13C shows the output values from selectors in the left propagation processing section 321 (a value at a position without any selector is not illustrated), FIG. 13D shows the output values from the selectors in the right propagation processing section 323 (a value at a position without any selector is not illustrated), and FIG. 13E shows the average value outputs from the calculator group 131 (left and right ends have selector outputs).

Since the pixels at the left and right ends cannot be sandwiched between objects, no calculators for obtaining the average values are necessary. In addition, one of two selectors for selecting the input to the unnecessary calculator is unnecessary. Hence, at the left- and right-end pixel positions, a value selected by one selector is output as a result of padding processing.

Two selectors are prepared at each of the remaining pixel positions. For a pixel having shape information "1" (in the object), the input pixel data is selected. For a pixel having shape information "0", a value obtained by propagating the pixel data in the object to the left or right is selected.

The calculator group 331 calculates the average value of two values selected for each pixel and outputs the average value as a result of padding processing. For a pixel in the object (pixel corresponding to shape information "1"), the two values supplied to the calculator are the same value (input pixel data), so the calculation result is the same as the two values.

For a pixel in a region sandwiched between the objects (pixel corresponding to shape information "0"), since the value of left propagation pixel data and the value of right propagation pixel data supplied to a corresponding calculator are different, the average value between the value of left propagation pixel data and the value of right propagation pixel data is calculated for each pixel and output as a result of padding processing.

With this above processing, an external region sandwiched between the objects is replaced with the average value of pixel data in the objects on the left and right sides of the region. Another region outside the objects is replaced with pixel data in an object in contact with the region.

With the same arrangement as described above, padding processing for an arbitrary number of pixels fewer than 10 can be executed. This is implemented by fixing shape information corresponding to a terminal having no pixel input to "0".

In this arrangement, (N−2) calculators are necessary to simultaneously process N pixels. In addition, the circuit scale of the calculator group 331 is larger than that of the register or selector group and therefore impedes reduction of the entire circuit scale. In the embodiment to be described below, the entire circuit scale is reduced by decreasing the number of calculators. This makes it possible to manufacture an inexpensive circuit and/or further increase the processing speed by additionally arranging an identical padding processing circuit.

An image processing section according to the seventh embodiment has the same padding processing function as described above using calculators in number ½ that in the image processing section shown in FIG. 12.

Figure 14:
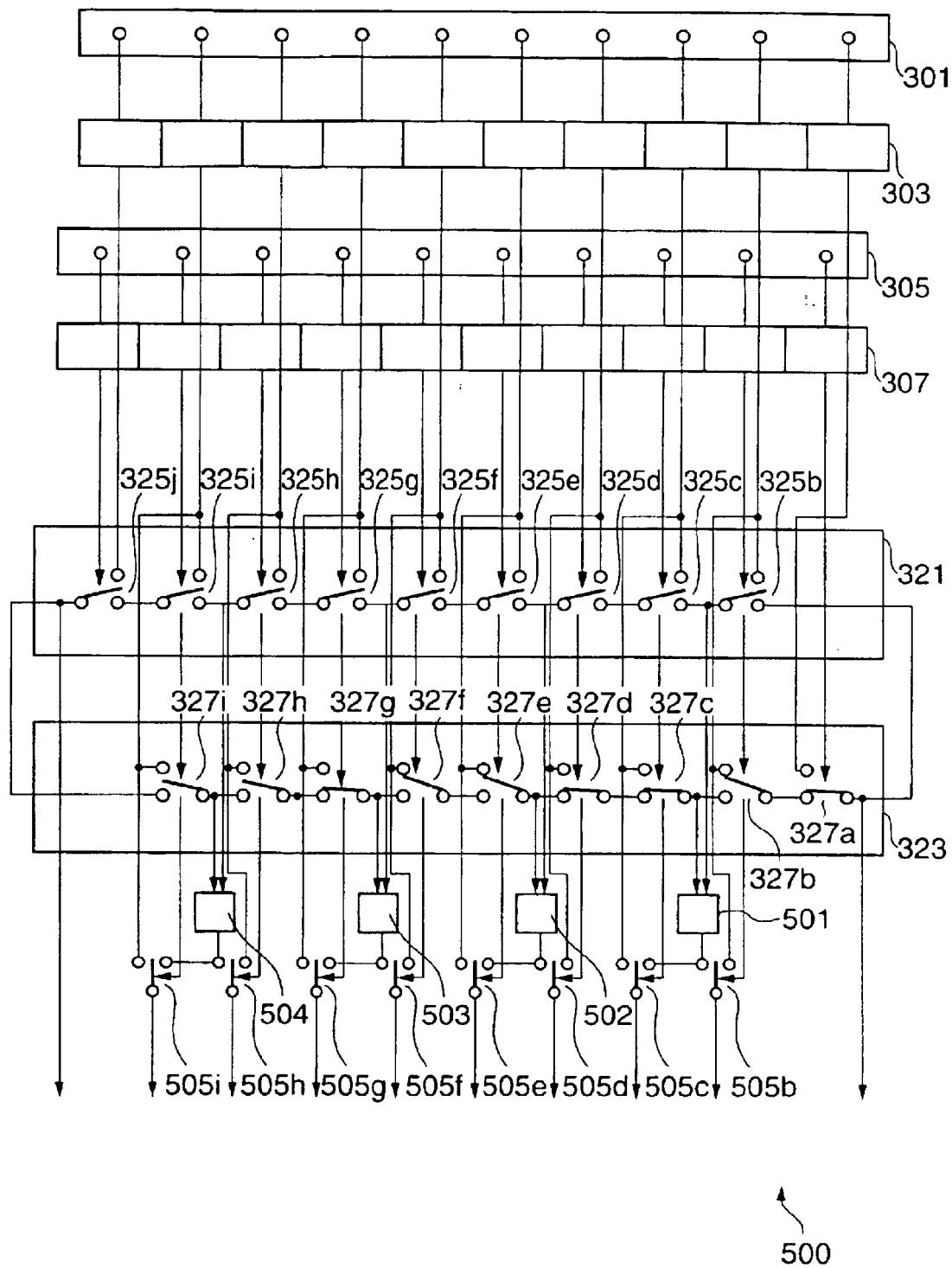
FIG. 14 is a block diagram showing the arrangement of an image processing section according to the seventh embodiment of the present invention.

FIG. 14 is a block diagram showing the arrangement of the image processing section according to the seventh embodiment of the present invention. An image processing section 500 can be suitably used as part of an image processing apparatus such as a computer. Referring to FIG. 14, calculators 501 to 504 calculate the average values. Selectors (determination means) 505b to 505i individually select the average values calculated by the calculators 501 to 504 or input pixel data. The remaining components are the same as those with the same reference numerals in FIG. 12.

In the image processing section 500 for parallelly executing padding processing for 10 pixels, the maximum number of average values which need be independently calculated is four. This can be understood from the following explanation.

When M average values need be independently calculated, the shape information must include at least M "0"s and (M+1) "1"s to separate and sandwich the "0"s. That is, in (2M+1) or (2M+2) one-dimensional pixel data, the number of average values that must be independently calculated is M. The average value need not be independently determined to determine the values of pixel data of adjacent pixels.

To independently calculate four average values, at least four calculators are required. To specify the layout of the four calculators, shape information with the following patterns will be examined.

(p1) 1010101010
(p2) 1010101001
(p3) 1010100101
(p4) 1010010101
(p5) 1001010101
(p6) 0101010101

The above six patterns are representative patterns of shape information requiring four calculators. Of these six patterns, (p2) to (p5) include patterns where two "0"s continue. When one of the two consecutive "0"s is replaced with "1", all patterns requiring four calculators are covered.

Two average values used to determine pixel data of pixels corresponding to the position where two "0"s continue as shape information equal each other. These average values need not be independently calculated, and an average value calculated by one calculator can be commonly used.

Hence, it is appropriate to assign one calculator to each of the sets of the second and third pixels, fourth and fifth pixels, sixth and seventh pixels, and eighth and ninth pixels from the right or left end.

As an example for this propriety, it should be noted that "a pattern which requires four calculators and should replace the (2n−1)th pixel and 2nth pixel from the right or left end with a common average value is not present".

Which signal is to be input to the calculator will be examined.

Referring to FIG. 12, the calculator 331b receives the output from the selector 325b and the output from the selector 327b. When the control signal (shape information of the second pixel from the right end) for the selector 327b is "0", the selection output from the selector 327b is the same as the output from the selector 327c on the input side (left side). Similarly, when the control signal (shape information of the third pixel from the right end) for the selector 325c is "0", the selection output from the selector 325c is the same as the output from the selector 325b on the input side (right side).

Hence, the pair of the outputs from the selectors 325b and 327c can be used as input data to a calculator for calculating the average value to be replaced with the second pixel data from the right end when the shape information of the second pixel from the right end is "0", and can also be used as input data to a calculator for calculating the average value to be replaced with the third pixel data from the right end when the shape information of the third pixel from the right end is "0". On the other hand, when the shape information is "1", the average value for pixels corresponding to the shape information position need not be calculated, so the input to the calculator need not be taken into consideration.

According to the above examination, the outputs from the selectors 325b and 327c are supplied to the calculator 501 of the image processing section 500 according to the seventh embodiment.

In a similar way, the outputs from the selectors 325d and 327e are supplied to the calculator 502, the outputs from the selectors 325f and 327g are supplied to the calculator 503, and the outputs from the selectors 325h and 327i are supplied to the calculator 504.

In the image processing section shown in FIG. 12, since the calculators are independently prepared in units of pixels, the average value output from each calculator can be directly output as pixel data regardless of whether corresponding shape information is "0" or "1". However, in the image processing section 500 according to the seventh embodiment, the pixels and calculators are not in a one-to-one correspondence. For this reason, for pixel data that need not be replaced with the average value (pixel data at a position of shape information "1", i.e., pixel data in an object), pixel data held in the register group 303 must be used as output pixel data. The selectors 505b to 505i are arranged for this purpose.

When pieces of shape information and pixel data shown in FIGS. 13A and 13B are input to the image processing section of this embodiment (see below),

| (a) | 0 | 1 | 0 | 0 | 1 | 1 | 0 | 0 | 1 | 0 |
|---|---|---|---|---|---|---|---|---|---|---|
| (b) |   | 174 |   |   | 156 | 164 |   |   | 42 |   |

The following values are input to the calculators 501 to 504, and the average values are calculated.

|  | Adder 504 | Adder 503 | Adder 502 | Adder 501 |
|---|---|---|---|---|
| Input Value from Left Propagation Processing Section | 156 | 156 | 42 | 42 |
| Input Value from Right Propagation Processing Section | 174 | 174 | 164 | 164 |
| Average Value (Calculation Result) | 165 | 165 | 103 | 103 |

In this example, the average values (calculation result) are output through corresponding selectors of the selectors 505b to 505i. In other words, the third pixel data from the right end is replaced with the output from the adder 501, the fourth pixel data from the right end is replaced with the output from the adder 502, the seventh pixel data from the right end is replaced with the output from the adder 503, and the eighth pixel data from the right end is replaced with the output from the adder 504, so the same result as in FIG. 13E is obtained. That is, the same padding processing result as that by the image processing section shown in FIG. 12 can be obtained by the image processing section 500 according to the seventh embodiment.

As described above, according to the seventh embodiment, the same processing result as that by the image processing section shown in FIG. 12 can be obtained using calculators in number ½ that of the image processing section in FIG. 12.

[Eighth Embodiment]

In the seventh embodiment, N pixels of one-dimensional image data are simultaneously processed. If the N pixels need not be simultaneously processed, the number of calculators can be further decreased.

When pixel data obtained by padding processing are to be temporarily stored in a memory, for example, 16 pixels are rarely simultaneously stored in the memory because of the bus width of the memory limited by cost or the like. Generally, the data amount that can be stored in a memory at once is four pixels or eight pixels at maximum. In this case, one pixel is formed from eight bits.

Figure 15:
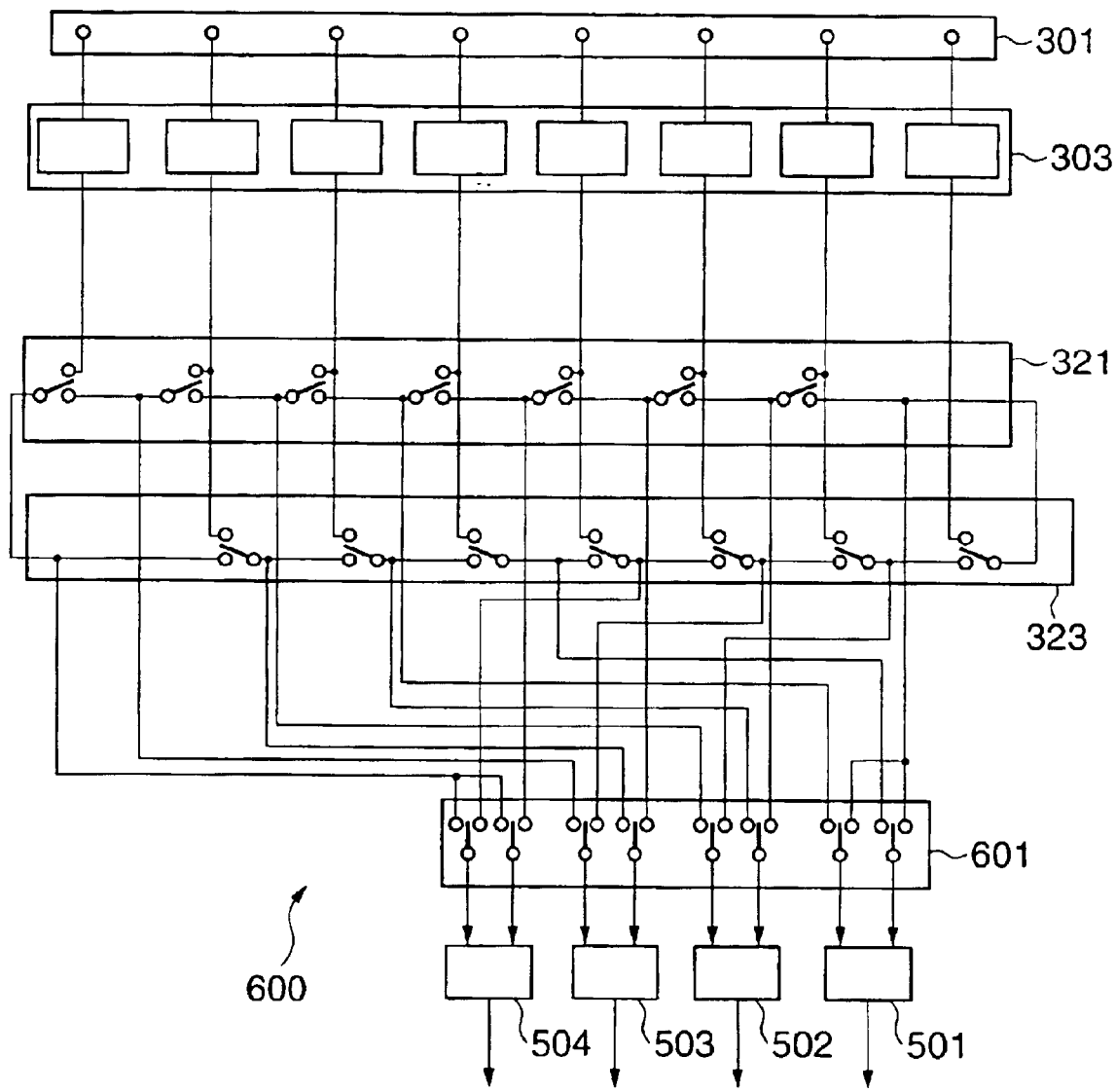
FIG. 15 is a block diagram showing the arrangement of an image processing section according to the eighth embodiment of the present invention.

An arrangement for outputting a result of padding processing in units of four pixels will be examined here. FIG. 15 is a block diagram showing the arrangement of an image processing section according to the eighth embodiment of the present invention. An image processing section 600 has an arrangement for executing padding processing for row data formed from eight pixel data and outputting the result in units of four pixels. The image processing section 600 can be suitably used as part of an image processing apparatus such as a computer.

In the image processing section 600 of this embodiment, shape information is used as a control signal for switching each selector of a left propagation processing section 321 and right propagation processing section 323. The arrangement related to the shape information is the same as that of the image processing section shown in FIG. 14 and is therefore not illustrated in FIG. 15.

Referring to FIG. 15, a selector group (selection means) 601 selects data to be supplied to calculators for calculating average values. The selector group 601 switches data to be supplied to calculators 501 to 504 such that the calculators 501 to 504 process the eight pixel data in units of four pixel data. For example, data for generating the pixel data at the right end or data for generating the fifth pixel data from the right end is selectively supplied to the calculator 501 by a corresponding selector in the selector group 601.

For example, to execute padding processing for row data formed from 16 pixel data and output the result in units of four pixels, the selector group is controlled to change each selector in the selector group 601 from 2 inputs to 4 inputs such that, for example, the first to fourth pixel data are output from the calculators 501 to 504 in the first cycle (first stage), the fifth to eighth pixel data are output from the calculators 501 to 504 in the second cycle (second stage), the ninth to 12th pixel data are output from the calculators 501 to 504 in the third cycle (third stage), and the 13th to 16th pixel data are output from the calculators 501 to 504 in the fourth cycle (fourth stage).

[Ninth Embodiment]

In this embodiment, the seventh and eighth embodiments are combined. This further decreases the number of calculators and reduces the entire circuit scale.

Figure 16:
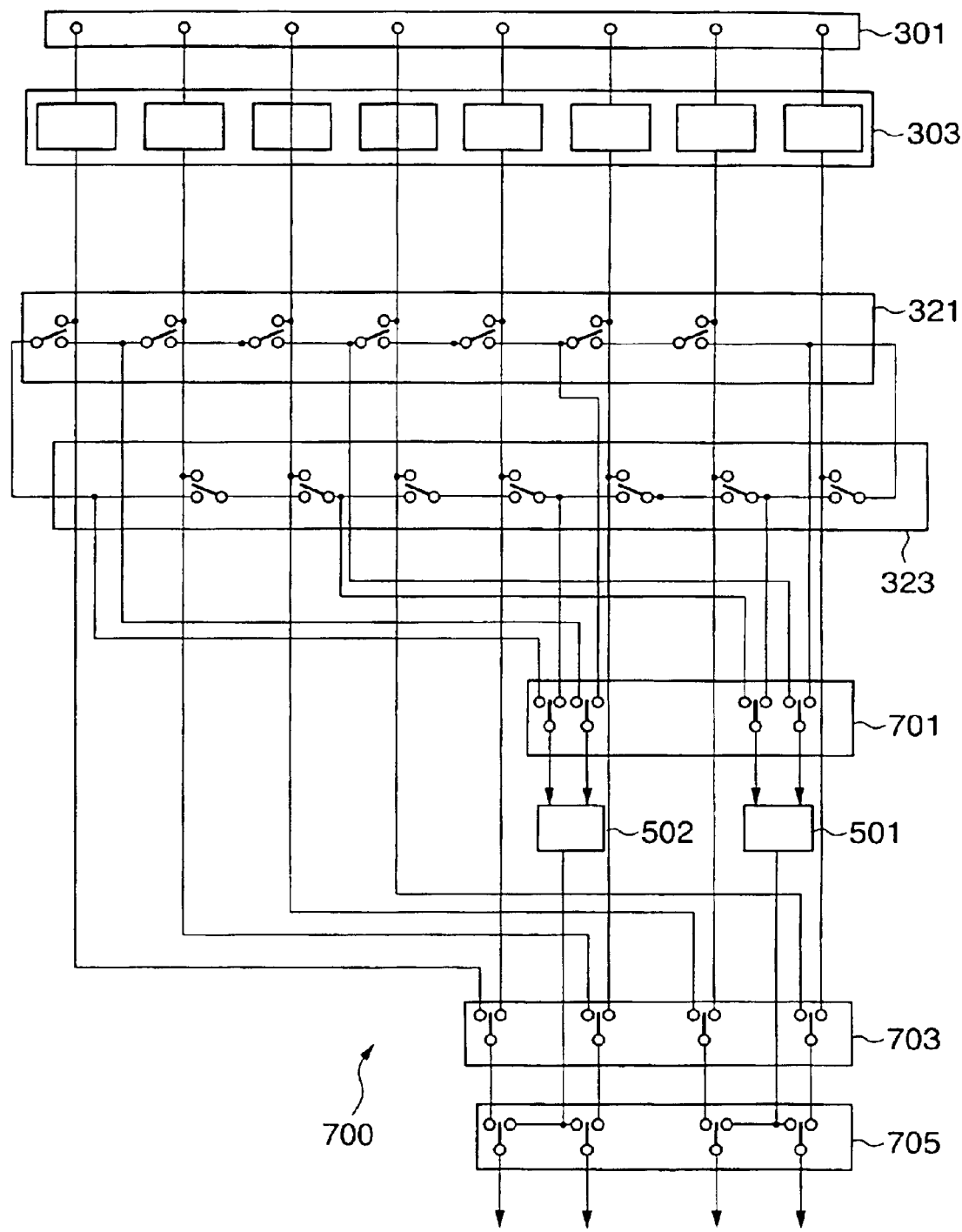
FIG. 16 is a block diagram showing the arrangement of an image processing section according to the ninth embodiment of the present invention.

FIG. 16 is a block diagram showing the arrangement of an image processing section according to the ninth embodiment of the present invention. An image processing section 700 can be suitably used as part of an image processing apparatus such as a computer.

In the image processing section 700 shown in FIG. 16, a selector group (selection means) 701 selects data to be supplied to calculators 501 and 502 in accordance with a switching signal for switching between the first cycle in which the output pixel data of the four pixels on the right side are generated and the second cycle in which output pixel data of four pixels on the left side are generated. The selector group 701 corresponds to the selector group 601 of the eighth embodiment. A selector group 703 selectively outputs the four pixels on the right side or four pixels on the left side out of the pixel data (input pixel data) before padding processing in accordance with the switching signal. A selector group (determination means) 705 selects an output from the selector group 703 when corresponding shape information is "1" and selects the average value calculated by the calculators 501 and 502 when corresponding shape information is "0". The remaining components are the same as those with the same reference numerals in FIG. 15.

The selector group 705 is switched in accordance with shape information. The arrangement related to the shape information is the same as the seventh embodiment.

The main difference between the ninth embodiment and the seventh embodiment is as follows. In the seventh embodiment, one calculator is assigned to the 2nth and (2n+1)th pixels from the right end. In the ninth embodiment, however, one calculator is assigned to the (2n−1)th and 2nth pixels from the right end.

Although such an assignment scheme can also be used in the seventh embodiment, it is more efficient in the seventh embodiment to assign one calculator to two of the remaining pixels excluding the left- and right-end pixels because the average value need not be used as data to be replaced with the pixel data at the left and right ends of the row data (for example, four calculators are prepared for row data formed from 10 pixels).

In the ninth embodiment, since pixel data with shape information "0" is replaced with the average value while partially selecting (looking up) the plurality of pixel data, the data at the left and right ends (left- and right-end data of four data), which should be supplied to the calculators 501 and 502 may receive data that are indispensable to calculate the average value. Hence, one calculator must be uniformly assigned to every two pixels of the four pixels to be simultaneously processed.

To calculate the average value between pixel data which propagates from the first pixel to the second pixel in a left propagation processing section 321 and pixel data which propagates from the second pixel to the first pixel in a right propagation processing section 323, the two data are supplied to the selector group 701 as a set (first set).

In a similar way, a set (second set) of pixel data which propagates from the third pixel to the fourth pixel from the right end and pixel data which propagates from the fourth pixel to the third pixel from the right end, a set (third set) of pixel data which propagates from the fifth pixel to the sixth pixel from the right end and pixel data which propagates from the sixth pixel to the fifth pixel from the right end, and a set (fourth set) of pixel data which propagates from the seventh pixel to the eighth pixel from the right end and pixel data which propagates from the eighth pixel to the seventh pixel from the right end are selectively supplied to the selector group 701.

Of the eight pixels, in accordance with which of the four pixels on the right side and the four pixels on the left side are to be processed, i.e., in accordance with the switching signal, the selector group 701 selects two sets (first and second sets or third and fourth sets) from the four sets and supplies the data to the calculators 501 and 502.

The calculators 501 and 502 calculate the average values for the selected two sets of pixel data and output the average values. When shape information is "0", a corresponding selector in the selector group 705 selects the average value output from the calculator. When shape information is "1", corresponding selectors in the selector groups 703 and 705 select the original input pixel data. Thus, the padding processing result is output in units of four pixels.

[10th Embodiment]

In the above seventh to ninth embodiments, pixel data which construct image data having a predetermined size are processed in a fixed number of cycles (stages). The 10th embodiment is related to an arrangement for changing the number of processing cycles in accordance with the pattern of input binary shape information.

In the seventh embodiment, all input pixel data can be simultaneously processed independently of the pattern of shape information. This is because calculators the number of which is enough to simultaneously process all input pixel data in correspondence with arbitrary shape information are prepared. This means that if the number of calculators is smaller even by one, all input pixel data cannot be simultaneously processed in some cases. Whether simultaneous processing can be performed is determined by the arrangement of the processing circuit and the pattern of shape information.

In the 10th embodiment, calculators are prepared in only number smaller than the necessary and minimum number enough to simultaneously process all input pixel data in correspondence with arbitrary shape information. When simultaneous processing is possible, simultaneous processing is executed and ended in one cycle (first stage). Only when simultaneous processing is impossible, unprocessed pixels are processed in the second cycle (second stage).

In this embodiment, it is detected whether the pattern of shape information allows simultaneous processing, and pixels which cannot be simultaneously processed are detected, and the unprocessed pixels are processed in the second cycle.

Figure 17:
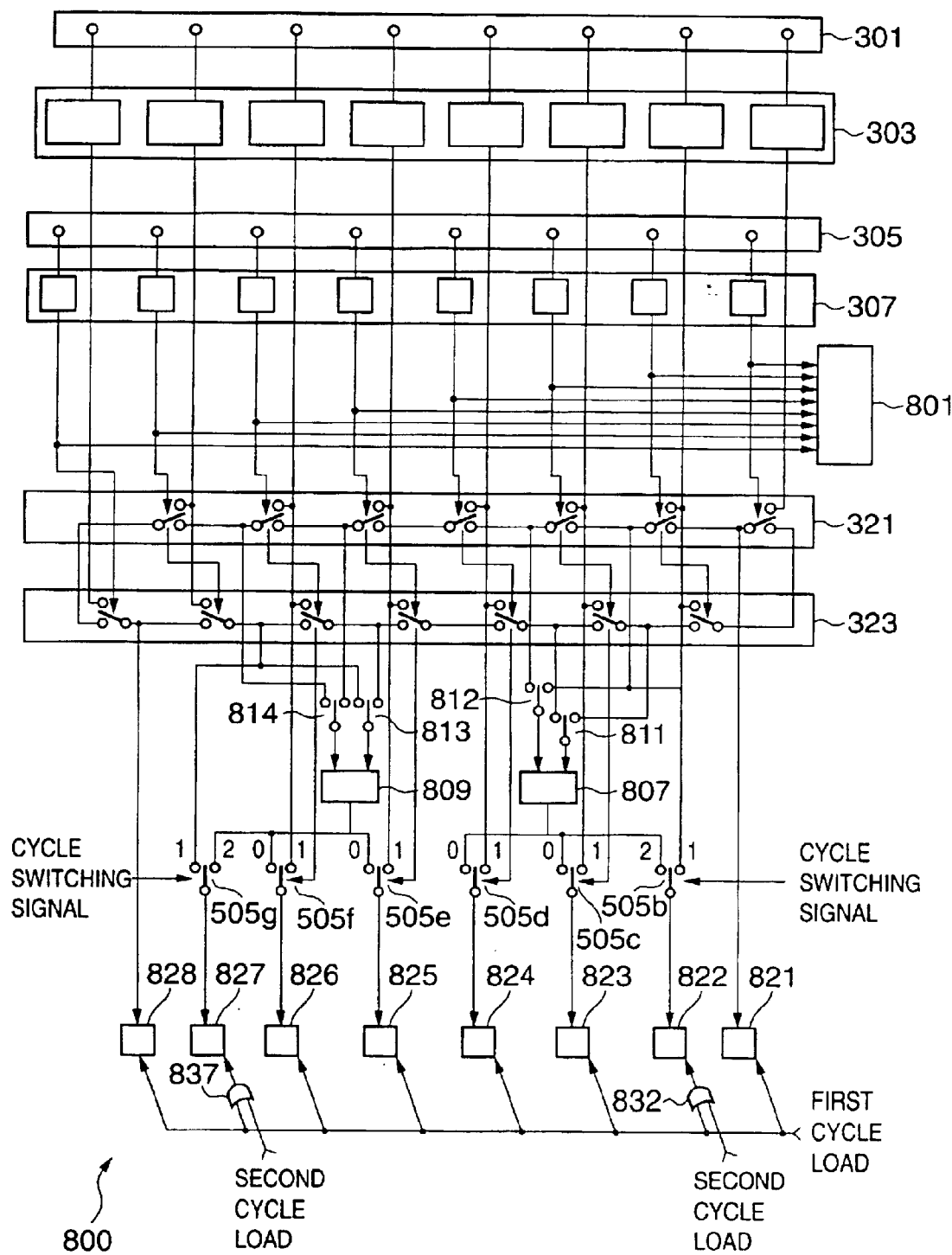
FIG. 17 is a block diagram showing the arrangement of an image processing apparatus according to the 10th embodiment of the present invention.

FIG. 17 is a block diagram showing the arrangement of an image processing apparatus according to the 10th embodiment of the present invention. An image processing section 800 can be suitably used as part of an image processing apparatus such as a computer.

Figure 20:
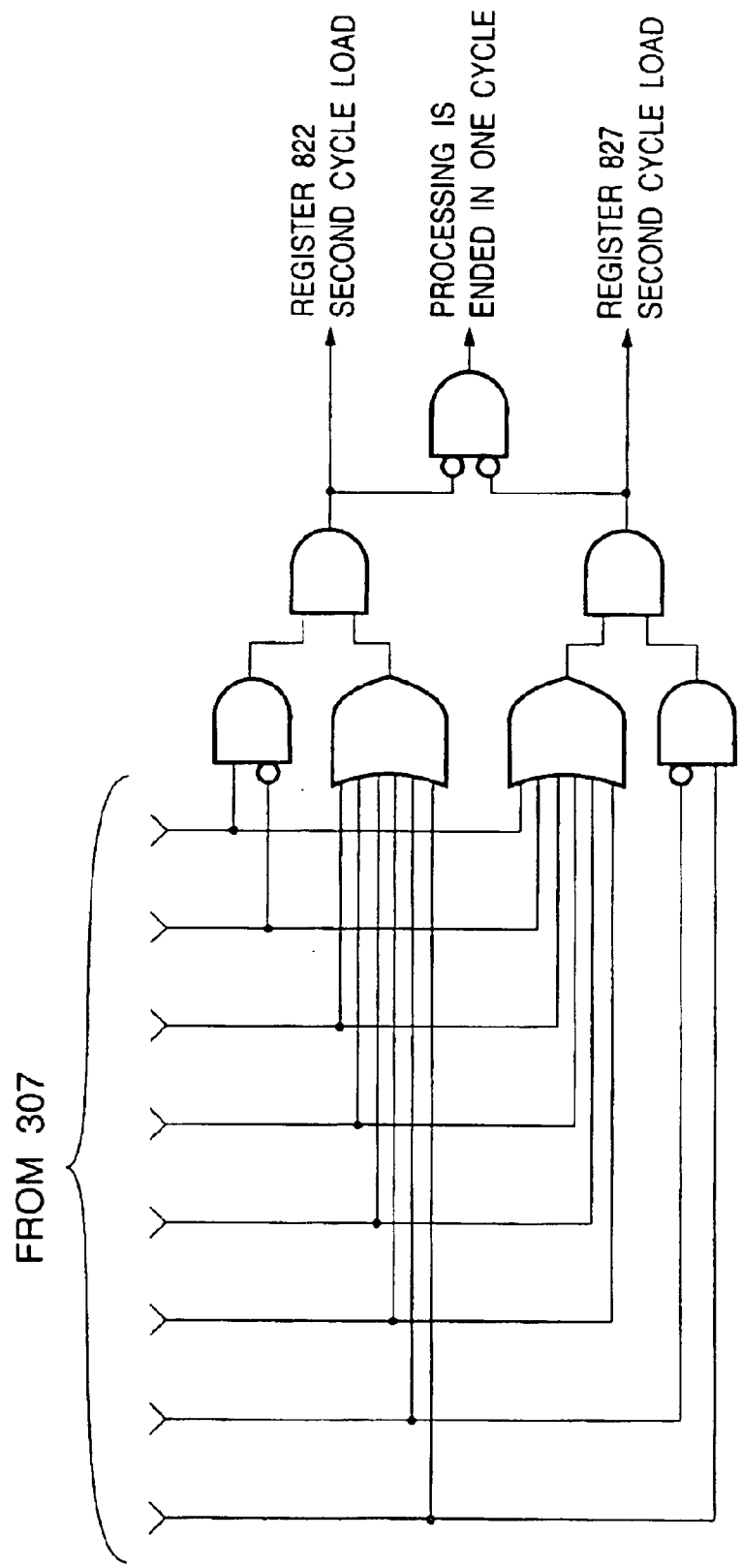
FIG. 20 is a circuit diagram showing the arrangement of a detector 801 in the 10th embodiment.

The image processing section 800 is a padding processing circuit for eight pixels. A detector (control means; details are shown in FIG. 20) 801 detects whether all the eight pixel data can be processed in one cycle and also specifies pixel data to be processed in the second cycle and sent to registers. Calculators 807 and 809 calculate the average values of pixel data, Selectors (selection means) 811 and 812 select two data to be supplied to the calculator 807. Selectors (selection means) 813 and 814 select two data to be supplied to the calculator 809. Registers 821 to 828 hold output pixel data. Logic elements 832 and 837 generate a control signal for controlling reception of data. The remaining components are the same as those with the same reference numerals in the seventh embodiment (FIG. 14).

The selectors 811 to 814 that are introduced in this embodiment are controlled in accordance with the processing cycle. That is, the selectors 811 to 814 are controlled to select one in the first cycle and the other in the second cycle.

To simultaneously process eight pixels by padding processing, three calculators are necessary, as is apparent from the above description. In this embodiment, processing is executed using the two calculators 807 and 809, i.e., calculators in number smaller by one.

In the first cycle (first stage), one of the two calculators 807 and 809 is assigned to the third and fourth pixels from the right end, and the other is assigned to the fifth and sixth pixels from the right end.

A selector 505*b* for selecting the processing result for the second pixel from the right end receives the output (average value) from the calculator 807 assigned to the third and fourth pixels from the right end. A selector 505*g* for selecting the processing result for the seventh pixel from the right end receives the output (average value) from the calculator 809 assigned to the fifth and sixth pixels from the right end.

The two selectors 505*b* and 505*g* select the outputs from corresponding selectors in a left propagation processing section 321 or right propagation processing section 323 in the first cycle (first stage) and select the outputs from the calculators in the second cycle (second stage).

The following pieces of shape information (a) and pixel data (b) are input to the image processing section 800.

| (a) | 1 | 0 | 0 | 0 | 0 | 1 | 0 | 0 |
|---|---|---|---|---|---|---|---|---|
| (b) | 156 | | | | | 42 | | |

By processing in the first cycle, the following values are received by the registers 821 to 828 (the left end corresponds to the register 828, and the right end corresponds to the register 821).

| (c) | 156 | 156 | 99 | 99 | 99 | 42 | 42 | 42 |
|---|---|---|---|---|---|---|---|---|

At this time, both the two calculators 807 and 809 output "99".

In the second cycle, the data to be selected by the selectors 505*b* and 505*g* are switched, and the following values are supplied to the registers 821 to 828 (the left end corresponds to the register 828, and the right end corresponds to the register 821).

| (d) | 156 | 99 | 99 | 99 | 99 | 42 | 99 | 42 |
|---|---|---|---|---|---|---|---|---|

Of these data, only "99" of the seventh pixel from the right end (second pixel from the left end) is actually received by the register. Final outputs from the registers 821 to 828 are as follows (the left end corresponds to the register 828, and the right end corresponds to the register 821).

| (e) | 156 | 99 | 99 | 99 | 99 | 42 | 42 | 42 |
|---|---|---|---|---|---|---|---|---|

In the image processing section 800 of this embodiment, padding processing is not ended in one cycle for the following two shape information patterns.
(1) Two bits at the right end are "01", and six bits on the left side include at least one "1".
(2) Two bits at the left end are "10", and six bits on the right side include at least one "1".

The patterns (1) and (2) indicate that each of the pixel data of the second and seventh pixels from the right ends must be replaced with the average value of the two pixel data.

The detector 801 detects the pattern (1) or (2) from input shape information. When at least one of the patterns is detected, the second cycle is executed next to the first cycle. For the pattern (1), only the register 822 on the output side corresponding to the second pixel from the right end is caused to receive the output from the selector 505*b* in the second cycle. For the pattern (2), only the register 827 on the output side corresponding to the seventh pixel from the right end is caused to receive the output from the selector 505*g* in the second cycle.

When both the patterns (1) and (2) are detected by the detector 801, both the registers 822 and 827 corresponding to the second and seventh pixels are caused to receive the outputs from the selectors 505*b* and 505*g* in the second cycle.

When neither the pattern (1) nor (2) are detected, the processing is ended in the first cycle, and the next row data (or column data) is processed.

[11th Embodiment]

Figure 18:
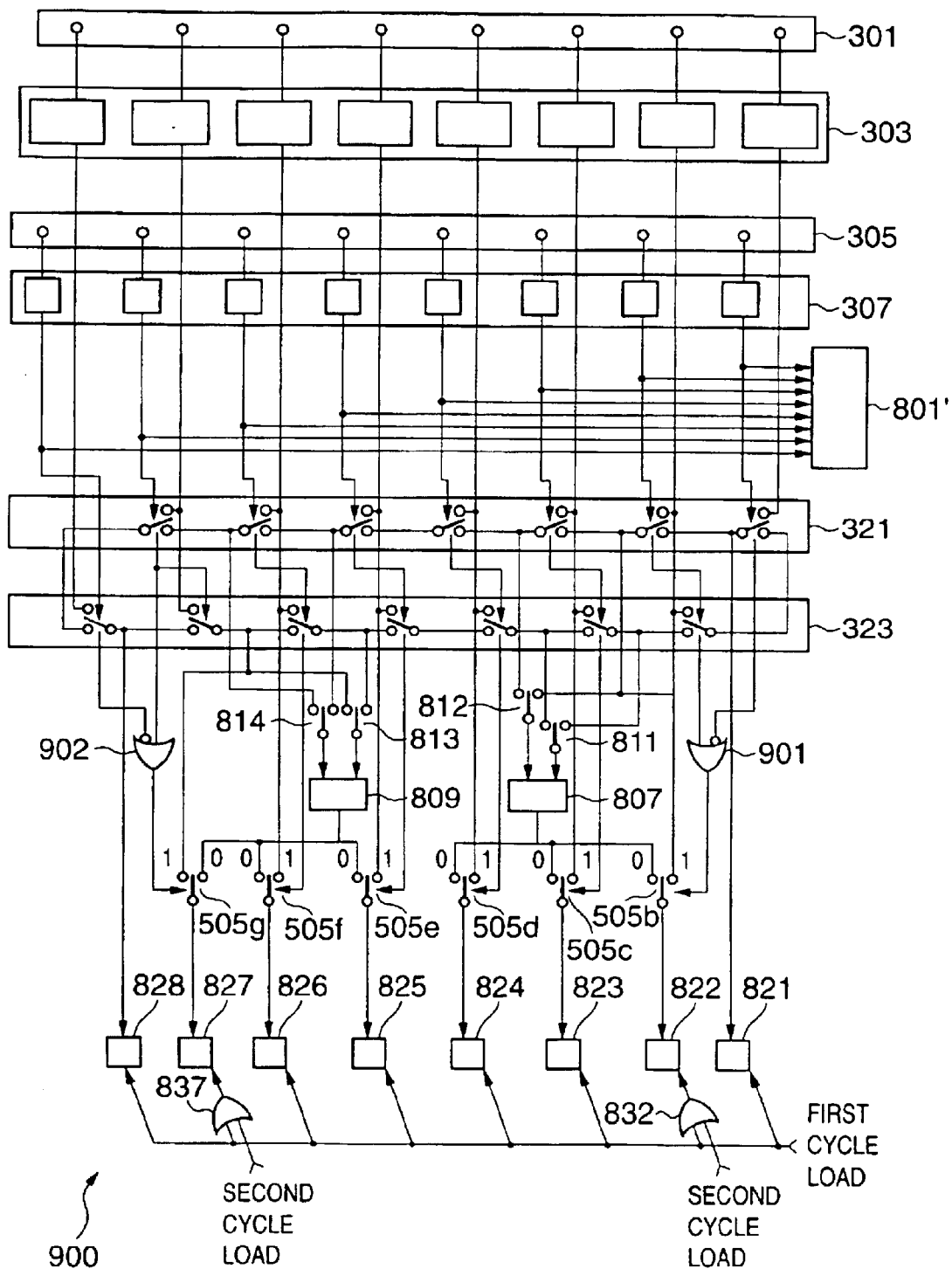
FIG. 18 is a block diagram showing the arrangement of an image processing section according to the 11th embodiment of the present invention.

This embodiment is related to a modification to the 10th embodiment. FIG. 18 is a block diagram showing the arrangement of an image processing section according to the 11th embodiment of the present invention.

This embodiment (FIG. 18) and the 10th embodiment (FIG. 17) are different in the switching signal for controlling selectors 505*b* and 505*g* and the contents to be detected by a detector 801.

In the 11th embodiment, detectors 901 and 902 are added. The selector 505*b* is switched by the output from the detector 901, and the selector 505*g* is switched by the output from the selector 505*g*.

Figure 21:
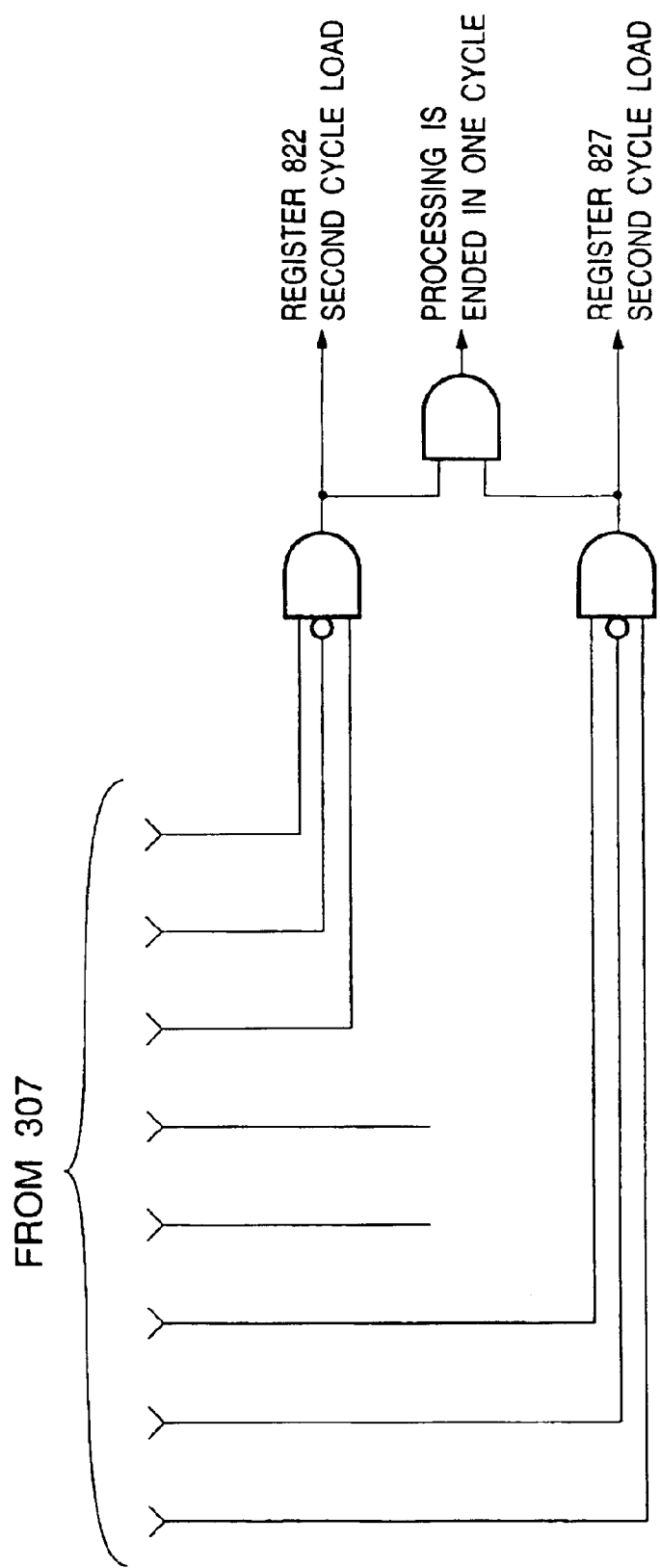
FIG. 21 is a circuit diagram showing the arrangement of a detector 801' in the 11th embodiment.

In this embodiment, padding processing is not ended in one cycle for the following two shape information patterns, which are detected by a detector 801' (control means; details are shown in FIG. 21).
(1) Three bits at the right end are "101".
(2) Three bits at the left end are "101".

Processing after the detector 801' detects the pattern is the same as in the 10th embodiment.

Even when the second pixel data from each end is to be replaced with the average value, the average value calculated for an adjacent pixel can be used as long as the second pixel data is not isolated (the pixel is not a position sandwiched by shape information "1"). Hence, the padding processing is ended in one cycle. However, when the pixel to be replaced is isolated, the average value to be replaced with the isolated pixel must be calculated in the second cycle, so the padding processing requires the second cycle. The two patterns indicate a case wherein the average value to be replaced with the isolated pixel must be calculated.

On the other hand, the detector 901 controls the selector 505*b* upon detecting the following pattern (A). (A) Shape information for the second bit from the right end is "1", or shape information at the right end is "0".

When the pattern (A) is detected, the second pixel data from the right end is not replaced with the average value, and the output from a corresponding selector in a left propagation processing section 321 is the padding processing result.

Except the pattern (A), the average value output from a calculator 807 is selected by the selector 505*b*. The output of the average value is not convenient when all the remaining six bits on the left side are "0". However, in this case, since the two data input to the calculator 807 are identical, the identical data is eventually selected, and such inconvenience is not posed. This will be described using a detailed example.

Assume that the following pieces of shape information (a) and pixel data (b) are input.

| (a) | 0 | 0 | 0 | 0 | 0 | 0 | 0 | 1 |
| (b) |   |   |   |   |   |   |   | 156 |

In this case, since the pieces of shape information for the two bits at the right end do not correspond to the pattern (A), the selector 505*b* for selecting the second output pixel data from the right end selects the value (average value) output from the calculator 807. The two inputs to the calculator are supplied from the left propagation processing section 321 and right propagation processing section 323. Since both values are "156", the output from the calculator 807 is "156". Hence, even when the selector 505*b* on the output side selects the output from the calculator 807, the pixel data is replaced with "156".

This also applies to the relationship between the detector 902 and the selector 505*g*.

[12th Embodiment]

In this embodiment, the layout (assignment) of calculators and the arrangement of selectors on the output side are partially changed, and input data to each calculator is switched on the basis of the pattern of shape information such that the number of patterns that allow simultaneous processing is maximized without increasing the number of calculators in the 10th and 11th embodiments (in the 10th and 11th embodiments, input data to each calculator is switched in accordance with the processing cycle).

Figure 19:
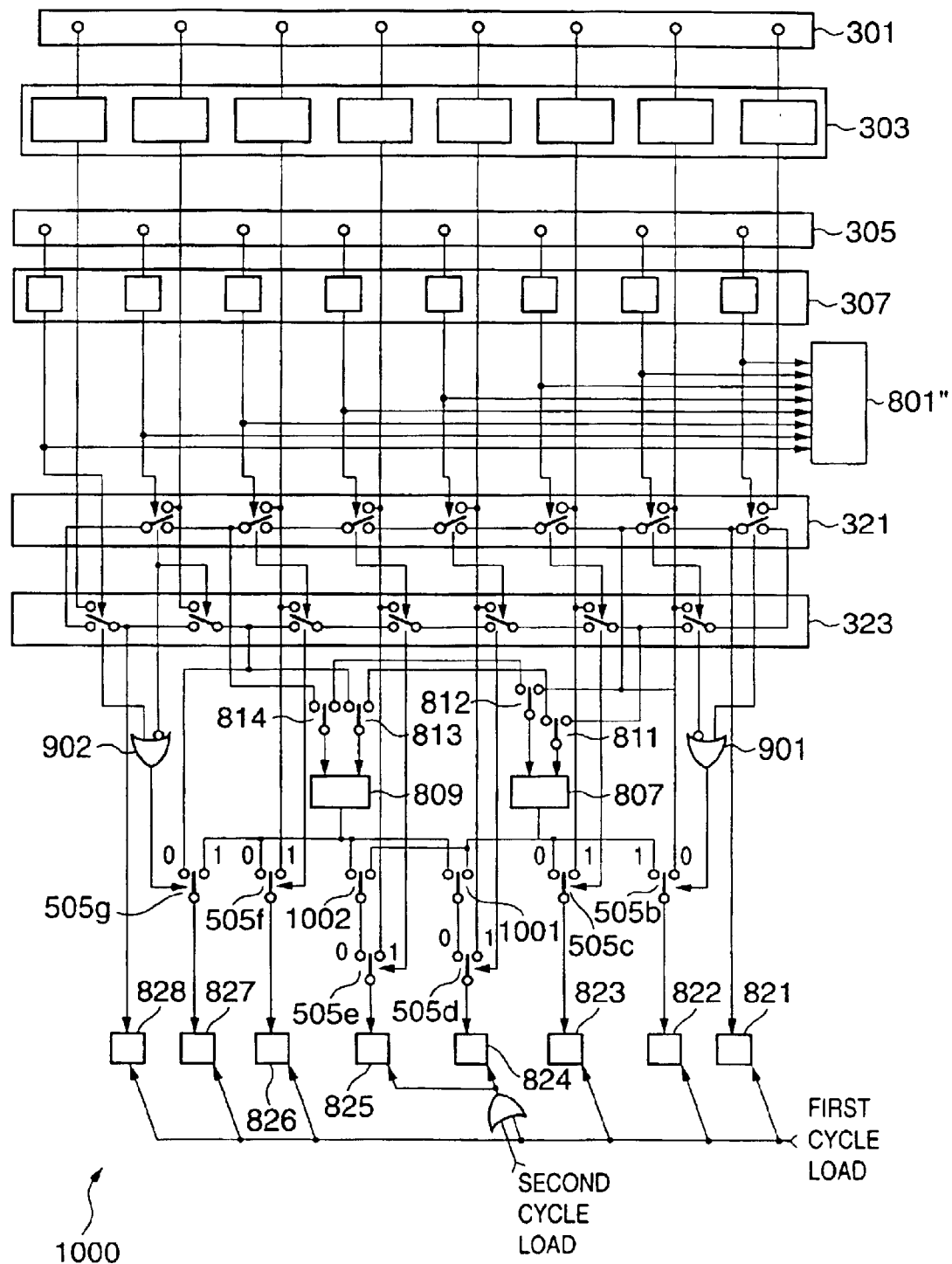
FIG. 19 is a block diagram showing the arrangement of an image processing section according to the 12th embodiment of the present invention.

FIG. 19 is a block diagram showing the arrangement of an image processing section according to the 12th embodiment of the present invention. An image processing section 1000 can be suitably used as part of an image processing apparatus such as a computer.

Referring to FIG. 19, selectors 1001 and 1002 are newly added. The pixel data of two pixels at the center can be obtained by selecting the outputs from two calculators 807 and 809 by the selectors 1001 and 1002.

Figure 22:
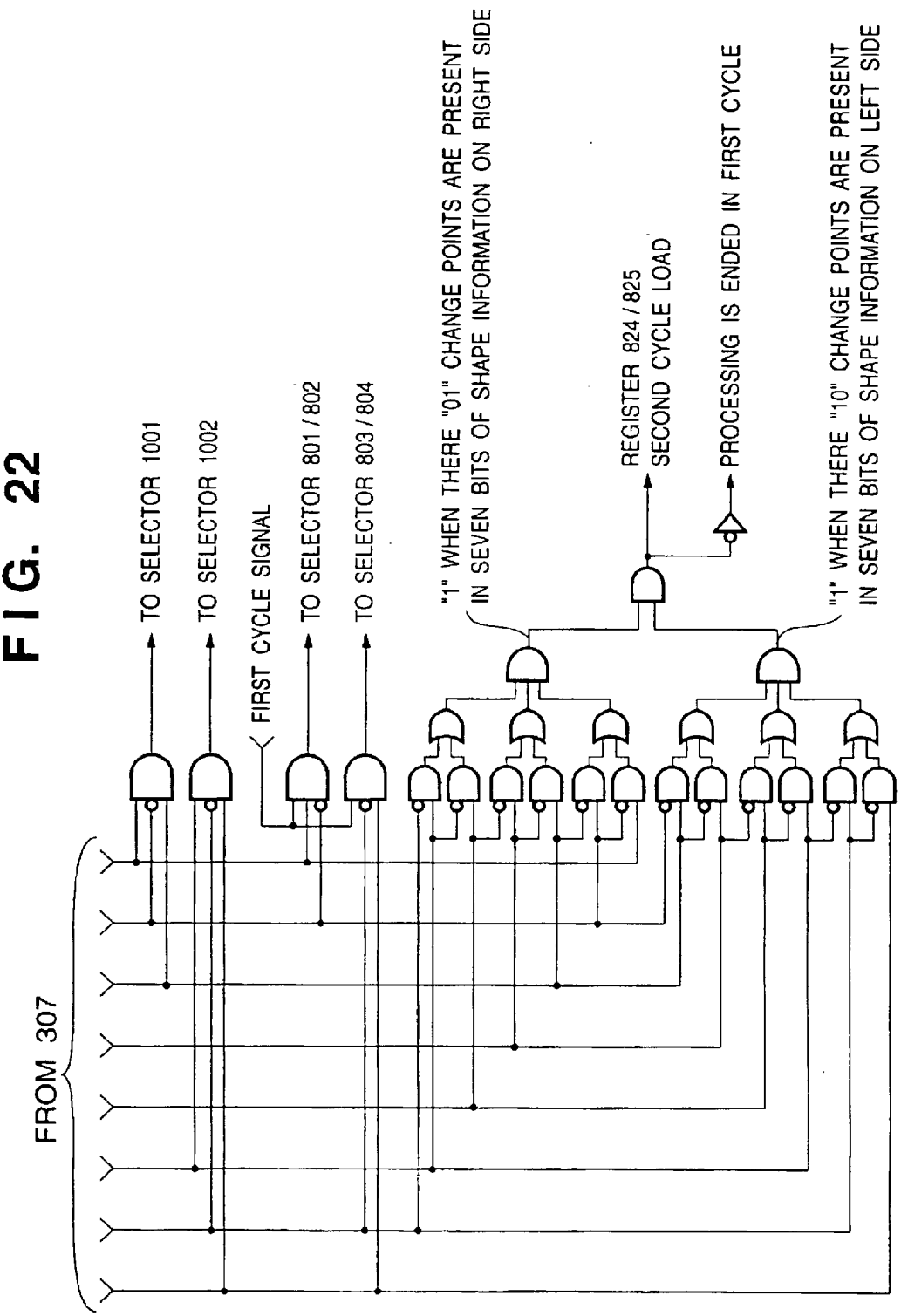
FIG. 22 is a circuit diagram showing the arrangement of a detector 801" in the 12th embodiment.

In addition to the patterns (1) and (2) detected in the 11th embodiment, the following pattern (3) is detected by a detector 801" (control means; details are shown in FIG. 22).
(3) Seven bits on the right side of shape information include three "01" change points, and seven bits on the left side of shape information include three "10" change points. Detailed patterns are as follows.
(A) 1010101—
(B) 101010-1
(C) 10101-01
(D) 1010-101
(E) 101-0101
(F) 10-10101
(G) 1-010101
(H) -1010101

In the above eight patterns, "-" can be either "0" or "1".

The detector 801" detects the patterns described in (A) to (H). When the patterns are detected, one row data is processed in two cycles. Otherwise, one row data is processed in one cycle.

In the calculator assignment scheme described in the seventh embodiment, one calculator is assigned to the 2nth and (2n+1)th pixels from the right end. In this assignment scheme, when the number of pixel data that construct one-dimensional image data to be processed is eight, three calculators are necessary.

In the 12th embodiment, a scheme complying with the above assignment scheme is employed. In this embodiment, however, since only two calculators are provided, these two calculators are operated in place of three calculators. This is implemented by switching data to be supplied to the two calculators by selectors.

Various methods can be used to switch the data by selectors. A relatively easy method will be described below.

In the switching scheme to be described here, processing executed in the second cycle in the eleventh embodiment, i.e., processing of second and seventh pixel data from the right end is preferentially executed. More specifically, when the two bits at the right end of shape information are "01", and the processing is in the first cycle, the selectors 811 and 812 are set to the right side to process the second pixel data from the right end. Otherwise, the selectors 811 and 812 are set to the left side. When the two bits at the right end of shape information are "01", the second pixel data from the right end must be replaced with the calculated average value, so the processing therefor is preferentially executed.

Similarly, when two bits at the left end are "10", and the processing is in the first cycle, the selectors 813 and 814 are set to the left side to process the seventh pixel data from the right end. Otherwise, the selectors 813 and 814 are set to the right side.

Out of the selectors on the output side of the calculators 807 and 809, the same selectors as in the fifth embodiment use the same switching method as in the fifth embodiment.

The selectors 1001 and 1002 introduced in this embodiment are controlled in the following way. If three bits at the right end of shape information are "101", the selector 1001 is made to select the output from the calculator 809 because the calculator 807 is used to calculate the average value corresponding to the second pixel from the right end.

Otherwise, the selector 1001 is made to select the output from the calculator 807.

If three bits at the left end of shape information are "101", the selector 1002 is made to select the output from the calculator 807. Otherwise, the selector 1002 is made to select the output from the calculator 809.

The selectors 1001 and 1002 output average values to be replaced with the original pixel data when the values of shape information of corresponding pixels are "0".

A shape information pattern for which processing in one cycle is enabled by the above arrangement and control will be described (in the 11th embodiment, patterns that cannot be processed in one cycle).

For example, shape information "10000101" cannot be processed in one cycle in the 11th embodiment. In the 12th embodiment, the average value corresponding to the second pixel from the right end is calculated by one calculator 807, and the average value corresponding to the two pixels (sixth and seventh pixels) at the left end is calculated by the other calculator 809. The latter average value can also be used to replace the fourth and fifth pixel data.

The output from the calculator 809 is output to the fourth pixel through the selectors 1001 and 505*d* and also output to the fifth pixel through the selectors 1002 and 505*e*. The detector 801" detects that the pattern can be processed in one cycle.

Hence, in the above shape information pattern ("10000101"), since the average values necessary to replace all pixel data having shape information "0" can be calculated in one cycle, and selectors necessary to replace pixel data with the average values and a means for controlling the selector are arranged, the processing can be completed in one cycle.

With this arrangement, any pattern can be processed in one cycle except the patterns (A) to (H) which require three calculators. The patterns (A) to (H) can theoretically exist, though they are rarely present as shape information of actual image data. Hence, according to the 12th embodiment, almost all image data can be processed in one cycle.

The padding processing image processing sections in the above-described seventh to 12th embodiments can be applied to encode/decode an image. In application to encoding, the apparatus has the same arrangement as in FIG. 8 described above. In application to decoding, the apparatus has the same arrangement as in FIG. 9 described above. That is, the image processing section described in one of the seventh to 12th embodiments is used as the padding device 17 in FIG. 8 or padding device 63 in FIG. 9.

As described above, according to the seventh to 12th embodiments, the scale of the apparatus required for padding processing can be reduced.

[13th Embodiment]

The 13th embodiment of the present invention provides a padding processing circuit for outputting a padding processing result for one pixel in each cycle.

Figure 23:
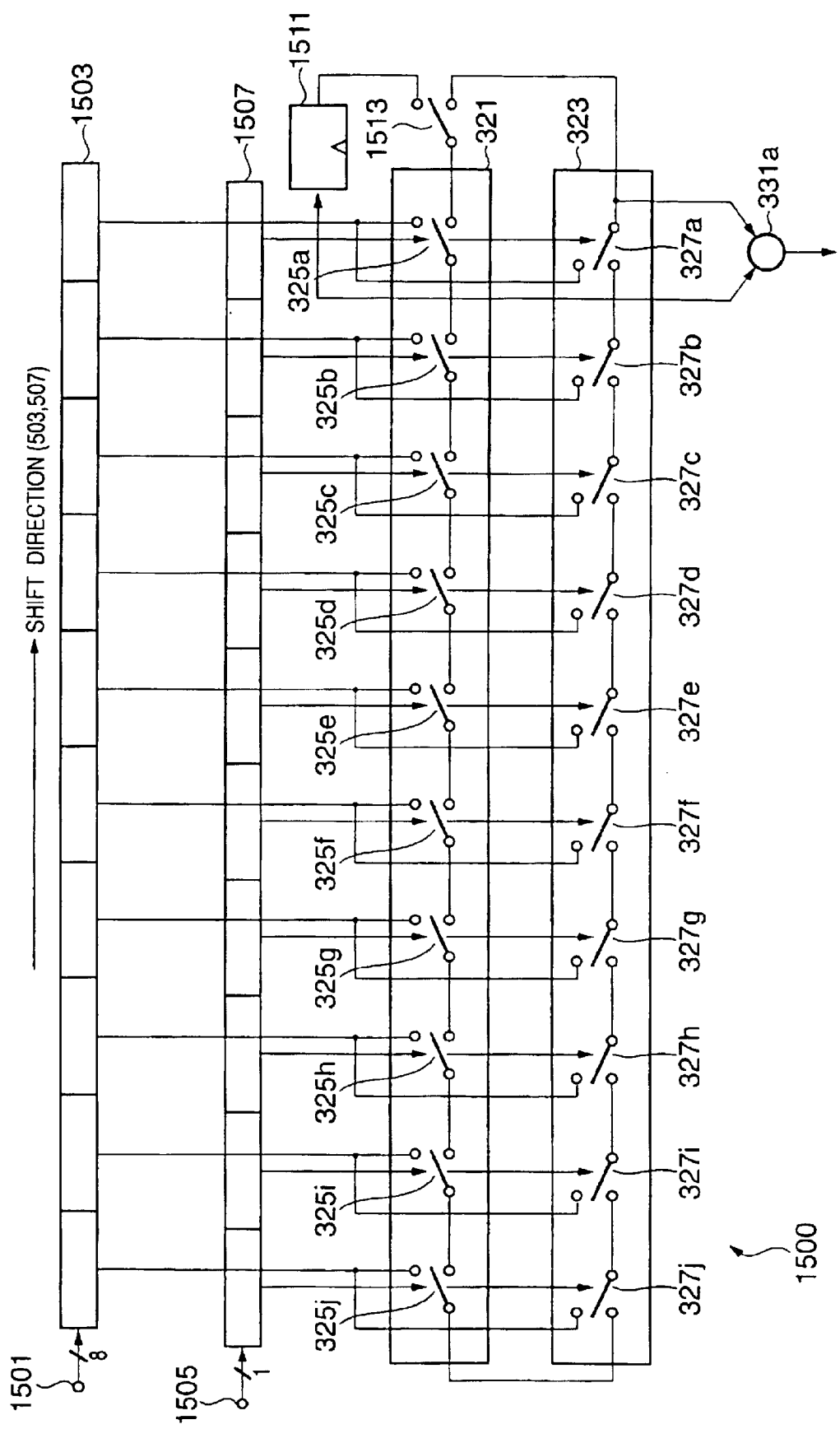
FIG. 23 is a block diagram showing the arrangement of an image processing section according to the 13th embodiment of the present invention.

FIG. 23 is a block diagram showing the arrangement of an image processing section according to the 13th embodiment of the present invention. An image processing section 1500 can be suitably used as part of an image processing apparatus such as a computer. Referring to FIG. 23, a terminal 1501 inputs pixel data to be subjected to padding processing one by one. An 8-bit wide shift register 1503 holds pixel data and shifts them in every processing cycle. A terminal 1505 inputs shape information (attribute data) bits one by one. A 1-bit wide shift register 1507 holds shape information and shifts them in every processing cycle. A register (data padding register) 1511 holds propagation data. A selector 1513 selects the output from the register 1511 as needed.

The remaining components are the same as those with the same reference numerals in FIG. 12.

The image processing section 1500 according to this embodiment shifts pixel data held in the shift register 1503 to the right by one pixel and outputs pixel data after padding processing, which corresponds to the rightmost pixel data in the shift register 1503, in every cycle.

Before the first pixel data that has undergone the padding processing is output, pixel data of one row to be subjected to padding processing are input from the terminal 1501 and held in the shift register 1503. The number of pixels of one row for which padding processing can be executed by the circuit of this scale is 10 at maximum.

Simultaneously with input of the pixel data to the shift register 1503, pieces of shape information are input to the terminal 1501 and held in the shift register 1507.

The selector 1513 selects pixel data output from a right propagation processing section 323 only when padding processing for the first pixel data of the image data of one row is executed, and selects pixel data output from the register 1511 in the processing for the second and subsequent pixels. Input signals to a left propagation processing section 321 and right propagation processing section 323 and their internal states are the same as in the image processing section shown in FIG. 12. Hence, pixel data supplied to a calculator 331*a* is also the same as in the image processing section shown in FIG. 12.

In accordance with the above procedure, the first pixel data that has undergone the padding processing is output from the calculator 331*a*. The output terminal of a selector 325*a* is also connected to the input terminal of the register 1511.

In the next processing cycle (processing cycle for the second pixel), the data held in the shift registers 1503 and 1507 are shifted to the right by one pixel. Simultaneously, the register 1511 receives data output from the selector 325*a* in the preceding cycle.

After the pixel data and shape information of one row are input, "0" is input to the terminal 1505. However, input to the terminal 1501 is neglected. Pixel data which construct the image data of a row to be subjected to the padding processing next are input to the terminal 1501.

The data received by the register 1511 is selected by the selector 1513 and input to the left propagation processing section 321. In the current cycle, the selector 325*a* receives the output from the selector 325*a* in the preceding cycle and the second data from the right end in the shift registers 1503 and 1507 in the preceding cycle (data at the right end in the shift registers 1503 and 1507 in the current cycle). Hence, the output from the selector 325*a* is the same as the output from a selector 325*b* in the preceding cycle, i.e., the same as the output from the selector 325*b* shown in FIG. 12.

On the other hand, when shape information having a value "0" is input from the terminal 1505, selectors 325*j* and 327*j* so operate as to select the selector outputs on the input sides and propagate the pixel data. For this reason, the presence of the selectors 325*j* and 327*j* can be neglected, so the input and output with respect to a selector 327*a* in the right propagation processing section 323 are the same as those with respect to a selector 327*b* in the preceding cycle. The inputs and outputs with respect to the remaining selectors in the left and right propagation processing sections 321 and 323 are also the same as those with respect to selectors on the left side in the preceding cycle.

Since the input to the calculator 331*a* in the current cycle is the same as the input to a calculator 331*b* in FIG. 12 in the preceding cycle, the pixel data output from the calculator 331*a* is the padding processing result for the second pixel of the row data.

In the next cycle (processing cycle for the third pixel), the contents in the shift registers 1503 and 1507 are shifted to the right by one pixel. Accordingly, the input/output states of the selectors in the left and right propagation processing sections 321 and 323 are also shifted to the right by one pixel.

Hence, in this cycle, the padding processing result for the third pixel data is output from the calculator 331a. In the next cycle, the padding processing result for the fourth pixel data is output from the calculator 331a. In this way, the padding processing result for one pixel is output in every cycle. The padding processing results for one row, i.e., the first to 10th pixels are continuously output.

In the next cycle (cycle after the padding processing for image data of one row is ended), pixel data of one row to be processed next are stored in the shift register 1503, though all "0"s are held in the shift register 1507.

While holding the contents in the shift register 1503, only pieces of shape information are input to the shift register 1507 to prepare for the padding processing for the next row.

The pieces of shape information have a total information amount of about 2 bytes. Preferably, a buffer (shift register) is arranged on the input side of the terminal 1505, the pieces of shape information are loaded to the buffer in one cycle, these information bits are serially read out from the buffer one by one and supplied to the terminal 1505, thereby transferring the shape information to the shift register 1507 at a high speed.

[14th Embodiment]

In an image processing section according to the 14th embodiment, shape information storage processing into a shift register 1507 is executed at a higher speed. In the 13th embodiment, pixel data can be continuously input to the shift register 1503 without any waste, though as for input of shape information, shape information of the next row cannot be input unless padding processing for one row is completed. This is because "0" must be input during the padding processing, as described above.

Figure 24:
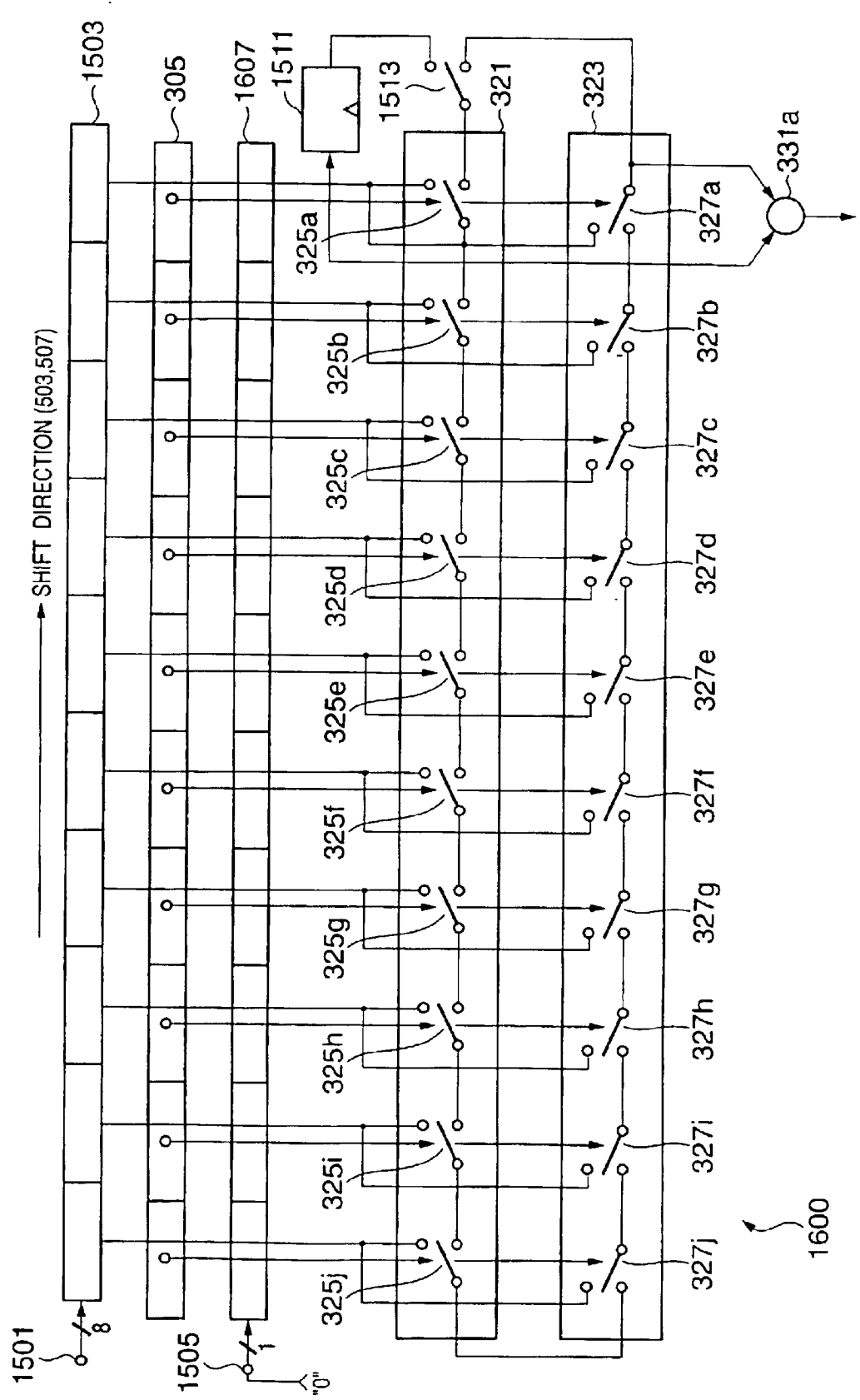
FIG. 24 is a block diagram showing the arrangement of an image processing section according to the 14th embodiment of the present invention.

FIG. 24 is a block diagram showing the arrangement of an image processing section according to the 14th embodiment of the present invention. An image processing section 1600 can be suitably used as part of an image processing apparatus such as a computer. In this embodiment, a new shift register 1607 having a parallel load function is arranged in place of the shift register 1507 of the 13th embodiment, and terminals 305 (FIG. 12) for parallelly inputting pieces of shape information corresponding to image data of one row are arranged. The remaining components are the same as in the 13th embodiment.

In the 14th embodiment, pieces of shape information are parallelly input from the terminals 305 to the shift register 1607, and a terminal 1505 is fixed to "0". At a timing when the last pixel data of the image data of one row is input to the shift register 1503, the pieces of shape information parallelly input to the terminals 305 are input (loaded) to the shift register 1607. During padding processing for the pixel data of one row, the pieces of shape information are shifted to the right in every cycle, and "0" is input from the terminal 1505.

The processing timing, internal states, and output data are the same as in the 13th embodiment except that the pieces of shape information are input from the terminals 305 to the shift register 1607.

When the padding processing for one row is ended, and the padding processing for the next row starts, the last pixel data of the image data of the next row is input to the terminal 1501, and simultaneously, pieces of shape information corresponding to the image data are loaded from the terminals 305 to the shift register 1607.

This eliminates the wasteful time required to shift-input only the shape information later, so the padding processing can be continuously executed.

In the arrangement shown in FIG. 24, padding processing can be executed for 10 pixels per row at maximum. The above description is related to 10 pixels per row. To execute padding processing for image data having pixel data in number smaller than 10, the following control is employed.

For example, to execute padding processing for image data having eight pixels per row, eight pixel data of the first row are input from the terminal 1501, and then, pixel data of the next row are input. That is, for the pixel data, only pixel data to be processed are continuously input to the terminal 1501 without inserting any wasteful data between the rows.

When the first pixel data of the first row are shifted to the rightmost position in the shift register 1503, simultaneously, the pieces of shape information are loaded from the terminals 305 to the shift register 1607. In the input shape information, eight bits on the right side are significant information, and two bits on the left side are "0".

Since the registers for eight pixels on the right side in the shift registers 1503 and 1607 store pixel data to be processed and corresponding shape information, the padding processing for pixel data of one row can be executed without any intermission, as described above.

The padding processing for a new row starts in a cycle next to the cycle where the padding processing for pixel data of image data of one row is ended. Accordingly, pieces of shape information of the new row are loaded from the terminals 305 to the shift register 1607.

As described above, when the shape information load timing to the shift register 1607 is changed in accordance with the number of pixels per row, padding processing for image data having an arbitrary number of pixels per row can also be continuously executed.

[15th Embodiment]

In this embodiment, the problem of shape information input (time loss) in the 13th embodiment is solved by a method different from that of the 14th embodiment.

Figure 25:
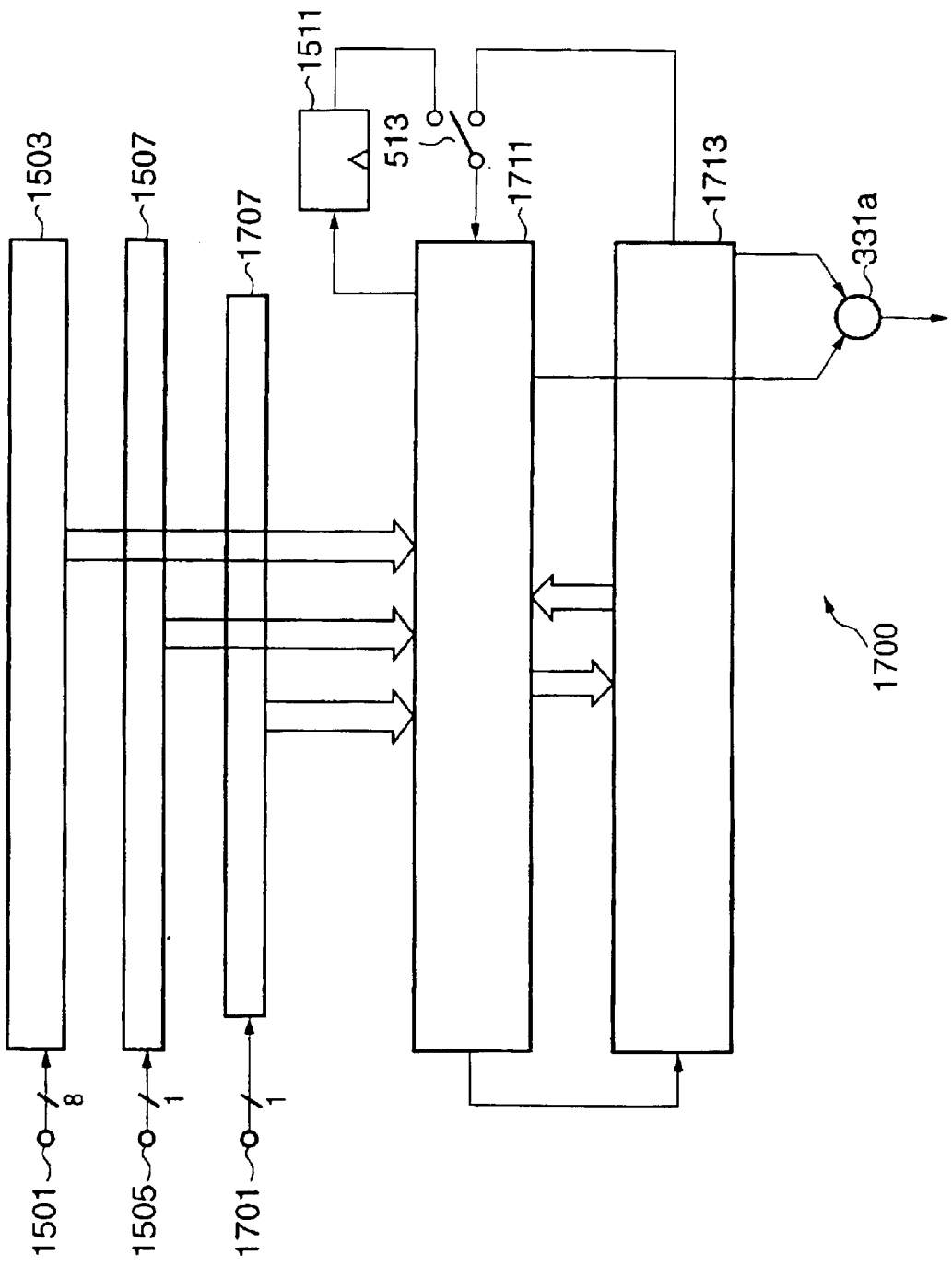
FIG. 25 is a block diagram showing the arrangement of an image processing section according to the 15th embodiment of the present invention.

FIG. 25 is a block diagram showing the arrangement of an image processing section according to the 15th embodiment of the present invention. An image processing section 1700 can be suitably used as part of an image processing apparatus such as a computer.

In the image processing section 1700 according to this embodiment, a 1-bit wide shift register 1707 like a shift register 1507 is added to the image processing section 1500 shown in FIG. 23. Pieces of delimiter information representing the boundaries of pixel data of one row are input from a terminal 1701 to the shift register 1707 in correspondence with the pieces of remaining information (pixel data and shape information).

With the delimiter information, propagation of image data in the left and right propagation processing sections is controlled. In accordance with this arrangement, the image processing section 1700 uses pixel propagation processing sections 1711 and 1713 having a structure different from that of the left and right propagation processing sections 321 and 323 employed in FIGS. 12, 23, and 24.

Figure 26:
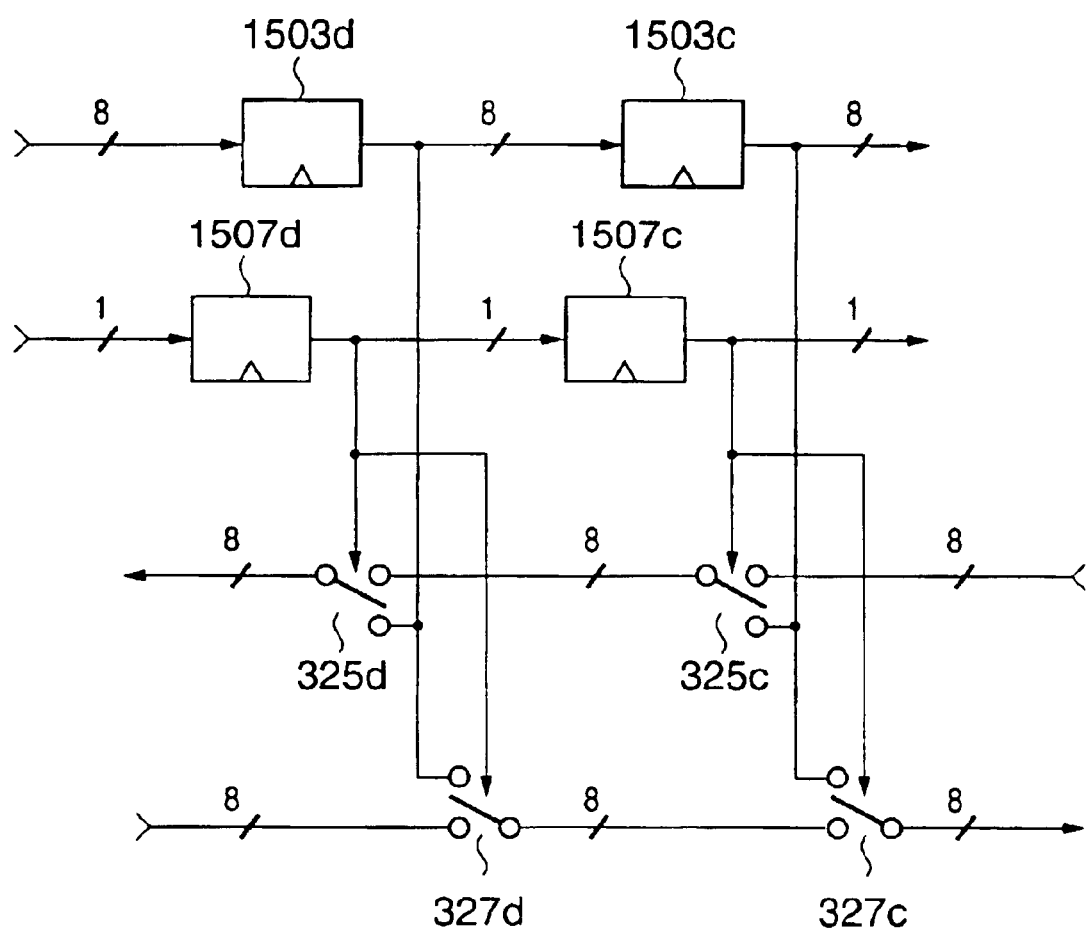
FIG. 26 is a block diagram showing details of part of the image processing section shown in FIG. 23.

Part (for two pixels) of the image processing section 1500 shown in FIG. 23 is shown in FIG. 26 for comparison. Shift registers 1503c and 1503d constitute an 8-bit wide shift register 1503. Registers 1507c and 1507d constitute a 1-bit wide shift register 1507. Selectors 325c and 325d constitute a left propagation processing section 321. Selectors 327c and 327d constitute a right propagation processing section 323.

Figure 27:
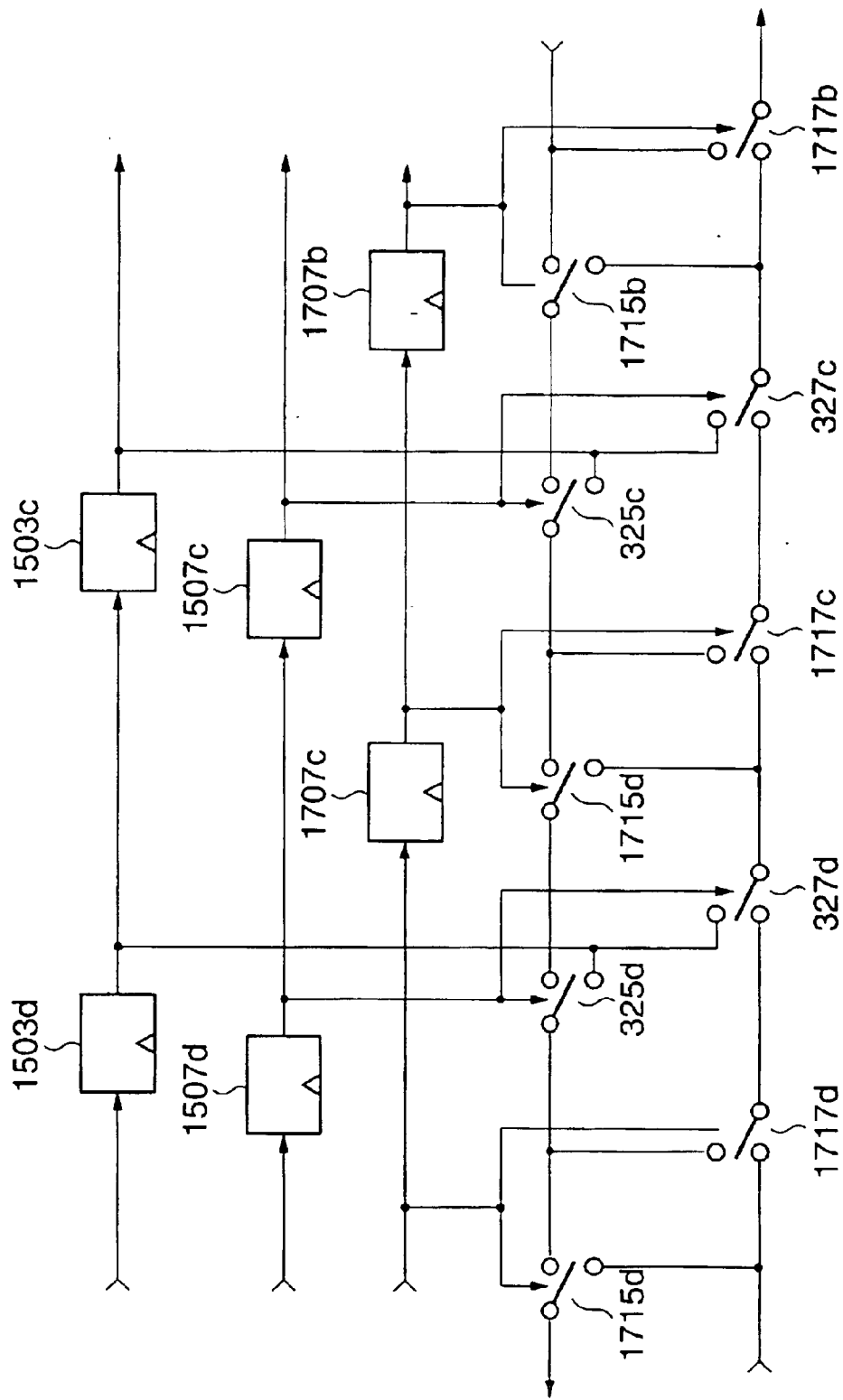
FIG. 27 is a block diagram showing details of part of the image processing section according to the 15th embodiment of the present invention.
Figure 28:
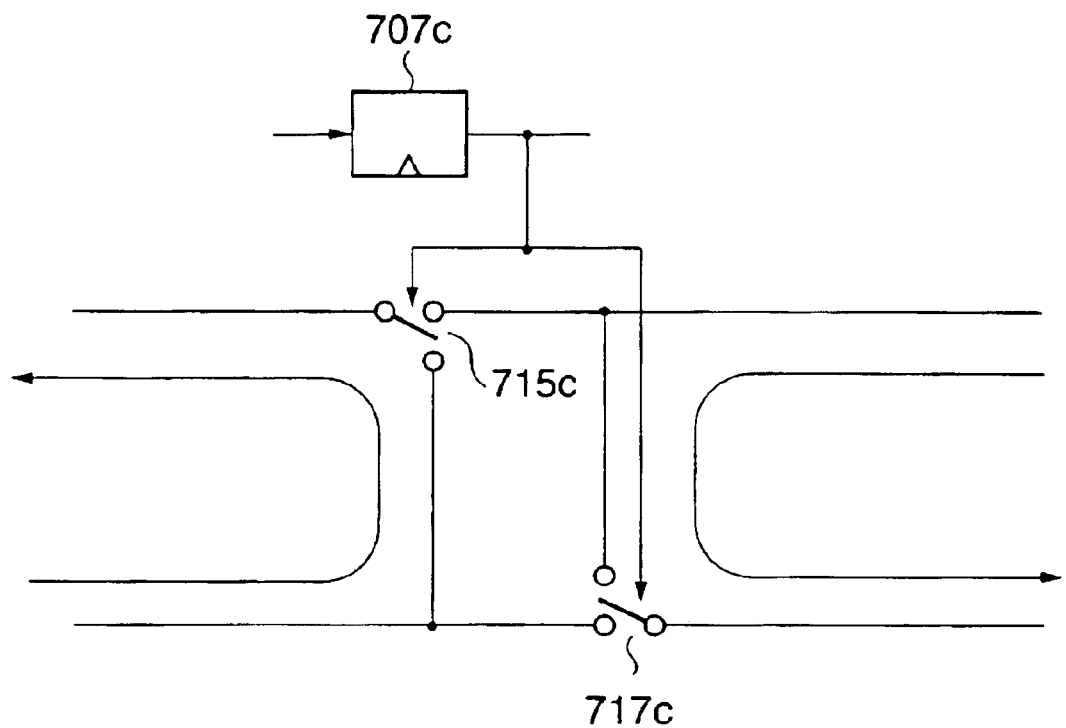
FIG. 28 is a view showing the flow of pixel data in a pixel propagation processing section according to the 15th embodiment of the present invention.

FIG. 27 is a block diagram showing part (for two pixels) of the image processing section 1700 shown in FIG. 25. A register 1707c of the shift register 1707 holds delimiter information representing whether pixel data held in registers 1503c and 1503d of a shift register 1503 belong to a single row. When the two pixel data belong to a single row, data "0" representing it is held in the register 1707c. When the two pixels belong to different rows, data "1" representing the boundary of rows is held in the register 1707c.

Selectors 1715 are added between selectors 325 (325c, 325d, and the like). Selectors 1717 are added between selectors 327 (327c, 327d, and the like). In this embodiment, the total number of selectors added to the above-described embodiment is (10−1)×2=18. Each set of such additional selectors is switched by one delimiter information.

Hence, the register length of the shift register 1707 is at least 9 bits, and any register beyond the 9 bits acts as a delay circuit.

The delimiter information must be shifted in synchronism with the shape information and pixel data. The value "1" representing the boundary of row data must be input simultaneously with the first pixel data when the shift register length is 9 bits, and must be input simultaneously with the last pixel data when the shift register length is 10 bits.

Each delimiter information does not spatially match the position of pixel data and is located between pixel data. To input the delimiter information simultaneously with the pixel data, the delimiter information must be synchronized with input of one of the pixel data on left and right sides, and therefore, the above control is performed.

Detailed operation will be described below. When pixel data held in the registers 1503c and 1503d belong to different rows, the register 1707c holds a value "1", which is used as a switching control signal for the selectors 1715c and 1717c.

The selector 1715c selects pixel data supplied from the selector 327d of the right propagation processing section, and the selected pixel data is propagated to the left in the left propagation processing section (325d and the like). Similarly, the selector 1717c selects pixel data supplied from the selector 325c of the left propagation processing section, and the selected pixel data is propagated to the right in the right propagation processing section (327c and the like).

When both pieces of shape information held in the registers 1507c and 1507d are "0", in short, pixel data input from the left of the right propagation processing section propagates to the left in the left propagation processing section through the selector 1715c, as shown in FIG. 10. In this case, pixel data input from the right of the left propagation processing section propagates to the right in the right propagation processing section through the selector 1717c.

In this way, the pixel data on the left and right sides of the set of selectors 1715c and 1717c controlled by single delimiter information are propagated without any interference therebetween.

Hence, when the average value between the output from the selector 325a in the left propagation processing section and that from the selector 327a in the right propagation processing section 323 is calculated by a calculator 331a, a padding processing result for each pixel can be output, as in the 13th and 14th embodiments.

In the 15th embodiment as well, padding processing can be executed for image data having an arbitrary number of pixels within the number of steps of the shift registers 1503 and 1507, as in the 14th embodiment.

The delimiter information can be used not only to represent the boundary between the pixel data of a row and those of the next row but also to distinguish significant pixel data (pixel data to be processed) from insignificant pixel data. Hence, in the image processing section 1700, even when insignificant pixel data are loaded to the shift register 1503, appropriate processing can be executed using delimiter information corresponding to these pixel data. Shape information to be input simultaneously with the insignificant data can be either "0" or "1".

[16th Embodiment]

This embodiment is related to a modification to the 13th embodiment. An image processing section according to this embodiment is different from that of the 13th embodiment in the layout of a register 1511 and selector 1513.

Figure 29:
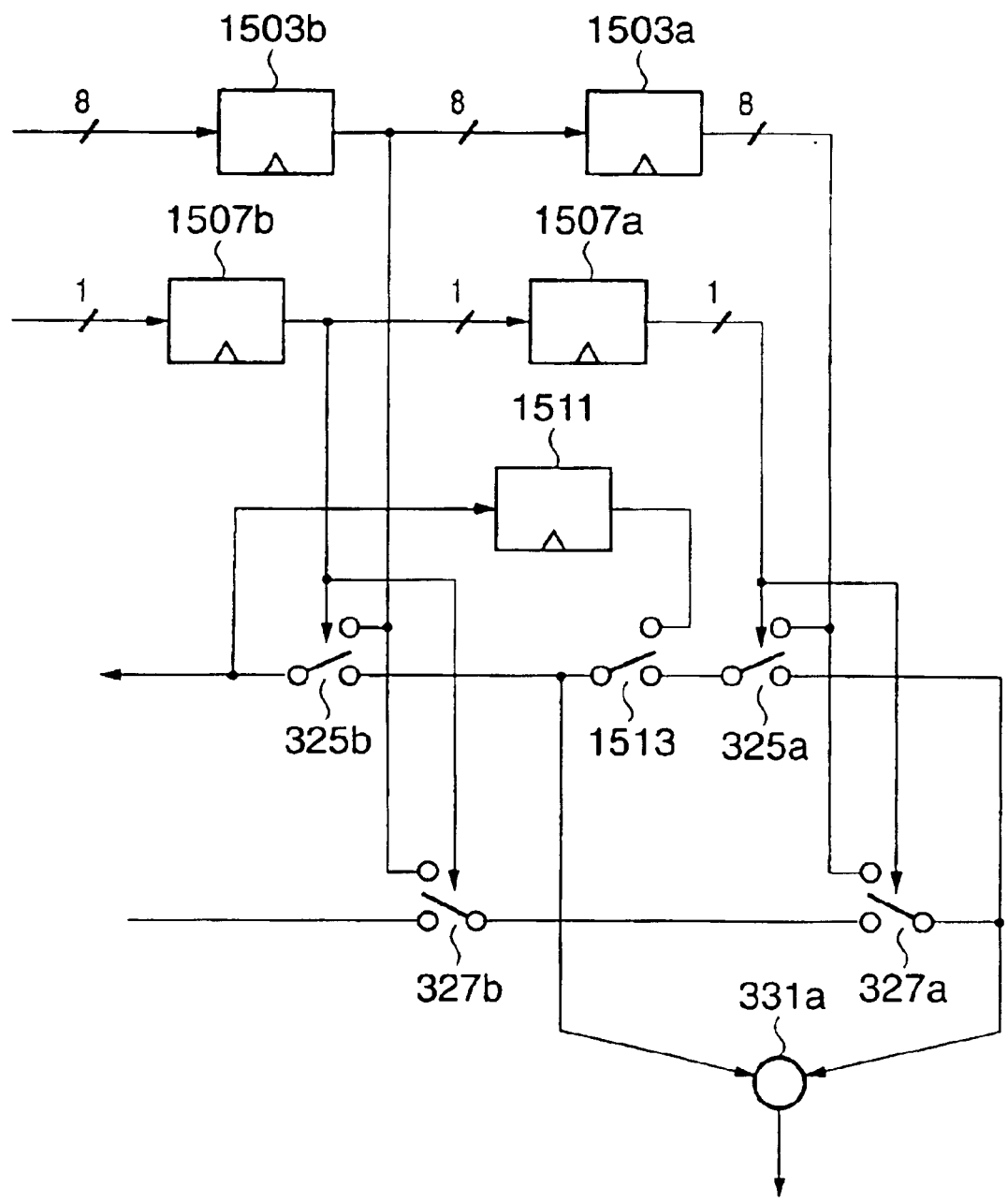
FIG. 29 is a block diagram showing details of part of an image processing section according to the 16th embodiment of the present invention.

FIG. 29 is a block diagram showing a processing section corresponding to only two pixels on the right side so as to explain the difference between the image processing section according to the 16th embodiment of the present invention and that shown in FIG. 23 (13th embodiment).

The main structural difference from the 13th embodiment is that the input to the register 1511 is changed from the output from a selector 325a to the output from a selector 325b, and the layout position of the selector 1513 is changed from the input side to the output side of the selector 325a.

The timing when the selector 1513 selects the output from the register 1511 is the same as in the 13th embodiment. More specifically, the selector 1513 selects not the output from the register 1511 but the output from the selector 325a only for the first pixel of each row data, and selects the output from the register 1511 for the second and subsequent pixels.

In the 16th embodiment, since the output from the selector 325a always matches the output from the selector 327a, the selector 325a may be omitted by directly inputting the output from a selector 327a to the selector 1513.

The input to a calculator 331a through the selector 1513 for the first pixel is the same as in the 13th embodiment, and identical to the output from the selector 327a.

Necessary data to be supplied to the calculator 331a after one cycle (processing for the second pixel) is output from the selector 325b in the current cycle (processing for the first pixel). When this data is delayed by the register 1511 and input to the calculator 331a through the selector 1513, the desired data can be supplied to the calculator 331a.

When the output from the selector 1513 is also supplied to the selector 325b, necessary data to be supplied to the calculator 331a in the next cycle is output from the selector 325b again.

Hence, from the second cycle, one of necessary data to be supplied to the calculator 331a can be obtained by causing the selector 1513 to select the output from the register 1511. The other data to be supplied to the calculator 331a is the output data from the selector 327a.

[17th Embodiment]

Figure 30:
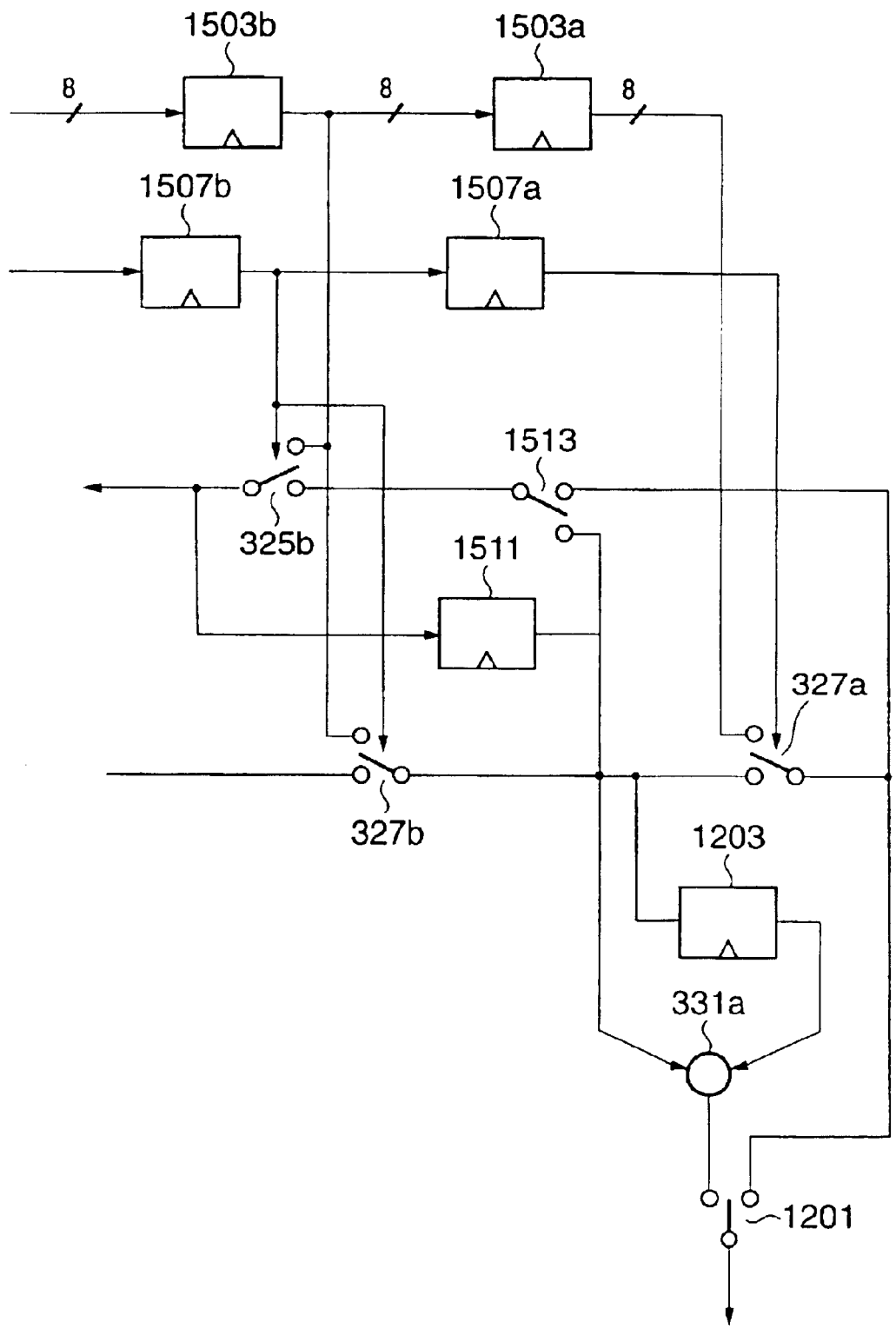
FIG. 30 is a block diagram showing details of part of an image processing section according to the 17th embodiment of the present invention.

This embodiment is a modification to the 13th and 16th embodiments. FIG. 30 is a block diagram showing a processing section corresponding to only two pixels on the right side so as to explain the difference between an image processing section according to the 17th embodiment of the present invention and that shown in FIG. 23 (13th embodiment).

In the image processing section according to the 17th embodiment, a padding processing result for the first pixel and that for the second or subsequent pixel are selectively output by a selector 1201 arranged on the output side of a calculator 331a, and also, two data to be supplied to the calculator 331a are directly supplied from registers 1511 and 1203, thereby reducing the processing delay and increasing the processing speed.

In the image processing section according to the 16th embodiment, since even the first pixel data after padding processing is generated by the calculator 331a, the output from the selector 1513 must be supplied to the calculator 331a. On the other hand, in the image processing section according to the 17th embodiment, the first pixel data after padding processing is generated not by the calculator 331a but through the path of another system. Hence, the output from the register 1511 can be directly supplied to the calculator 331a.

Additionally, in this embodiment, the selector 325a is omitted, as has been supplementarily described in the 16th embodiment.

The other data to be supplied to the calculator 331a is directly supplied from the register 1203 newly arranged. Since pixel data to be supplied in the next cycle is supplied to the register 1203, the data to be supplied can be obtained by delaying the data by the register 1203 by one cycle.

In this embodiment, since the pixel propagation processing sections and the calculator are separated by the register, the operation frequency can be easily increased. More specifically, Processing delay time for first pixel=delay by pixel propagation processing section+delay by selector 1201

Processing delay time for second or subsequent pixel=delay by calculator 331a+delay by selector 1201

The processing delay time is obviously shorter than those in other embodiments (delay by pixel propagation processing section+delay by calculator 331a), so the arrangement can suitably increase the processing speed.

The padding processing image processing sections of the above-described 13th to 17th embodiments can be applied to encode/decode an image. In application to encoding, the apparatus has the same arrangement as in FIG. 8 described above. In application to decoding, the apparatus has the same arrangement as in FIG. 9 described above. That is, the image processing section described in one of the 13th to 17th embodiments is used as the padding device 17 in FIG. 8 or padding device 63 in FIG. 9.

As described above, according to the 13th to 17th embodiments, the sequential padding processing can be efficiently executed.

[18th Embodiment]

In the 18th embodiment of the present invention, a padding processing circuit for outputting a padding processing result for one pixel in each cycle will be described.

This embodiment roughly comprises an arithmetic determination section for obtaining the pixel value of a pixel to be processed after padding processing on the basis of three kinds of pixel data including pixels to be processed in the next cycle and several pieces of binary information, and a data generation section for generating data to be input to the arithmetic determination section.

The three kinds of pixel data and binary information in this embodiment are as follows. The first data are pixel data to be processed in each cycle and binary shape information corresponding to the pixel data.

The second data are significant (in objects) pixel data which is included in unprocessed pixel data and is closest to the pixel to be processed, and flag information representing whether the significant pixel data (to be referred to as a succeeding proximal pixel hereinafter) is present.

The third data are significant (in objects) pixel data (to be referred to as a preceding proximal pixel hereinafter) which is included in processed pixel data and is closest to the pixel to be processed, and flag information representing whether the significant pixel data is present.

Figure 31:
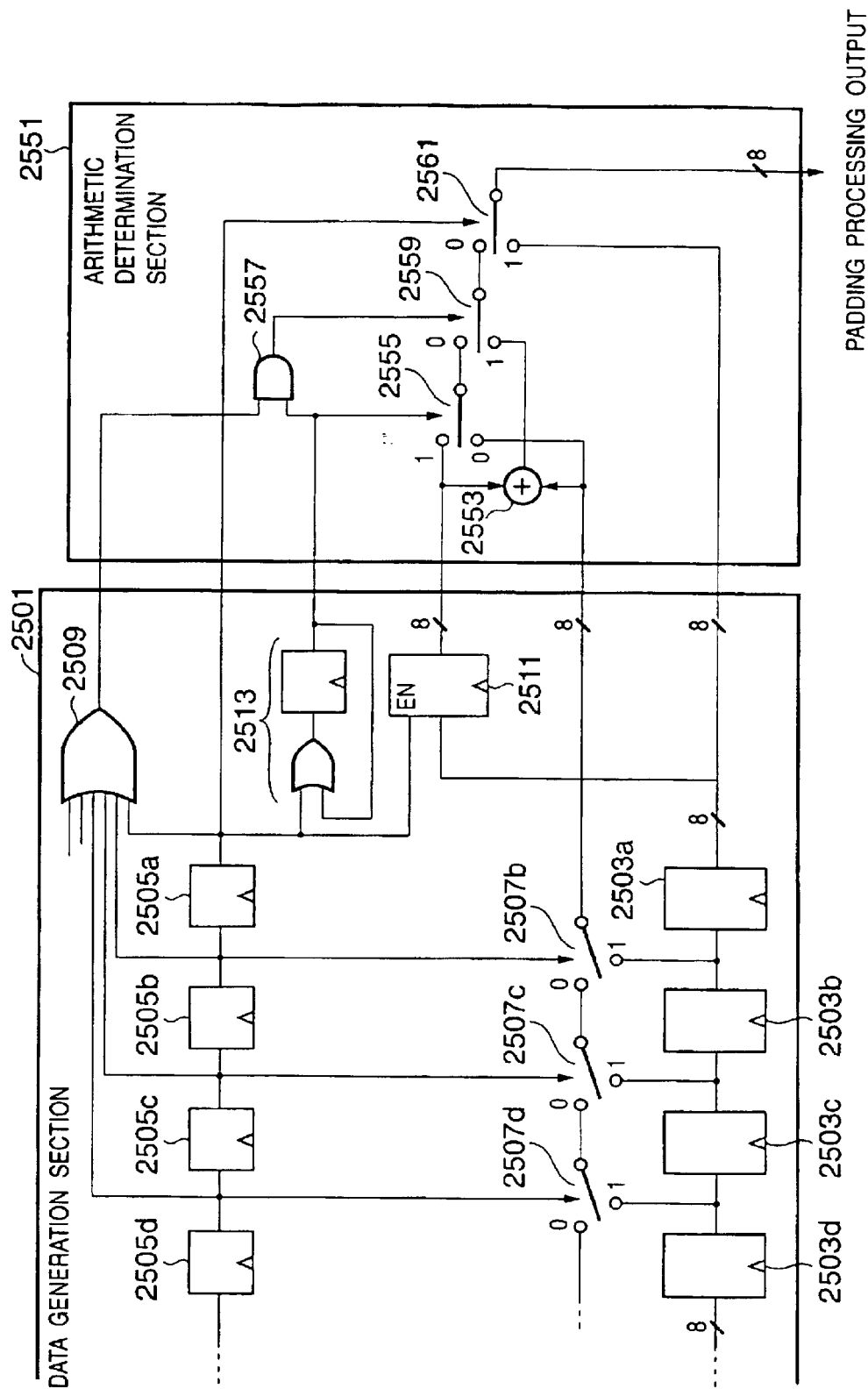
FIG. 31 is a block diagram showing the circuit arrangement according to the 18th embodiment.

FIG. 31 is a block diagram of the sequential padding processing circuit according to the 18th embodiment. Referring to FIG. 31, a large block 2501 on the left side is a data generation section for generating and outputting the three kinds of pixel data and corresponding shape information (binary information). A large block 2551 on the right side is an arithmetic determination section for calculating the average value of pixels from the pixel data or shape/flag information supplied from the data generation section or determining which pixel data is to be output as a pixel value after padding processing.

The components of the two large blocks will be described next. The data generation section 2501 will be described first.

Referring to FIG. 31, 8-bit input/output flip-flops 2503a, 2503b, 2503c, 2503d, . . . operate as shift registers for holding pixel data and shifting them in every processing cycle (carry block). The flip-flop 2503a holds and outputs pixel data to be processed in the current cycle.

One-bit input/output flip-flops 2505a, 2505b, 2505c, 2505d, . . . operate as shift registers for holding pieces of shape information and shifting them in every processing cycle. The flip-flops 2505a, 2505b, 2505c, 2505d, . . . hold binary shape information corresponding to the pixel data in the shift registers 2503. Hence, the flip-flop 2505a holds and outputs shape information of a pixel to be processed in the current cycle.

Selectors 2507b, 2507c, 2507d, . . . are switched by corresponding shape information. When the shape information is "1", the output from a corresponding register 2503 is selected. When the shape information is "0", the output from a selector 2507 on the left side (subsequent side) is selected. Hence, as long as the shape information immediately after the pixel of interest is "0", the output from the immediately adjacent selector 2507 on the left side is selected. As a consequence, the pixel value of a significant pixel (pixel in an object) located after the pixel of interest is output for the selector 2507b.

A logic element (OR gate) 2509 calculates the OR of the outputs from all the shift registers 2505. The OR gate 2509 outputs succeeding proximal pixel flag information representing whether a succeeding proximal pixel is present. The number of bits input to the OR gate depends upon the processing unit. For example, when one block is constructed by 10×10 pixels, and one line thereof will be processed, 10 bits are input. The shift registers 2503 2505 and the selectors 2507 are also prepared in number depending on the processing unit.

A register 2511 holds the closest significant pixel (latched when the shape information at that time is "1") out of processed pixel data (located preceding to the pixel of interest) and outputs the preceding proximal pixel.

A 1-bit register 2513 for holding a result obtained by cumulatively calculating the ORs of shape information corresponding to the processed pixel data outputs preceding proximal pixel flag information representing whether a preceding proximal pixel is present.

The above six signals are output from the data generation section 2501 and sent to the arithmetic determination section 2551.

The components of the arithmetic determination section 2551 will be described next.

An adder 2553 calculates and outputs the average value between the succeeding proximal pixel and preceding proximal pixel. A selector 2555 selects the preceding proximal pixel when the preceding proximal pixel flag is "1" and selects the succeeding proximal pixel when the flag is "0".

An AND element 2557 detects that both the preceding proximal pixel and succeeding proximal pixel are present. On the basis of the output from the AND element, a selector 2559 selects the pixel average value output from the adder 2553 when both of the preceding and succeeding proximal pixels are present and selects the output from the selector 2555 when neither pixels are present. On the basis of shape information corresponding to the pixel to be processed in the current cycle, a selector 2561 selects this pixel (pixel of interest) when the pixel to be processed is a significant (in object) pixel and, otherwise, selects the output from the selector 2559.

With the above arrangement, when the pixel of interest is in an object (when shape information corresponding to the pixel of interest is "1"), the value of the pixel of interest is output.

When the pixel of interest is outside the objects (when shape information corresponding to the pixel of interest is "0"), and no preceding proximal pixel is present (the output from the register 2513 is "0"), the succeeding proximal pixel is selected. When the preceding proximal pixel is present, and no succeeding proximal pixel is present, the preceding proximal pixel is selected. When the preceding and succeeding proximal pixels are present (both the outputs from the register 2513 and OR gate 2509 are "1"), the output (added and averaged value of the preceding and succeeding proximal pixels) from the adder 2553 is selected by the selector 2559 and output as the output value from the arithmetic determination section 2551.

FIG. 32 is a table showing which pixel data is output from the arithmetic determination section 2551 on the basis of the binary shape information and two pieces of flag information. Operation will be described with reference to the table shown in FIG. 32, though it may be a repeat of the above description.

Assume that pixel data of one row to be subjected to padding processing and shape information for the pixel data are already shift-input to the shift registers 2503 and 2505. Also assume that the cumulative OR results held in the register 2513 are reset immediately before processing for the first pixel.

When shape information corresponding to the pixel (pixel of interest) to be processed in the current cycle is "1", the pixel to be processed is output independently of the values of the remaining flag information. This is implemented by selecting the output from the register 2503a by the selector 2561.

When the shape information of the pixel to be processed is "0", the processing branches to i) to iii) below.

i) When both pieces of flag information (the output from the register 2513 and the output from the OR gate 2509) are "1", significant pixels are present on the left and right sides of the pixel to be processed. Hence, the average value of two, left and right pixel values (the value in the register 2511 and the value output from the selector 2507) closest to the pixel to be processed is calculated by the adder 2553 and output through the selectors 2559 and 2561.

ii) When only one of the two pieces of flag information is "1", the preceding or succeeding proximal pixel that exists becomes the pixel after padding processing. This is implemented by selecting one of the proximal pixels by the selector 2555 on the basis of the preceding proximal pixel flag information.

iii) When the shape information is "0", and both pieces of flag information are "0", padding processing cannot be executed, so the output is insignificant. In this arrangement, the data from the selector 2507b for outputting the succeeding proximal pixel is output, though the data has no significance at all.

Only the basic arrangement and processing contents in this embodiment have been described above. With this arrangement, a plurality of row data cannot be continuously efficiently processed.

A problem in continuously processing a plurality of row data and a solution thereto will be described below.

To continuously process a plurality of row data, pixel data and shape information must be continuously input to the shift registers 2503 and 2505. However, when pieces of shape information are continuously input, pieces of shape information of the next row are early input to the OR element 2509 for detecting whether a succeeding proximal pixel is present, so no correct succeeding proximal pixel flag information is obtained.

The following two methods can be used to solve this problem.

(1) Using a shift register having a parallel load function, pieces of shape information for one row are loaded to the shift register (2505) at once, and "0" is sequentially shift-input to empty portions during shift operation in subsequent cycles.

(2) In addition to the shift register for shifting shape information, another shift register having the same scale is prepared to input 1-bit attribute information in units of pixels. The pieces of attribute information are input to the shift register such that they take the same value for pixels of the same row and different values for adjacent rows. The value in the shift register 2505a is compared with all the remaining attribute information (one-to-multiple comparison), and shape information at a position where the pieces of attribute information do not match is masked to zero, thereby controlling to input to the OR element 2509 only shape information with the same attribute information as that of the pixel to be processed as significant data.

(3) As in (2), another shift register is prepared, and "0" is input in synchronism with the last pixel of each row data, and "1" is input for the remaining pixels. This is pixel end information representing the end of row data. The pieces of shape information are ORed one by one starting from the shape information of the last pixel, thereby obtaining the OR of all shape information. At each pixel position, the pixel end information at each pixel position is ANDed with OR shape information propagated from the left and then the shape information at the pixel position is ORed. With this processing, shape information on the left of the pixel with the pixel end information "0" is neglected.

In any method, the manner the shape information is processed is improved. The above shape information processing methods can also be applied to the 19th embodiment to be described below.

[19th Embodiment]

In the 19th embodiment, three pixel data, i.e., a pixel to be processed, succeeding proximal pixel, and a pixel that conditionally holds a processing result are sent from a data generation section 2501 to an arithmetic determination section 2551.

To obtain the third pixel data, in this embodiment, the processing result output from the arithmetic determination section 2551 is fed back to the data generation section.

As control signals used to do calculation/determination by the arithmetic determination section 2551 using these pixel data and output a padding processing result, the binary shape information of the pixel to be processed, succeeding proximal pixel flag information, and a first pixel designation signal representing that the pixel to be processed is the first pixel of a row are used.

Figure 33:
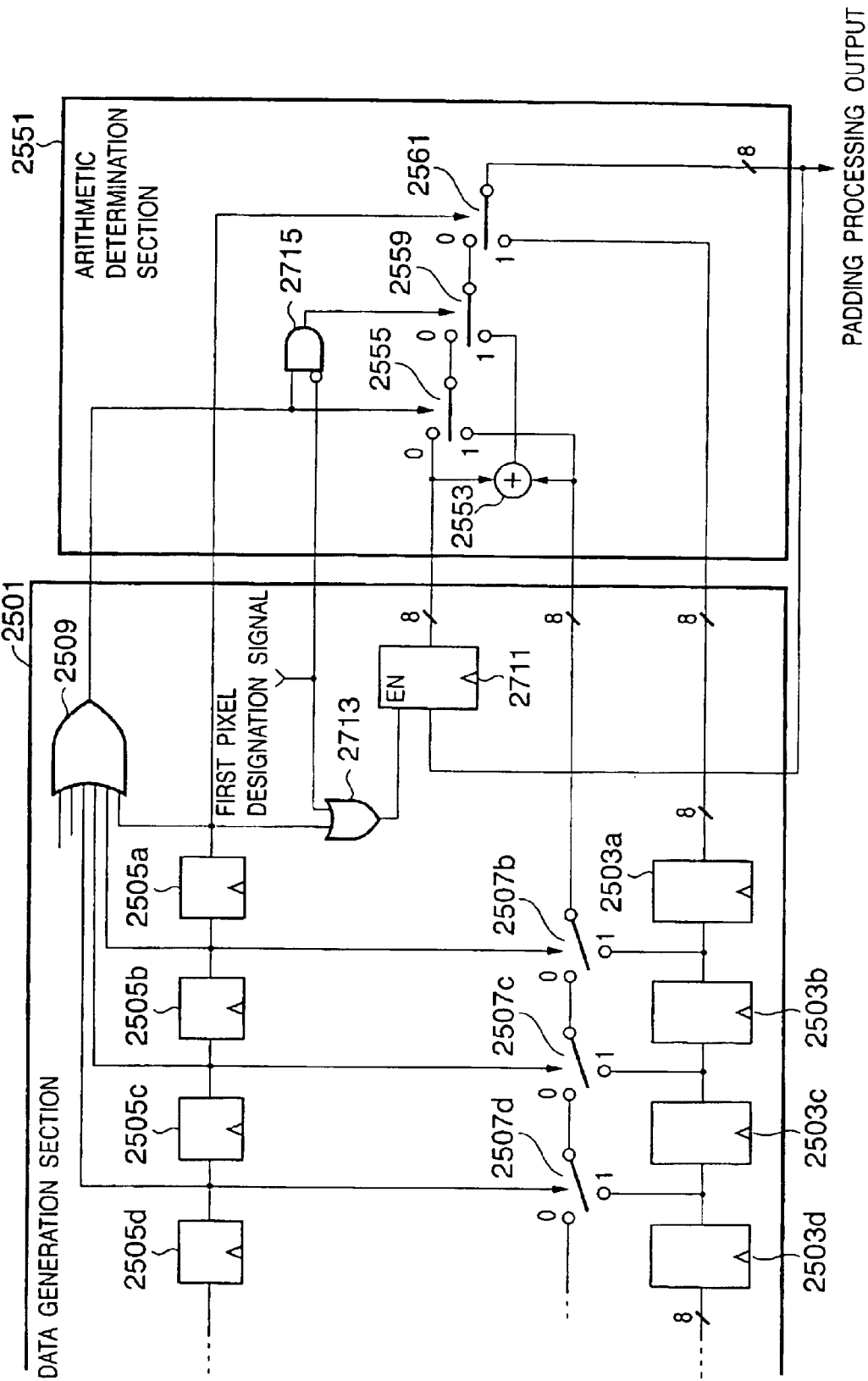
FIG. 33 is a block diagram showing the circuit arrangement according to the 19th embodiment.

FIG. 33 shows the circuit arrangement of the 19th embodiment. The following three components are newly used.

A register 2711 (to which the output result from the arithmetic determination section 2551 is fed back) conditionally holds the pixel data as a padding processing result output from the arithmetic determination section in the immediately preceding cycle. An OR element 2713 detects the condition (when the shape information of the pixel to be processed is "1" or the first pixel designation signal is "1"). An AND element 2715 detects the condition under which the output from an adder 2553 for calculating an average value is selected by a selector 2559.

Operations of shift registers 2503 and 2505 and selector 2507 are the same as in the above-described 18th embodiment, and a detailed description thereof will be omitted.

FIG. 34 shows the values of the three determination control signals used by the arithmetic determination section 2551 of the 19th embodiment and corresponding outputs. A description will be made with reference to the table shown in FIG. 34.

As described above in the 18th embodiment, assume that pixel data and shape information of one row, which are necessary for processing, are already shift-input.

When shape information corresponding to the pixel to be processed in the current cycle is "1", the pixel to be processed is output regardless of the values of the remaining flag information. This is the same as in the 18th embodiment.

When the shape information of the pixel to be processed is "0", the processing branches to i) to iv) below.

i) When the succeeding proximal pixel flag is "1", and the first pixel designation signal is "1", the succeeding proximal pixel is selected and output. This is implemented by selecting the succeeding proximal pixel by a selector 2555. In this case, the proximal pixel is output from the register 2711 in the next cycle.

ii) When the succeeding proximal pixel flag is "1", and the first pixel designation signal is "0", the average value of the preceding and succeeding proximal pixels (the preceding proximal pixel is not used in this embodiment), or the succeeding proximal pixel is obtained as the output. The average of the pixel data from the selector 2555 and the succeeding proximal pixel data matches the obtained output due to the reason to be described later. For this reason, the condition that the succeeding proximal pixel flag is "1", and the first pixel designation signal is "0" is detected by the AND element 2715, the average is selected by the selector 2559, and output through a selector 2561.

When the preceding proximal pixel flag corresponds to "1", the register 2711 holds the preceding proximal pixel. When the flag corresponds to "0", the register holds the succeeding proximal pixel loaded in processing the first pixel. Hence, the average between the output from the register 2711 and the succeeding proximal pixel is surely switched in accordance with the value of the preceding proximal pixel flag (not used in this embodiment).

iii) When the succeeding proximal pixel flag is "0", and the first pixel designation signal is "1", no significant pixels are present, so padding processing is impossible. In this case, any value can be output.

iv) When the shape information is "0", the succeeding proximal pixel flag is "0", and the first pixel designation signal is "0", padding processing is impossible, or the preceding proximal pixel is output. In this case, the preceding proximal pixel loaded to the register 2711 is output because this suffers no problem.

The problem in continuously processing a plurality of row data and a solution thereto are the same as in the 18th embodiment.

Even when the register 2711 and OR element 2713 are moved from the data generation section 2501 to the arithmetic determination section, the function does not change. To clarify which data or information is to be used for calculation and determination, the arrangement shown in FIG. 33 is employed. This also applies to the 20th and 21st embodiments to be described next.

Figure 40:
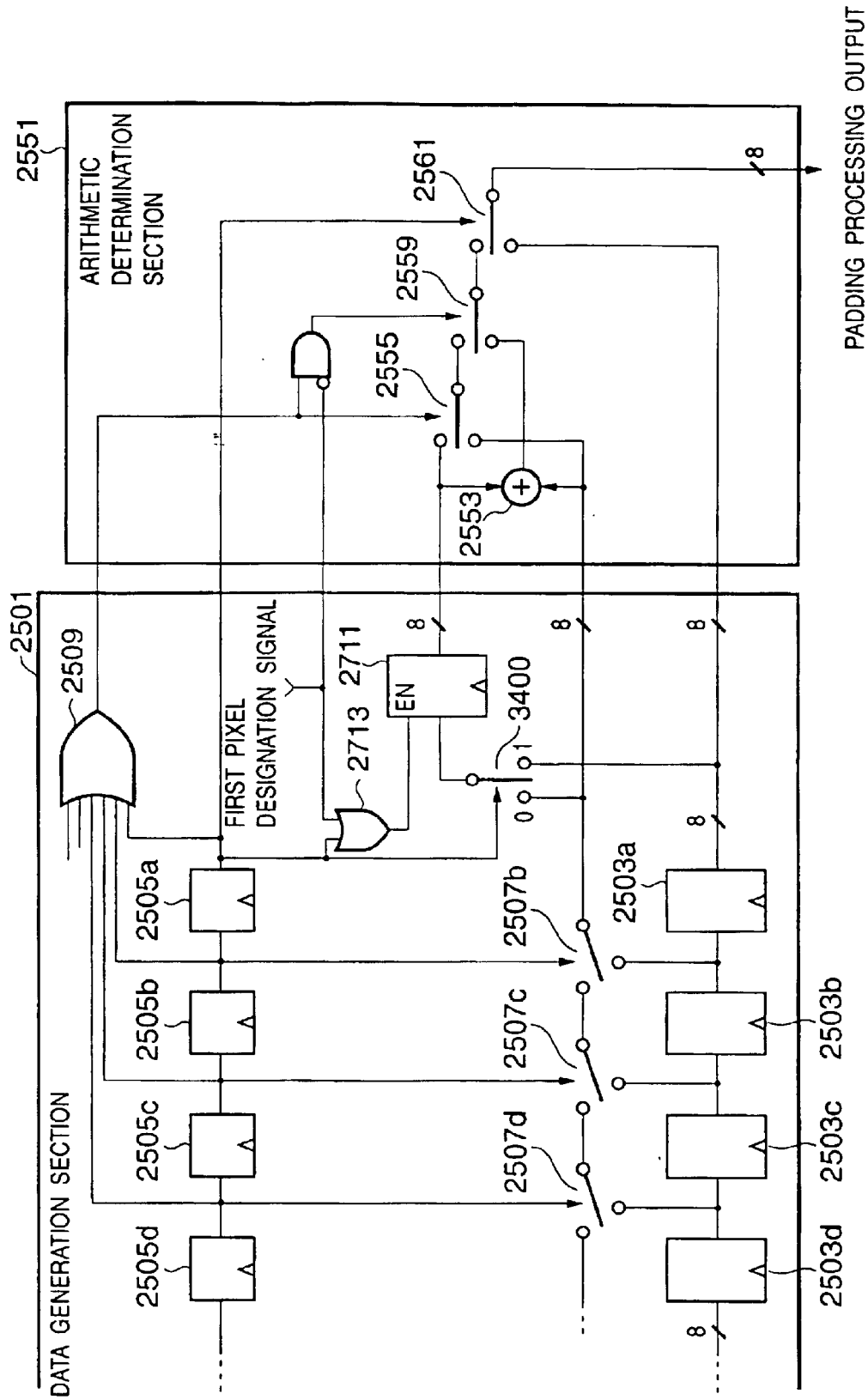
FIG. 40 is a block diagram showing the circuit arrangement according to a modification to the 19th embodiment.

When shape information is "1", the pixel to be processed is loaded to the register 2711. When the shape information is "0", and the pixel to be processed is the first pixel, the succeeding proximal pixel is loaded to the register 2711. Hence, even when one of the pixel to be processed and succeeding proximal pixel is selected as the input to the register on the basis of the shape information, the function does not change. An arrangement for this is shown in FIG. 40 as a modification to the 19th embodiment. As shown in FIG. 40, a selector 3400 for selecting one of the pixel to be processed and succeeding proximal pixel on the basis of the shape information of the pixel to be processed is added.

[20th Embodiment]

In the 20th embodiment, a padding processing result which is conditionally held in the 19th embodiment is unconditionally loaded in every cycle. In other words, the padding processing result for an immediately preceding pixel is used as the third pixel data.

Hence, as in the 19th embodiment, the processing result output from an arithmetic determination section 2551 is fed back to a data generation section.

Control signals used to process these data by the arithmetic determination section 2551 are the shape information of a pixel to be processed, succeeding proximal pixel flag information, a first pixel designation signal, and shape information of an immediately preceding pixel.

The 20th embodiment is different from the 19th embodiment in that a condition that the pixel to be processed is the first pixel is added as a condition used to select the succeeding proximal pixel by a selector 2555. This aims at applying the padding processing of directly replacing the succeeding proximal pixel to only the first pixel.

In addition, a condition that the shape information of the immediately preceding pixel is "1" is added as a condition used to select the average value by a selector 2559. This is because the newly calculated average value is used only when the shape information changes from "1" to "0", and the average value calculated and output in correspondence with the first "0" is fed back and reused when "0" continues.

FIG. 35 shows the circuit arrangement of the 20th embodiment. This circuit has four new components to be described next to implement the above function. The remaining components are the same as those with the same reference numerals in FIG. 33.

A register 2911 receives a processing result fed back from the arithmetic determination section in every cycle. A register 2913 delays the output from a shift register 2505a by one cycle to obtain the shape information of an immediately preceding pixel. An AND element 2915 detects the conditions for selecting the succeeding proximal pixel by the selector 2555. An AND element 2917 detects the conditions for selecting the average value by the selector 2559.

FIG. 36 shows the relationship between the values of the four determination control signals and padding processing outputs for these values. A description will be made with reference to this table.

As described in the 19th embodiment, assume that the pixel data of one row necessary for processing are shift-input.

When the shape information of the pixel to be processed in the current cycle is "1", the pixel to be processed is output regardless of the values of the remaining flag information. This is the same as in the 18th and 19th embodiments.

Processing when the shape information of the pixel (pixel of interest) to be processed is "0" will be described next.

i) When the succeeding proximal pixel flag is "1", and the first pixel designation signal is "1", the succeeding proximal pixel is selected and output regardless of the shape information of the immediately preceding pixel (this shape information has no significance at all), as in the 19th embodiment. The succeeding proximal pixel is output from the register 2911 in the next cycle.

ii) When the succeeding proximal pixel flag is "1", and the first pixel designation signal is "0", the output content is the average value of the preceding and succeeding proximal pixels or the succeeding proximal pixel.

For the first pixel for which the shape information of the pixel to be processed changes from "1" to "0", i.e., when the shape information of the immediately preceding pixel is "1", the output from an adder 2553 for calculating the average value is selected. This output is received by the register 2911, as described above.

When pieces of shape information "0" continue, i.e., the shape information of the immediately preceding pixel is "0", the average value of the preceding and succeeding proximal pixels, which is received by the register 2911, or the succeeding proximal pixel (pixel received when the first pixel designation signal is "1") is output. This operation is basically identical to processing in which the register 2911 receives the processing result output once and outputs it again.

iii) When the shape information is "0", the succeeding proximal pixel flag is "0", and the first pixel designation signal is "1", no significant pixels are present, and therefore, the padding processing is impossible. In this case, any value can be output.

iv) When the succeeding proximal pixel flag is "0", and the first pixel designation signal is "0", the padding processing is impossible, or the preceding proximal pixel is output. To output the preceding proximal pixel, the output from the register is selected. This suffers no problem because a pixel having shape information "1" is received by the register 2911.

The problem in continuously processing a plurality of row data and a solution thereto are the same as in the 18th and 19th embodiments.

[21st Embodiment]

As the most important characteristic feature of the 21st embodiment is that a FIFO (First In First Out) register is used to easily obtain a succeeding proximal pixel.

Figure 37:
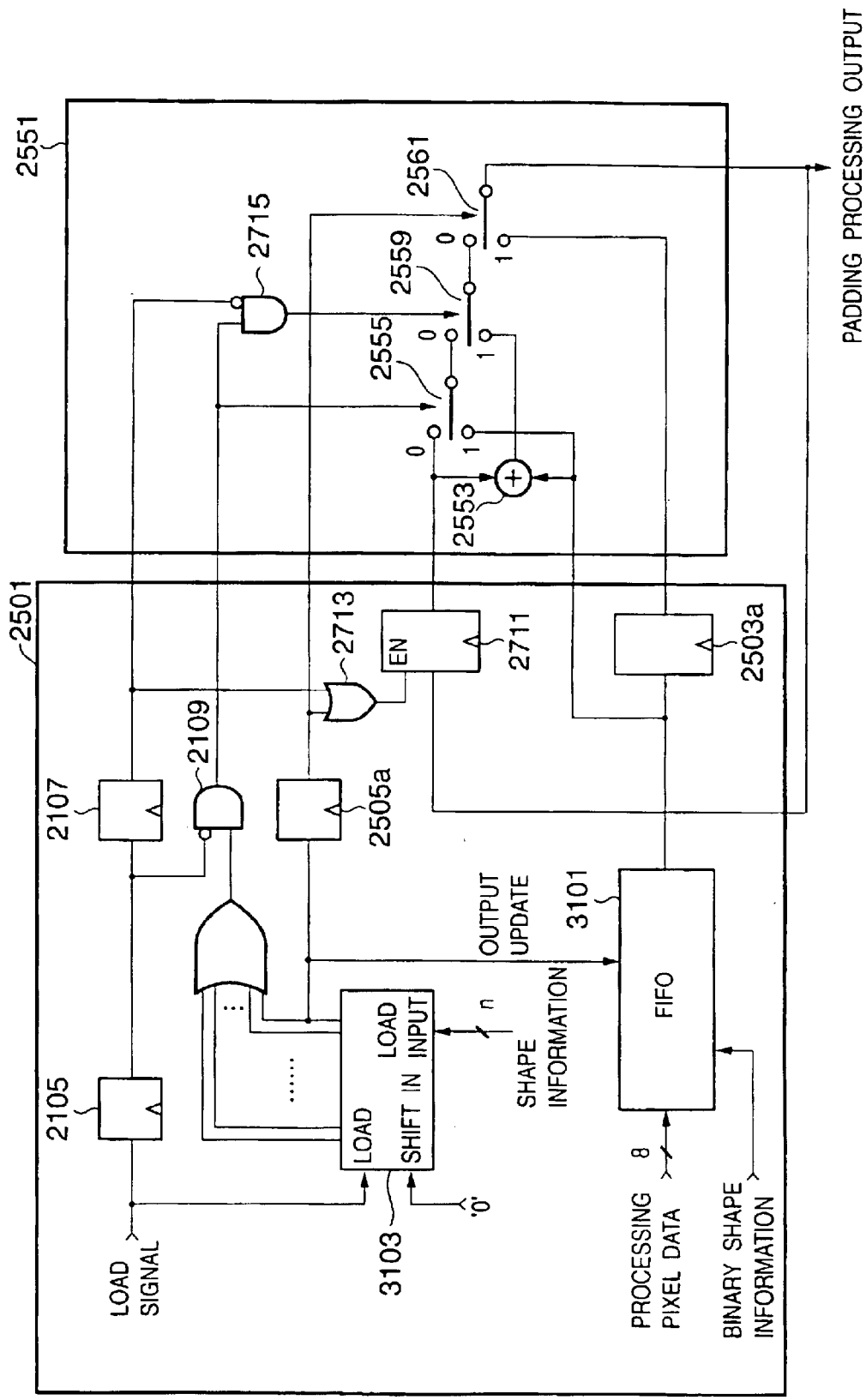
FIG. 37 is a block diagram showing the circuit arrangement according to the 21st embodiment.

FIG. 37 shows the arrangement of the 21st embodiment. Only a register 2503a is left, and a FIFO 3101 is used in place of the registers 2503b, 2503c, 2503d . . . In correspondence with this modification, a shift register 3103 having a parallel load function is used in place of the registers 2505b, 2505c, 2505d . . . The remaining components have the same function as in the 19th embodiment.

The FIFO 3101 is operated to output a succeeding proximal pixel by storing only a significant pixel (pixel having shape information "1"). More specifically, when a pixel to be processed is a significant pixel (shape information is "1"), the pixel data is output from the register 2503a, and the FIFO outputs the next significant pixel (succeeding proximal pixel). With this arrangement, the selector group 2507 can be omitted.

Whether the output from the FIFO is really a succeeding proximal pixel is determined by the total OR (output from an OR element 2509) of shape information output from the shift register 3103.

The shape information of the last pixel of one row is output from the shift register 3103 to a register 2505a, all pieces of shape information of the next row are supplied to the shift register and loaded in the next cycle. To do this, a load signal preceding the first pixel designation signal used in the above embodiments by two cycles is necessary, and the load signal at this timing is input to the shift register as a load control signal.

In a cycle immediately after the pieces of shape information are loaded to the shift register 3103 in accordance with the load signal, the last pixel of the immediately preceding row is still being processed. Hence, succeeding proximal pixel flag information output from the OR element 2509 is masked by a signal obtained by delaying the load signal by one cycle by a register 3105 such that the succeeding proximal pixel flag information does not affect the processing for the preceding row.

The delay signal is further delayed by one cycle by a register 3107 and input to an arithmetic determination section 2551 as a first pixel designation signal.

The types of signals input to the arithmetic determination section 2551 are the same as in the 19th embodiment. Hence, the arrangement of the arithmetic determination section is also the same as in the 19th embodiment. The table showing the relationship between control signals and processing outputs is also the same as in the 19th embodiment, and a detailed description thereof will be omitted here.

As described above, in the 21st embodiment, the FIFO 3101, shift register 3103, delay registers 3105 and 3107, and a flag information masking AND element 3109 are newly used.

Pixel data to be processed are sequentially supplied to the FIFO 3101, though the FIFO receives only pixel data whose binary shape information input together with the pixel data is "1". That is, the shape information is used as an input enable signal for the FIFO. For this reason, the FIFO stores only a significant pixel, and the output from the FIFO can be used as a succeeding proximal pixel.

On the other hand, the output must be updated under a certain condition such that the FIFO always correctly outputs a succeeding proximal pixel. When the binary shape information of a pixel to be processed changes to "1", pixel data output as a succeeding proximal pixel so far becomes a pixel to be processed. At this time, the output from the FIFO must be updated.

For this purpose, the shape information of the pixel to be processed is input to the FIFO before one cycle as an output update control signal. Since a signal sent from the shift register 3103 to the register 2505a corresponds to a signal at this timing, it is input as an output update control signal for the FIFO 3101.

The shift register 3103 receives pieces of shape information of one row at once and then performs shift operation in every cycle. At this time, "0" is shift-input to prevent the succeeding proximal pixel flag information from being affected by the shape information of another row.

[22nd Embodiment]

In the 18th to 21st embodiments, padding processing is executed in units of pixels. In the 22nd embodiment, this processing is extended to padding processing in units of two pixels. Of two pixels to be processed, a pixel close to the start will be referred to as a first pixel to be processed, and the next pixel will be referred to as a second pixel to be processed.

The 22nd embodiment is based on the 18th embodiment, which is extended to two-pixel processing.

Figure 38:
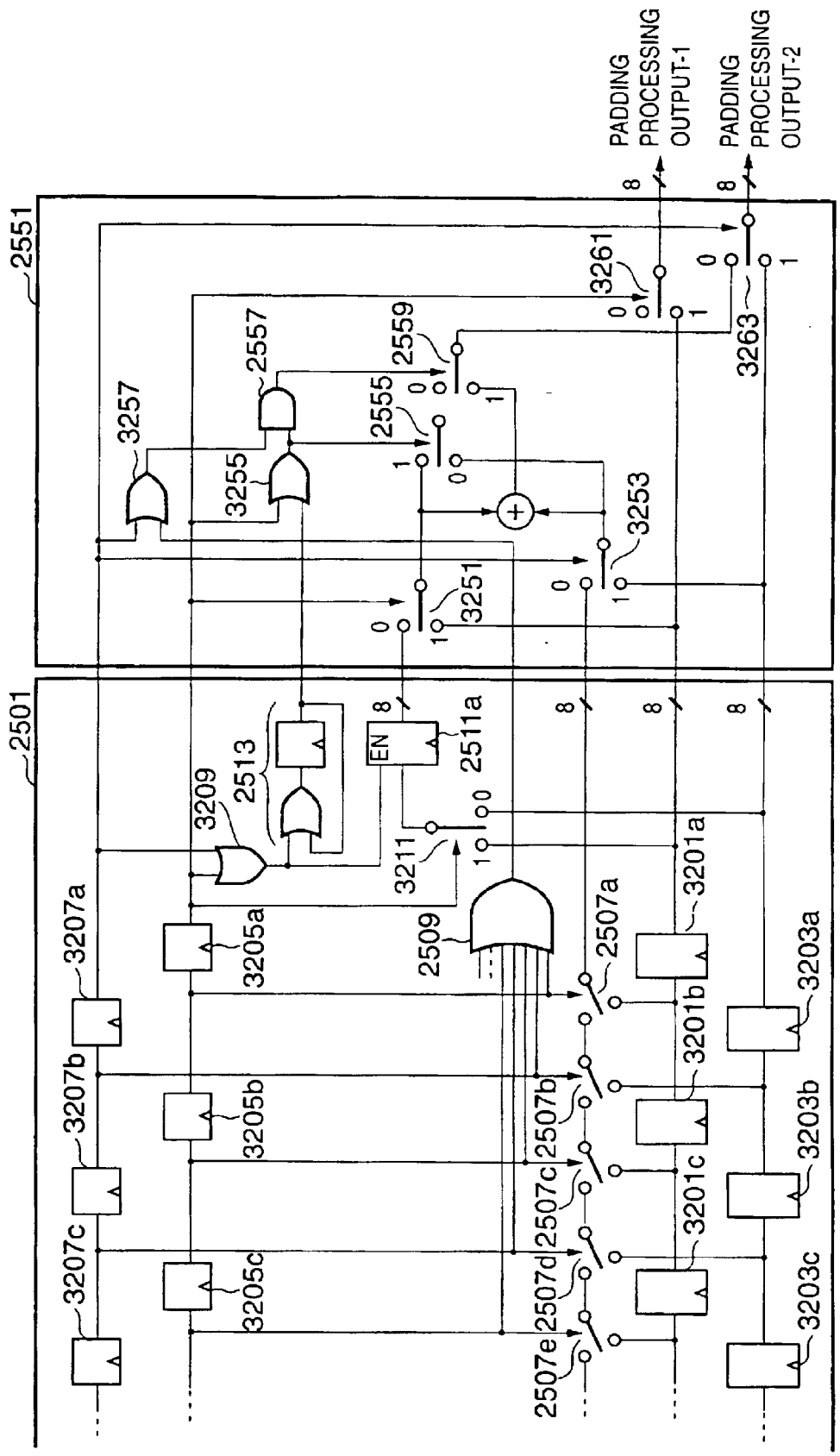
FIG. 38 is a block diagram showing the circuit arrangement according to the 22nd embodiment.

FIG. 38 shows the arrangement of the 22nd embodiment, and FIG. 39 is a table showing the relationship between control signals and processing outputs. In this embodiment as well, padding processing is executed using two blocks, data generation section 2501 and arithmetic determination section 2551, and an arrangement similar to the above embodiments is employed.

Referring to FIG. 38, 8-bit wide shift registers 3201a, 3201b, 3201c, . . . hold and shift pixel data of every other pixel from the first pixel data of one row, 8-bit wide shift registers 3203a, 3203b, 3203c, . . . hold and shift pixel data of every other pixel from the second pixel data of one row, 8-bit wide shift registers 3205a, 3205b, 3205c, . . . hold and shift shape information of pixel data of every other pixel from the first pixel data of one row, 8-bit wide shift registers 3207a, 3207b, 3207c, . . . hold and shift shape information of pixel data of every other pixel from the second pixel data of one row, an OR element 3209 detects whether a preceding proximal pixel is to be updated for the next cycle, a selector 3211 selects a pixel to be input to a register 2511a for holding a preceding proximal pixel, a selector 3251 switches between a preceding proximal pixel and a first pixel to be processed, a selector 3253 switches between a succeeding proximal pixel and a second pixel to be processed, an OR element 3255 synthesizes the shape information of the first pixel to be processed with the value of the preceding proximal pixel flag, an OR element 3257 synthesizes the shape information of the second pixel to be processed with the value of the succeeding proximal pixel flag, a selector 3261 selects a padding processing result for every other pixel from the first pixel, and a selector 3263 selects a padding processing result for every other pixel from the second pixel.

The remaining components are the same as those with the same reference numerals in the 18th embodiment (FIG. 31).

A description will be made below with reference to the table shown in FIG. 39.

When two pieces of binary shape information corresponding to two pixels to be processed are "1", the pixels to be processed are obviously output. Processing when shape information for each pixel to be processed is "0" will be described in detail.

A case wherein the shape information of the first pixel to be processed is "0" will be examined. In this embodiment, a succeeding proximal pixel for the first pixel to be processed means the second or subsequent succeeding pixel and does not include the second pixel to be simultaneously processed. This also applies to the succeeding proximal pixel flag.

In the arithmetic determination section 2551, when the shape information of the second pixel to be processed is "1", the selector 3253 switches the received succeeding proximal pixel to the second pixel to be processed, and the second pixel to be processed is input to an adder 2553. In addition, a value obtained by ORing the value of the succeeding proximal pixel flag and the shape information of the second pixel to be processed is input to an AND element 2557 (for detecting a condition for selecting the average value calculated by the adder).

Since only the case wherein the shape information of the first pixel to be processed is "0" is being examined here, the presence of the selector 3251 and OR element 3255 is neglected, and the preceding proximal pixel output from the register 2511 is processed in the same manner as in the 18th embodiment.

Thus, the same processing result as in the 18th embodiment is output for the first pixel to be processed.

Next, a case wherein the shape information of the second pixel to be processed is "0" will be examined. In this embodiment, a preceding proximal pixel for the second pixel to be processed means the second or subsequent preceding pixel and does not include the first pixel to be simultaneously processed. This also applies to the preceding proximal pixel flag.

In the arithmetic determination section 2551, when the shape information of the first pixel to be processed is "1", the selector 3251 switches the received preceding proximal pixel to the first pixel to be processed, and the first pixel to be processed is input to the adder 2553. In addition, a value obtained by ORing the value of the preceding proximal pixel flag and the shape information of the first pixel to be processed is input to the AND element 2557 (for detecting the condition for selecting the average value calculated by the adder).

Since only the case wherein the shape information of the second pixel to be processed is "0" is being examined here, the presence of the selector 3253 and OR element 3257 is neglected, and the succeeding proximal pixel output from the OR element 2509 is processed in the same manner as in the 18th embodiment.

Thus, the same processing result as in the 18th embodiment is output for the second pixel to be processed.

A case wherein both pieces of shape information of the two pixels to be processed are "0" is incorporated in the above description of operation when the two pieces of shape information are "0".

Hence, it was confirmed that two pixels can be appropriately processed using the arrangement shown in FIG. 38 because the padding processing outputs for the two pixels to be processed are the same as in the 18th embodiment regardless of the values of the two pieces of shape information.

This embodiment is based on the 18th embodiment. The 19th to 21st embodiments can also be extended to the two-pixel simultaneous processing. More pixels can also be simultaneously processed.

As described above, according to the 22nd embodiment, the image processing apparatus (padding processing apparatus) can efficiently execute sequential padding processing by employing an arrangement in which on the basis of first data formed from pixel data to be processed and the binary shape information thereof, second data formed from a subsequent proximal pixel as significant pixel data in the unprocessed pixel data, which is closest to the pixel to be processed, and flag information representing whether the pixel is present, and third data containing another pixel data, pixel data that has undergone padding processing is output by selecting the average value of two of the above pixels or the above pixel.

The padding processing image processing sections in the above-described 18th to 22nd embodiments can be applied to encode/decode an image. In application to encoding, the apparatus has the same arrangement as in FIG. 8 described above. In application to decoding, the apparatus has the same arrangement as in FIG. 9 described above. That is, the image processing section described in one of the 18th to 22nd embodiments is used as the padding device 17 in FIG. 8 or padding device 63 in FIG. 9.

As described above, according to the 18th to 22nd embodiments, sequential padding processing can be efficiently executed.

[23rd Embodiment]

In the following embodiment, a row direction is defined as the horizontal direction, and a column direction is defined as the vertical direction.

Figure 41:
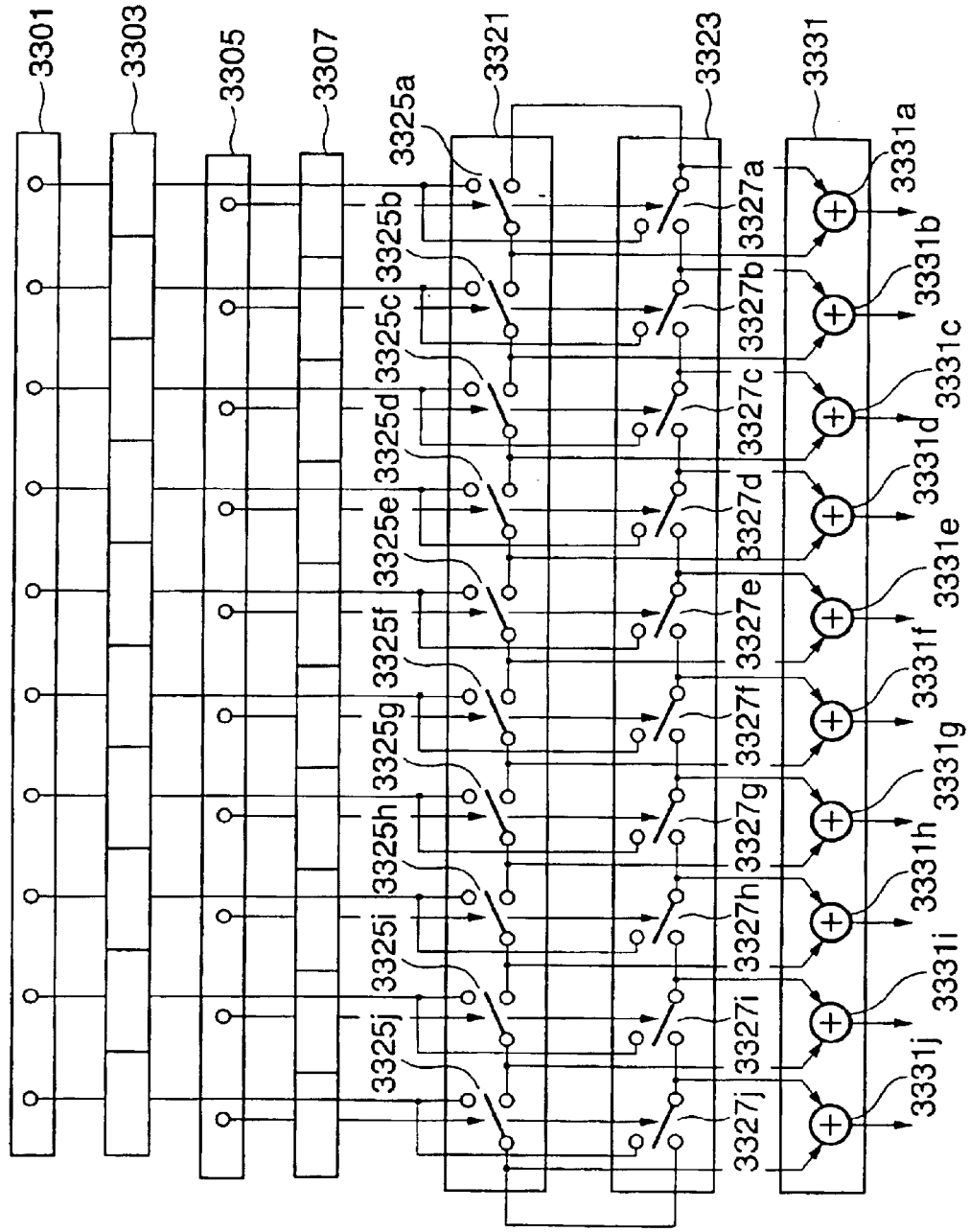
FIG. 41 is a block diagram showing a padding processing circuit according to the 23rd embodiment of the present invention.

FIG. 41 shows a padding processing circuit of this embodiment. The padding processing circuit shown in FIG. 41 executes one-dimensional padding processing for row data with 10 pixels. This can be extended to one-dimensional padding processing for an arbitrary number of pixel data.

Referring to FIG. 41, a terminal group 3301 inputs pixel data (8 bits) to be subjected to padding processing. A register group 3303 holds the pixel data. A terminal group 3305 inputs binary shape information (1-bit attribute data for each pixel) representing whether the pixel of each pixel data is in an object or outside the object. A register group 3307 holds the pieces of binary shape information. A left propagation processing section 3321 propagates the pixel data to the left. A right propagation processing section 3323 propagates the pixel data to the right. Selectors 3325a to 3325j constitute the left propagation processing section 3321. Selectors 3327a to 3327j constitute the right propagation processing section 3323. Adders 3331a to 3331j calculate the average value between two pixel data.

Operation of the padding processing circuit having the above arrangement will be described below with reference to FIG. 41.

Ten pixel data to be subjected to padding processing and 10 pieces of binary shape information corresponding to the pixel data are input from the terminal groups 3301 and 3305 one by one or simultaneously and held by the register groups 3303 and 3307, respectively. Binary shape information "1" represents a pixel in an object and "0" represents a pixel is outside the object.

The pixel data held by the register group 3303 are input to corresponding selectors (3325a to 3325j and 3327a to 3327j) in the left and right propagation processing sections 3321 and 3323.

The pieces of binary shape information held by the register group 3307 are input as control signals for corresponding selectors (3325a to 3325j and 3327a to 3327j) in the left and right propagation processing sections 3321 and 3323.

In the left propagation processing section 3321, the pixel data in the objects propagate to the left. In the right propagation processing section 3323, the pixel data in the objects propagate to the right.

Each of the selectors (3325a to 3325j and 3327a to 3327j) operates to select pixel data input from a corresponding register in the register group 3303 when the control signal is "1", and selects pixel data propagated to the left or right in the propagation section 3321 or 3323 when the control signal is "0". The pixel data selected by the selectors (3325a to 3325j and 3327a to 3327j) are sent to the adders 3331, and the average values are calculated by the adders 3331 and output.

The operation on the above-described padding processing circuit will be described with reference to FIGS. 42A to 42E using specific numerical data. FIG. 42A shows binary shape information, FIG. 42B shows (input) pixel data to be subjected to padding processing (a pixel outside an object is insignificant and its description is omitted), FIG. 42C shows the output values from the selectors (3325a to 3325j) corresponding to the respective pixels in the left propagation processing section 3321, FIG. 42D shows the output values from the selectors (3327a to 3327j) corresponding to the respective pixels in the right propagation processing section 3323, and FIG. 42E shows average values as output values from the calculators 3331.

The average value of two values selected for each pixel is obtained by the adder 3331 and output as a padding processing result. For a pixel in an object, since the two selected values (input pixel data) equal each other, the pixel value does not change even when they are averaged. On the other hand, in a region sandwiched between objects (region where binary shape information is "0"), since the two selected values (input pixel data propagated to the left by the left propagation processing section 3321 and input pixel data propagated to the right by the right propagation processing section 3323) are different, the average value is calculated in units of pixels and output as a padding processing result.

With the above processing, a value in an external region sandwiched between objects is replaced with the average value of pixel data in the objects on the left and right sides of that region. Data in another region outside the objects is replaced with pixel data in the object in contact with the region.

In addition, padding processing can also be executed for an arbitrary number of pixels fewer than 10. In this case, binary shape information corresponding to a terminal without any pixel input is fixed to "0". To process 16 pixels in the same way as described above, the numbers of selectors and adders are increased accordingly.

Figure 43:
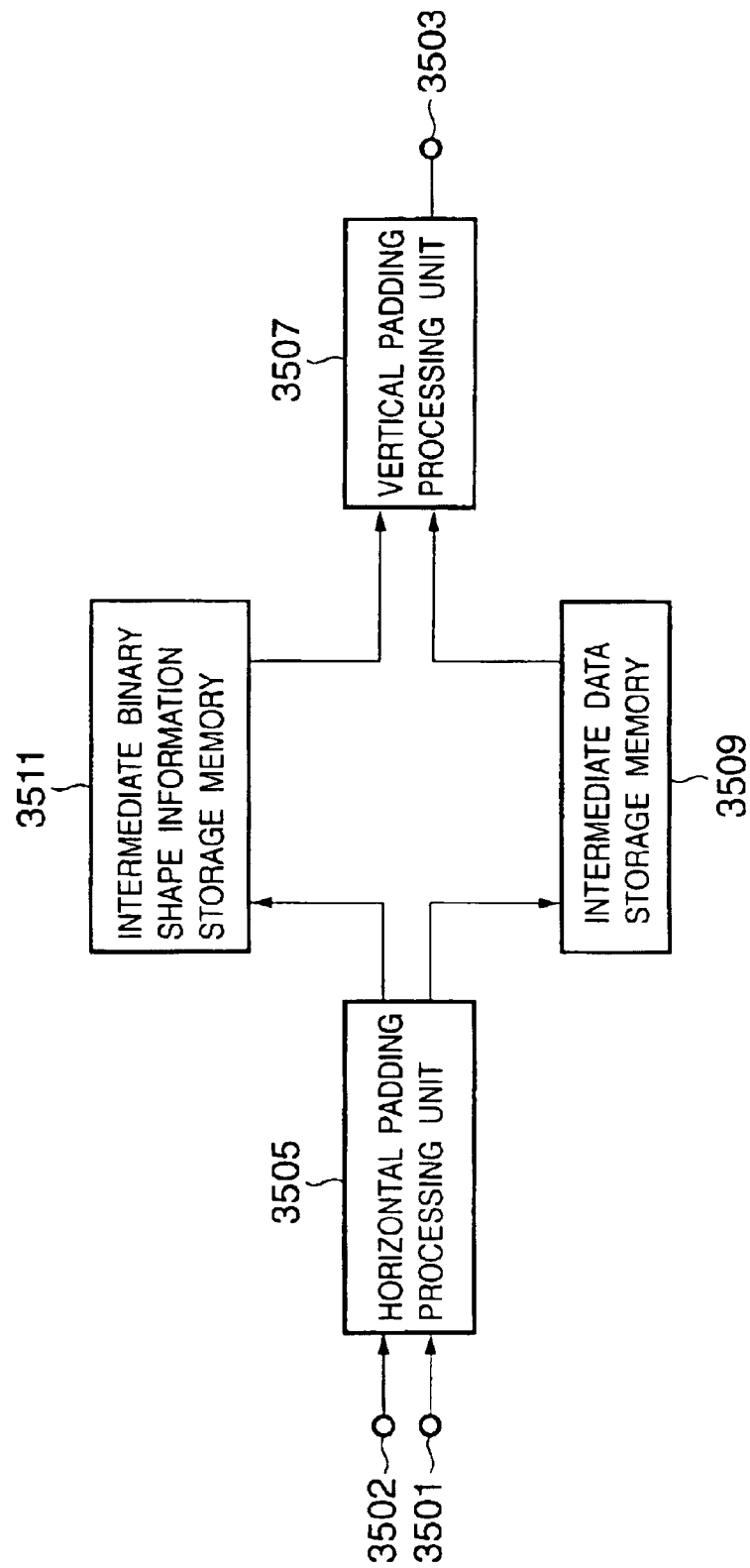
FIG. 43 is a block diagram showing an arrangement example of a padding processing unit.

The above-described padding processing circuit can be used as a horizontal padding processing unit 3505 or vertical padding processing unit 3507 of the image processing apparatus (padding processing apparatus) shown in FIG. 43.

The operational mechanism of the above-described padding processing circuit uses the fact in the above description with reference to FIGS. 11A to 11C in which pieces of intermediate binary shape information of one row have the same value after horizontal padding processing. When the pixel data of one row before horizontal padding processing contain even one significant pixel (pixel having binary shape information=1), all the pixel data after the horizontal padding processing are significant. Inversely, if no significant pixels are present (insignificant pixel (pixel having binary shape information=0)), padding processing need not be executed. Even when the processing is executed, no significant pixel is obtained. All pixels are insignificant and are not reflected to the final output.

Figure 44:
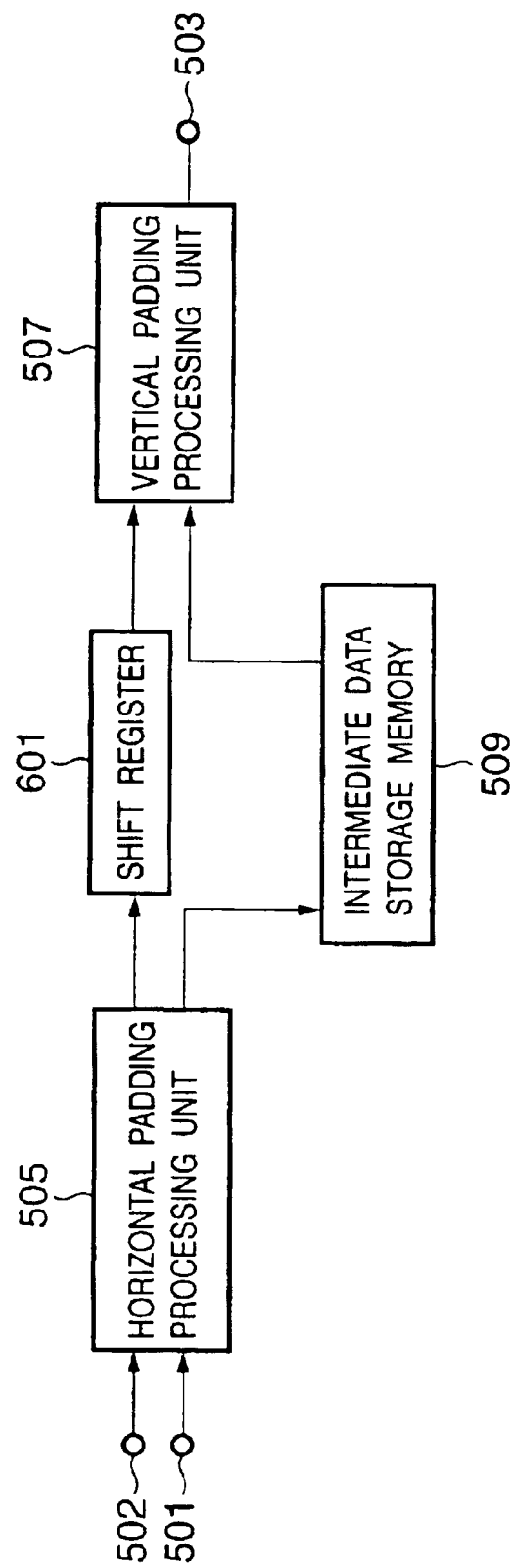
FIG. 44 is a block diagram showing the arrangement of an image processing apparatus according to the 23rd embodiment of the present invention.

The arrangement of an image processing apparatus for executing the horizontal padding processing and vertical padding processing in this embodiment using the above padding processing circuit is shown in FIG. 44. The arrangement is different from that of the image processing apparatus shown in FIG. 43 in that a shift register 3601 is used in place of an intermediate binary shape information storage memory 3511.

Every time horizontal padding processing for pixel data of one row is executed, 1-bit intermediate binary shape information is input to the shift register 3601. This intermediate binary shape information is secondarily obtained in executing the padding processing, though, logically, it can be obtained by obtaining the OR of all pieces of binary shape information for the pixel data of the row to be subjected to the padding processing. That is, when even one pixel of a row has binary shape information "1" (i.e., when a significant pixel is present), the value of the intermediate binary shape information for this row is "1".

For example, for a block size of 16×16 bits, when horizontal padding processing for one block is ended, 16-bit intermediate binary shape information for each row is held in the shift register 3601.

Hence, in the next vertical padding processing, when this 16-bit intermediate binary shape information is used as binary shape information, vertical padding processing for all pixel data in an intermediate data storage memory 3509 can be executed.

Figure 45:
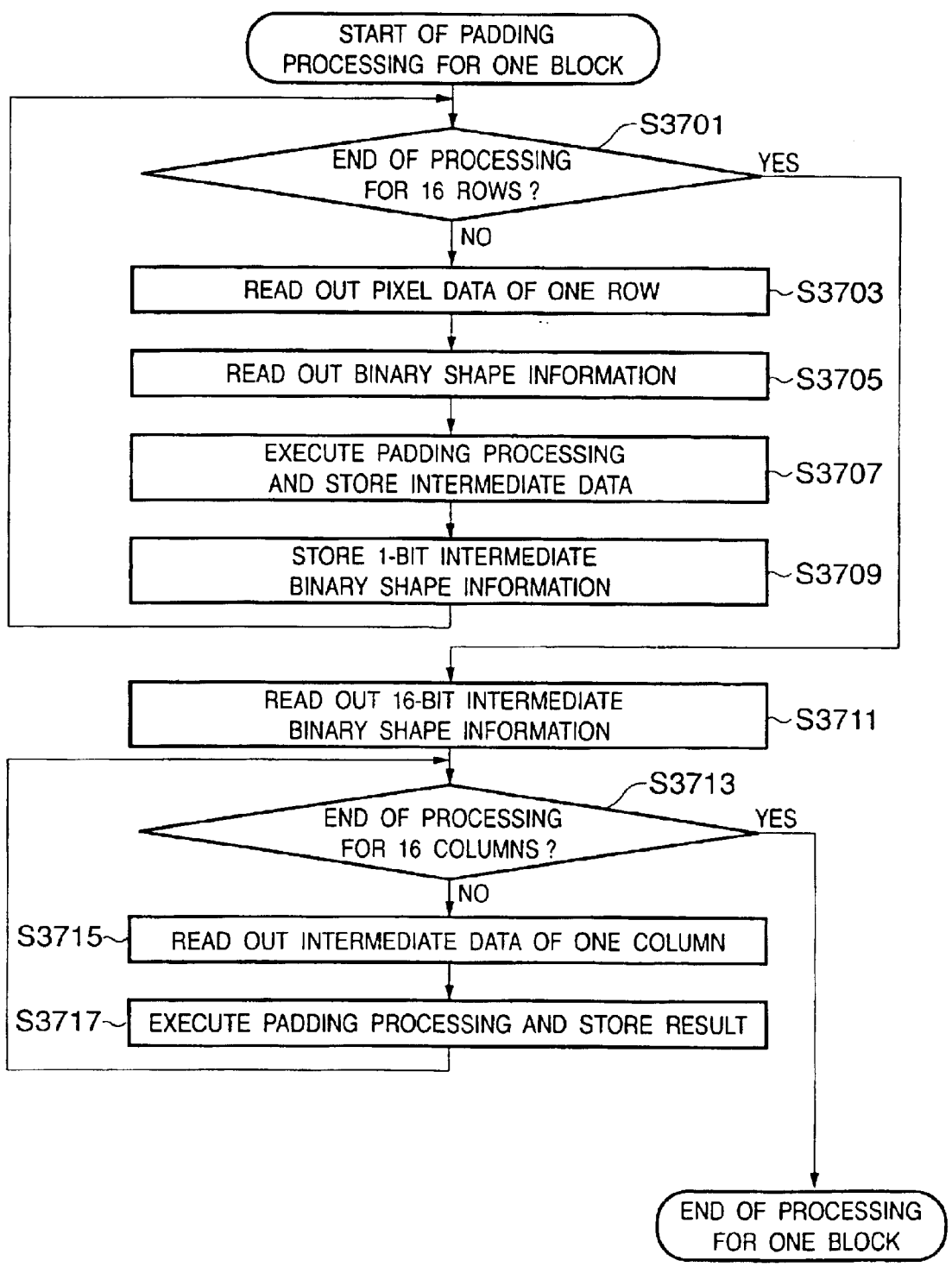
FIG. 45 is a flow chart of an image processing method performed by the image processing apparatus according to the 23rd embodiment of the present invention.

FIG. 45 is a flow chart of an image processing method (padding processing) executed by the above image processing apparatus.

It is determined in step S3701 whether the horizontal padding processing for all the 16 rows is ended. If NO in step S3701, the flow advances to step S3703. If YES in step S3701, the flow advances to step S3711.

In step S3703, pixel data (of 16 pixels) of one row to be subjected to the horizontal padding processing are read out from a RAM (not shown) and input to a terminal 3501.

In step S3705, the pieces of binary shape information of pixel data (of 16 pixels) of the row to be subjected to the horizontal padding processing are read out from the RAM (not shown) and input to a terminal 3502.

In step S3707, the horizontal padding processing is executed for the pixel data of one row read out from the RAM (not shown), and intermediate data are stored in the intermediate data storage memory 3509.

In step S3709, 1-bit intermediate binary shape information corresponding to one row, which is obtained by ORing, is stored in the shift register 3601.

In step S3711, 16 bits of intermediate binary shape information stored in the shift register 3601 as a result of horizontal padding processing for the 16 rows are read out.

It is determined ins step S3713 whether the vertical padding processing for all the 16 columns is ended. If NO in step S3713, the flow advances to step S3715. If YES in step S3713, this processing is ended because the padding processing for one block is ended.

In step S3715, intermediate data of one column to be subjected to the vertical padding processing are read out from the intermediate data storage memory 3509.

In step S3717, the vertical padding processing is executed for the intermediate data read out in step S3715, and the processing result is stored in a predetermined memory area (not shown).

In this embodiment, the vertical padding processing is executed after the horizontal padding processing. However, the order of padding processing is not limited to this, and the order may be reversed.

With the arrangement of the above image processing apparatus, the conventionally required intermediate binary shape information storage memory 3511 can be omitted. As a consequence, only one memory suffices, and the number of memories used can be decreased as compared to the prior art. In addition, with the above image processing method, in executing the horizontal padding processing and then the vertical padding processing, the pieces of binary shape information need not be rearranged, unlike the prior art.

Figure 47:
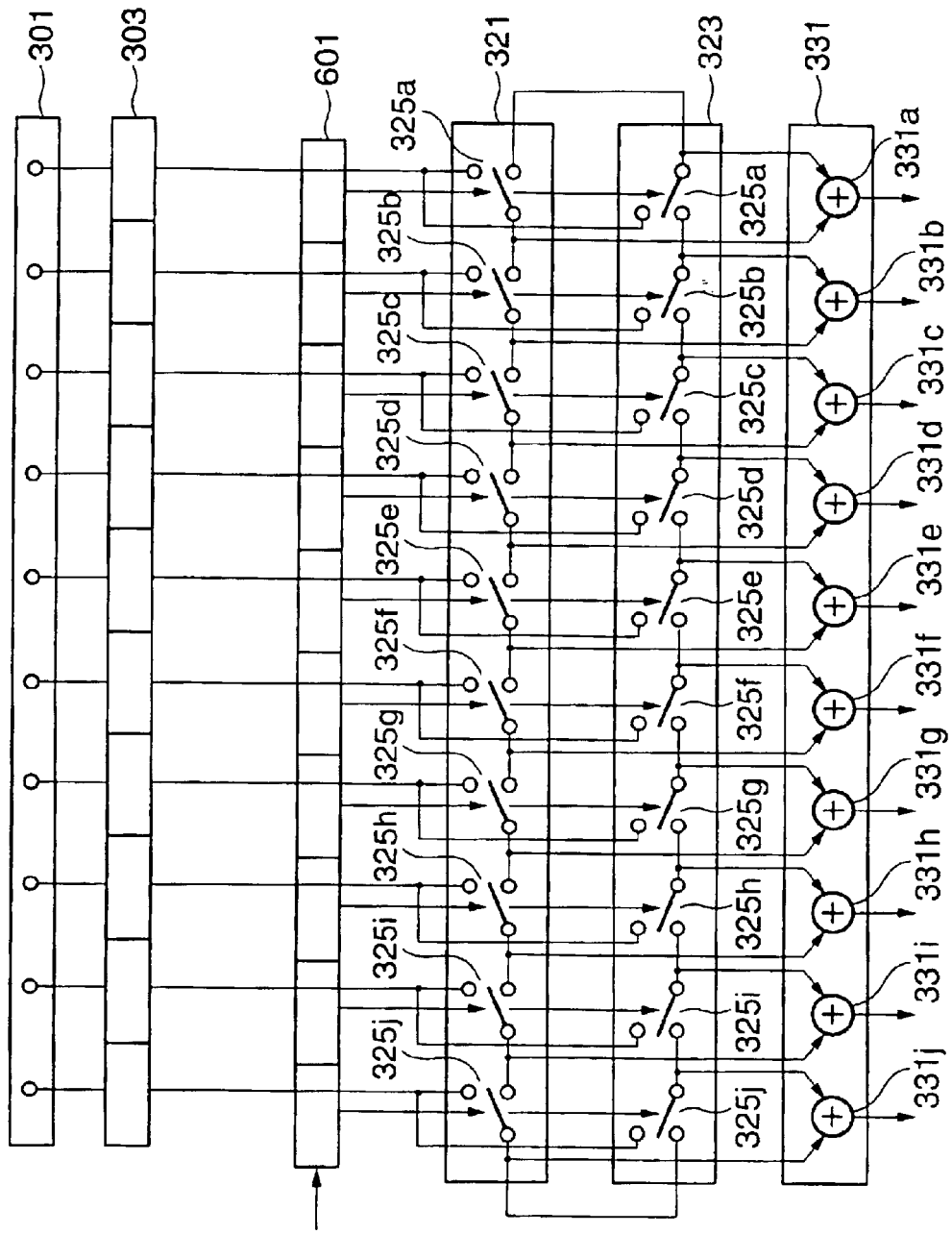
FIG. 47 is a block diagram showing the arrangement of a vertical padding processing circuit.

In this embodiment, the vertical padding processing unit has the arrangement shown in FIG. 41, as described above. However, as shown in FIG. 47, the register group 3307 shown in FIG. 41 may be omitted, and instead, the shift register 3601 may be inserted to the position of the register group 3307. When binary shape information from the horizontal padding processing unit 3505 is directly input to the shift register 3601, the vertical padding processing unit having the shift register 3601 can execute the above-described vertical padding processing, and also, the number of registers used can be decreased by the number of registers 3307 in the whole image processing apparatus.

[24th Embodiment]

Figure 46:
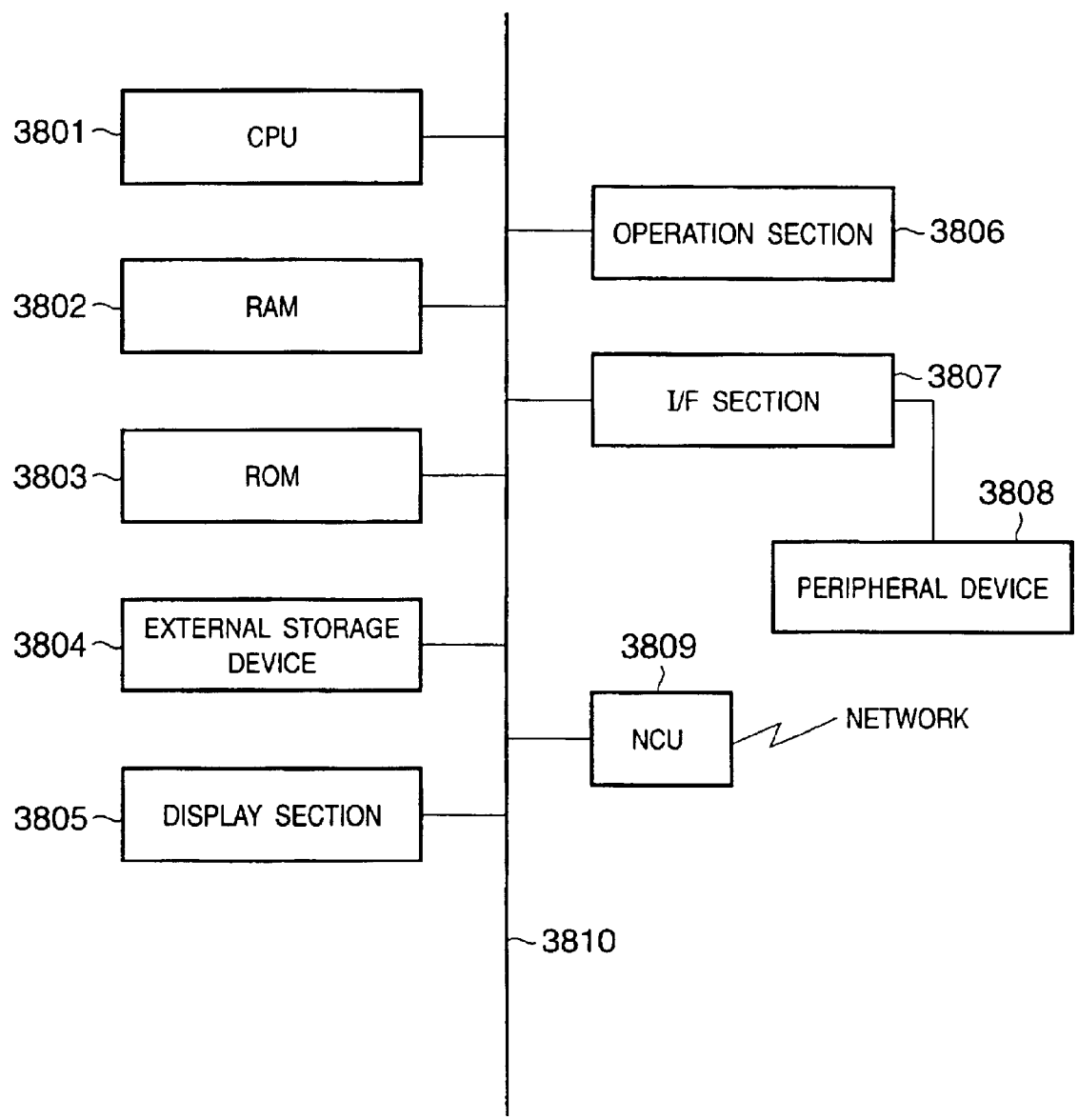
FIG. 46 is a block diagram showing the arrangement of a computer in the 24th embodiment of the present invention.

The image processing method described in the 23rd embodiment can be practiced even on a computer. FIG. 46 is a block diagram showing the arrangement of a computer according to the 24th embodiment.

A CPU 3801 controls the entire computer and also executes image processing such as padding processing on the basis of various program codes and data stored in a RAM 3802.

The RAM 3802 temporarily stores various program codes and data loaded from an external storage device 3804 and also has a work area where the CPU 3801 executes the above-described program codes. The program codes for padding processing comply with the flow chart shown in FIG. 45 and are stored in the RAM 3802. The RAM 3802 is used as a memory space (corresponding to the intermediate data storage memory in the flow chart of FIG. 45) required to execute this program.

A ROM 3803 stores program codes and data necessary to activate the computer and also stores font data corresponding to character codes, and the like.

The external storage device 3804 saves various program codes and data loaded from a storage medium such as a CD-ROM or floppy disk and also saves drivers of peripheral devices, including a printer driver and scanner driver.

A display section 3805 is formed from a CRT or liquid crystal panel and displays an image to be subjected to padding processing or a system message from the computer.

An operation section 3806 is formed from a pointing device such as a keyboard or mouse and can input various instructions (designation of the block size in padding processing) to the computer.

An interface (I/F) section 3807 such as an RS-232C interface connects the computer to a peripheral device.

A peripheral device 3808, including a printer or scanner, is connected to the computer through the I/F section 3807 to input/output image data or character data to/from the computer.

An NCU 3809 can output, e.g., image data that has undergone padding processing to an external computer through a communication line such as a LAN. The NCU 3809 can also download image data through the Internet.

A bus 3810 connects the above-described sections.

With the computer having the above arrangement, the image processing method described in the first embodiment can be practiced on this computer.

As described above, according to the 23rd and 24th embodiments, the number of memories used for padding processing can be decreased. In addition, padding processing can be executed without rearranging pieces of binary shape information.

The first to 24th embodiments maybe applied to a system constituted by a plurality of devices (e.g., a host computer, an interface device, a reader, a printer, and the like) or an apparatus comprising a single device (e.g., a copying machine, a facsimile apparatus, or the like).

The objects of the first to 24th embodiments are achieved even by supplying a storage medium (or recording medium) which stores software program codes for implementing the functions of the above-described embodiments to the system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the first to 24th embodiments. The functions of the above-described embodiments are implemented not only when the readout program codes are executed by the computer but also when the operation system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the first to 24th embodiments are applied to the storage medium, the storage medium stores program codes corresponding to the above-described flow chart (FIG. 44).

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for processing image data on the basis of attribute data, comprising:
   first propagation means for propagating, of a plurality of pixel data which construct one-dimensional image data, pixel data specified by the attribute data in a first direction;
   second propagation means for propagating, of the plurality of pixel data which construct the one-dimensional image data, the pixel data specified by the attribute data in a second direction opposite to the first direction;
   arithmetic means for executing arithmetic processing for an output from said first propagation means and an output from said second propagation means to generate a plurality of pixel data which construct image data as a processing result;
   data holding means for sequentially holding one-dimensional image data output from data processing means comprising said first propagation means, said second propagation means, and said arithmetic means, thereby consequently holding two-dimensional image data; and
   data supply means for sequentially supplying, to said data processing means, the two-dimensional image data held by said data holding means as one-dimensional image data in a direction different from that of the one-dimensional image data output from said data processing means, thereby causing said data processing means to reprocess the image data.

2. The apparatus according to claim 1, wherein said arithmetic means generates the plurality of pixel data which construct the image data as the processing result by calculating an average value between the output from said first propagation means and the output from said second propagation means.

3. The apparatus according to claim 1, further comprising input means for inputting the pixel data to an upstream side of said first propagation means and an upstream side of said second propagation means in propagating the pixel data.

4. The apparatus according to claim 3, wherein said input means inputs a downstream output from said first propagation means to the upstream side of said second propagation means and a downstream output from said second propagation means to the upstream side of said first propagation means.

5. The apparatus according to claim 4, wherein said input means controls data to be input to the upstream side of said first propagation means and/or the upstream side of said second propagation means on the basis of the attribute data.

6. The apparatus according to claim 1, wherein the attribute data is 1-bit data for each pixel data.

7. The apparatus according to claim 1, wherein the attribute data is data representing whether corresponding pixel data belongs to an object in an image.

8. The apparatus according to claim 1, wherein said first and/or second propagation means has a plurality of selectors corresponding to the plurality of pixel data of the one-dimensional image data, each selector selecting and outputting pixel data on an upstream side or original pixel data on the basis of the attribute data.

9. The apparatus according to claim 1, further comprising attribute data generation means for generating, on the basis of original attribute data, attribute data necessary to cause said data processing means to reprocess the image data, and supplying the generated attribute data to said data processing means.

10. An image processing apparatus for processing image data on the basis of attribute data, comprising:
    first propagation means for propagating, of a plurality of pixel data which construct one-dimensional image data, pixel data specified by the attribute data in a first direction;
    second propagation means for propagating, of the plurality of pixel data which construct the one-dimensional image data, the pixel data specified by the attribute data in a second direction opposite to the first direction;
    arithmetic means for executing arithmetic processing for an output from said first propagation means and an output from said second propagation means to generate a plurality of pixel data which construct image data as a processing result;
    first data processing means comprising means equivalent to said first propagation means, said second propagation means, and said arithmetic means,
    second data processing means comprising means equivalent to said first propagation means, said second propagation means, and said arithmetic means,
    data holding means for sequentially holding one-dimensional image data output from said first data processing means, thereby consequently holding two-dimensional image data; and
    data supply means for sequentially supplying, to said second data processing means, the two-dimensional image data held by said data holding means as one-dimensional image data in a direction different from that of the one-dimensional image data output from said first data processing means.

11. The apparatus according to claim 10, further comprising attribute data generation means for generating, on the basis of attribute data to be supplied to said first data processing means, attribute data necessary to cause said second data processing means to process the image data, and supplying the generated attribute data to said second data processing means.

12. The apparatus according to claim 10, wherein said first and second data processing means continuously process two-dimensional image data formed from a plurality of blocks.

13. The apparatus according to claim 10, wherein said data holding means outputs the image data to be supplied to said second data processing means while receiving the image data output from said first data processing means.

14. The apparatus according to claim 10, wherein said data holding means has a function of shifting the data in first and second directions perpendicular to each other, executes a shift operation in the first direction in receiving two-dimensional image data of a first block from said first data processing means, and executes the shift operation in the second direction in receiving two-dimensional image data of a second block from said first data processing means.

15. An image processing method of processing image data on the basis of attribute data, comprising:
   a first propagation step, of propagating, of a plurality of pixel data which construct one-dimensional image data, pixel data specified by the attribute data in a first direction;
   a second propagation step, of propagating, of the plurality of pixel data which construct the one-dimensional image data, the pixel data specified by the attribute data in a second direction opposite to the first direction;
   an arithmetic step, of executing arithmetic processing for a result obtained in said first propagation step and a result obtained in said second propagation step to generate a plurality of pixel data which construct image data as a processing result;
   a data holding step, of sequentially holding one-dimensional image data output from a data processing step including said first propagation step, said second propagation step, and said arithmetic means, thereby consequently holding two-dimensional image data, and
   a data supply step, of sequentially supplying, to said data processing step, the two-dimensional image data held in said data holding step as one-dimensional image data in a direction different from that of the one-dimensional image data output from said data processing step, thereby causing said data processing step to include reprocessing the image data.

16. A storage medium storing a program for causing a computer to execute a function of said image processing apparatus of claim 1.

17. An image encoding apparatus comprising said image processing apparatus of claim 1.

18. An image decoding apparatus comprising said image processing apparatus of claim 1.

19. An image processing apparatus for processing image data on the basis of attribute data, comprising:
   first propagation means for propagating, of a plurality of pixel data which construct one-dimensional image data, pixel data specified by the attribute data in a first direction;
   second propagation means for propagating, of the plurality of pixel data which construct the one-dimensional image data, the pixel data specified by the attribute data in a second direction opposite to the first direction;
   a plurality of arithmetic means for executing arithmetic processing for an output from said first propagation means and an output from said second propagation means to generate a plurality of pixel data which construct one-dimensional output image data,
   wherein at least one of said plurality of arithmetic means is prepared to determine values of at least two pixel data of the one-dimensional output image data; and
   selection means for selecting pixel data to be supplied to said at least one arithmetic means,
   wherein one one-dimensional image data is processed in multiple processing cycles while controlling said selection means in accordance with a processing cycle.

20. The apparatus according to claim 19, further comprising determination means for determining whether an output from said at least one arithmetic means is to be used as each of the values of the at least two pixel data of the one-dimensional output image data.

21. The apparatus according to claim 20, wherein said determination means individually determines on the basis of the attribute data whether the output from said at least one arithmetic means is to be used as each of the values of the at least two pixel data of the one-dimensional output image data.

22. The apparatus according to claim 20, wherein
   said apparatus further comprises selection means for selecting pixel data to be supplied to said at least one arithmetic means, and
   said determination means and selection means are controlled on the basis of the attribute data.

23. The apparatus according to claim 20, further comprising
   selection means for selecting pixel data to be supplied to said at least one arithmetic means, and
   control means for controlling a processing cycle in processing the one-dimensional image data on the basis of the attribute data,
   said selection means being controlled on the basis of the processing cycle.

24. The apparatus according to claim 20, further comprising:
   selection means for selecting pixel data to be supplied to said at least one arithmetic means; and
   control means for controlling a processing cycle in processing the one-dimensional image data on the basis of the attribute data,
   wherein said determination means and selection means are controlled on the basis of the attribute data and the processing cycle.

25. The apparatus according to claim 19, wherein each of said arithmetic means generates the pixel data which construct the output image by calculating an average value between the output from said first propagation means and the output from said second propagation means.

26. The apparatus according to claim 19, further comprising input means for inputting the pixel data to an upstream side of said first propagation means and an upstream side of said second propagation means in propagating the pixel data.

27. The apparatus according to claim 26, wherein said input means inputs a downstream output from said first propagation means to the upstream side of said second propagation means and a downstream output from said second propagation means to the upstream side of said first propagation means.

28. The apparatus according to claim 19, wherein the attribute data is 1-bit data for each pixel data.

29. The apparatus according to claim 19, wherein the attribute data is data representing whether corresponding pixel data belongs to an object in an image.

30. An image processing apparatus for processing image data on the basis of attribute data comprising:
   first propagation means for propagating, of a plurality of pixel data which construct one-dimensional image data, pixel data specified by the attribute data in a first direction;
   second propagation means for propagating, of the plurality of pixel data which construct the one-dimensional image data, the pixel data specified by the attribute data in a second direction opposite to the first direction; and a plurality of arithmetic means for executing arithmetic processing for an output from said first propagation means and an output from said second propagation means to generate a plurality of pixel data which construct one-dimensional output image data, wherein at least one of said plurality of arithmetic means is prepared to determine values of at least two pixel data of the one-dimensional output image data, and wherein said first and/or second propagation means has a plurality of selectors corresponding to the plurality of pixel data of the one-dimensional image data, each selector selecting and outputting pixel data on an upstream side or original pixel data on the basis of the attribute data.

31. An image encoding apparatus comprising said image processing apparatus of claim 19.

32. An image decoding apparatus comprising said image processing apparatus of claim 19.

33. An image processing apparatus for processing image data on the basis of attribute data, comprising:

first propagation means for propagating, of a plurality of pixel data which construct one-dimensional image data, pixel data specified by the attribute data in a first direction;

second propagation means for propagating, of the plurality of pixel data which construct the one-dimensional image data, the pixel data specified by the attribute data in a second direction opposite to the first direction;

arithmetic means for sequentially generating and outputting, in each cycle, one of a plurality of pixel data which construct one-dimensional output image data, while executing arithmetic processing upon receiving pixel data output from an output terminal of said first propagation means and pixel data output from an output terminal of said second propagation means;

a first shift register for supplying the plurality of pixel data of the one-dimensional image data to said first and second propagation means while shifting the pixel data in the second direction in every cycle;

a second shift register for supplying the attribute data to said first and second propagation means while shifting the attribute data in the second direction in every cycle; and data padding means for padding pixel data, which is lost from said first propagation means by the shift operation, to said first propagation means.

34. The apparatus according to claim 33, wherein a downstream end of said first propagation means is connected to an upstream end of said second propagation means, and data for controlling not to propagate insignificant pixel data through said first and second propagation means is supplied to said second shift register next to the attribute data.

35. The apparatus according to claim 33, wherein said second shift register has a parallel input mechanism.

36. The apparatus according to claim 33, further comprising control means for controlling said first and second propagation means to continuously process one one-dimensional image data and subsequent one-dimensional image data.

37. The apparatus according to claim 36, wherein said control means controls said first and second propagation means not to cause any interference between processing for the one one-dimensional image data and that for the subsequent one-dimensional image data.

38. The apparatus according to claim 33, wherein the attribute data is data representing whether corresponding pixel data belongs to an object in an image.

39. The apparatus according to claim 38, wherein said arithmetic means calculates an average value between the pixel data output from the output terminal of said first propagation means and the pixel data output from the output terminal of said second propagation means.

40. An image encoding apparatus comprising said image processing apparatus of claim 38.

41. An image decoding apparatus comprising said image processing apparatus of claim 38.

42. An image processing apparatus for processing image data on the basis of attribute data, comprising:

first propagation means for propagating, of a plurality of pixel data which construct one-dimensional image data, pixel data specified by the attribute data in a first direction;

second propagation means for propagating, of the plurality of pixel data which construct the one-dimensional image data, the pixel data specified by the attribute data in a second direction opposite to the first direction;

arithmetic means for sequentially generating and outputting, in each cycle, one of a plurality of pixel data which construct one-dimensional output image data, while executing arithmetic processing upon receiving pixel data output from an output terminal of said first propagation means and pixel data output from an output terminal of said second propagation means;

a first shift register for supplying the plurality of pixel data of the one-dimensional image data to said first and second propagation means while shifting the pixel data in the second direction in every cycle;

a second shift register for supplying the attribute data to said first and second propagation means while shifting the attribute data in the second direction in every cycle; and data padding means for padding pixel data, which is output from the output terminal of said first propagation means in a preceding cycle, to an upstream end of said first propagation means.

43. The apparatus according to claim 42, wherein, when first pixel data of the one-dimensional image data is to be processed, said data padding means pads pixel data, which is output from the output terminal of said second propagation means, to the upstream end of said first propagation means.

44. An image processing apparatus for processing image data on the basis of attribute data comprising:

first propagation means for propagating, of a plurality of pixel data which construct one-dimensional image data, pixel data specified by the attribute data in a first direction;

second propagation means for propagating, of the plurality of pixel data which construct the one-dimensional image data, the pixel data specified by the attribute data in a second direction opposite to the first direction;

arithmetic means for sequentially generating and outputting, in each cycle, one of a plurality of pixel data which construct one-dimensional output image data, while executing arithmetic processing upon receiving pixel data output from an output terminal of said first propagation means and pixel data output from an output terminal of said second propagation means;

a first shift register for supplying the plurality of pixel data of the one-dimensional image data to said first and second propagation means while shifting the pixel data in the second direction in every cycle;

a second shift register for supplying the attribute data to said first and second propagation means while shifting the attribute data in the second direction in every cycle; and data padding means for padding pixel data on a downstream side in a preceding cycle with respect to the output terminal to the output terminal of said first propagation means.

45. The apparatus according to claim 44, wherein said data padding means pads the pixel data in processing second and subsequent pixel data of the plurality of pixel data of the one-dimensional image data.

46. An image processing apparatus for processing image data on the basis of attribute data, comprising:

first propagation means for propagating, of a plurality of pixel data which construct one-dimensional image data, pixel data specified by the attribute data in a first direction;

second propagation means for propagating, of the plurality of pixel data which construct the one-dimensional image data, the pixel data specified by the attribute data in a second direction opposite to the first direction; and arithmetic means for sequentially generating and outputting, in each cycle, one of a plurality of pixel data which construct one-dimensional output image data, while executing arithmetic processing upon receiving pixel data output from an output terminal of said first propagation means and pixel data output from an output terminal of said second propagation means, wherein a downstream end of said first propagation means is connected to an upstream end of said second propagation means.

47. An image processing apparatus for processing image data on the basis of attribute data comprising:

first propagation means for propagating, of a plurality of pixel data which construct one-dimensional image data, pixel data specified by the attribute data in a first direction;

second propagation means for propagating, of the plurality of pixel data which construct the one-dimensional image data, the pixel data specified by the attribute data in a second direction opposite to the first direction;

arithmetic means for sequentially generating and outputting, in each cycle, one of a plurality of pixel data which construct one-dimensional output image data, while executing arithmetic processing upon receiving pixel data output from an output terminal of said first propagation means and pixel data output from an output terminal of said second propagation means; and control means for controlling said first and second propagation means to continuously process one one-dimensional image data and subsequent one-dimensional image data, wherein said control means controls said first and second propagation means on the basis of delimiter information for specifying a boundary between the one one-dimensional image data and the subsequent one-dimensional image data.

48. An image processing apparatus for processing image data on the basis of attribute data comprising:

first propagation means for propagating, of a plurality of pixel data which construct one-dimensional image data, pixel data specified by the attribute data in a first direction;

second propagation means for propagating, of the plurality of pixel data which construct the one-dimensional image data, the pixel data specified by the attribute data in a second direction opposite to the first direction;

arithmetic means for sequentially generating and outputting, in each cycle, one of a plurality of pixel data which construct one-dimensional output image data, while executing arithmetic processing upon receiving pixel data output from an output terminal of said first propagation means and pixel data output from an output terminal of said second propagation means; and a register between said first propagation means and said arithmetic means and between said second propagation means and said arithmetic means, wherein said arithmetic means executes the arithmetic processing for, as input data, the pixel data supplied from said first and second propagation means through said registers.

49. An image processing apparatus for processing image data on the basis of attribute data, comprising:

first propagation means for propagating, of a plurality of pixel data which construct one-dimensional image data, pixel data specified by the attribute data in a first direction;

second propagation means for propagating, of the plurality of pixel data which construct the one-dimensional image data, the pixel data specified by the attribute data in a second direction opposite to the first direction; and arithmetic means for sequentially generating and outputting, in each cycle, one of a plurality of pixel data which construct one-dimensional output image data, while executing arithmetic processing upon receiving pixel data output from an output terminal of said first propagation means and pixel data output from an output terminal of said second propagation means, wherein the attribute data is 1-bit data for each pixel data.

50. An image processing apparatus for processing image data on the basis of attribute data comprising:

first propagation means for propagating, of a plurality of pixel data which construct one-dimensional image data, pixel data specified by the attribute data in a first direction;

second propagation means for propagating, of the plurality of pixel data which construct the one-dimensional image data, the pixel data specified by the attribute data in a second direction opposite to the first direction; and arithmetic means for sequentially generating and outputting, in each cycle, one of a plurality of pixel data which construct one-dimensional output image data, while executing arithmetic processing upon receiving pixel data output from an output terminal of said first propagation means and pixel data output from an output terminal of said second propagation means, wherein said first and/or second propagation means has a plurality of selectors corresponding to the plurality of pixel data of the one-dimensional image data, each selector selecting and outputting pixel data on an upstream side or original pixel data on the basis of the attribute data.

51. An image processing apparatus having padding processing of, for an image object which constructs part of image data having a rectangular shape and has an arbitrary shape, substituting appropriate pixel data into a region outside the image object in the rectangular image region, comprising:

input means for sequentially inputting pixel data in a one-dimensional direction and attribute information representing whether the pixel data is a pixel in or outside the image object;

first flag information generation means for generating, from the attribute information, first flag information representing whether unprocessed pixel data which is closest to pixel data of interest and present in the image object is present;

second flag information generation means for generating, from the attribute information, second flag information representing whether processed pixel data which is closest to the pixel data of interest and present in the image object is present; and output means for outputting pixel data for padding processing in accordance with the attribute information, the first flag information, and the second flag information.

52. The apparatus according to claim 51, wherein said output means comprises generation means for generating average data between the processed pixel data and the unprocessed pixel data and selectively outputs desired data from the pixel data of interest, processed pixel data, unprocessed pixel data, and average data in accordance with the attribute information and the first and second flag information.

53. The apparatus according to claim 52, wherein, when the attribute information indicates that the pixel data of interest is a pixel outside the object, the first flag information indicates that the unprocessed pixel data is not present, and the second flag information indicates that the processed pixel data is present, said output means outputs the processed pixel data.

54. The apparatus according to claim 52, wherein, when the attribute information indicates that the pixel data of interest is a pixel outside the object, the first flag information indicates that the unprocessed pixel data is present, and the second flag information indicates that the processed pixel data is present, said output means outputs the average data.

55. The apparatus according to claim 52, wherein, when the attribute information indicates that the pixel data of interest is a pixel outside the object, the first flag information indicates that the unprocessed pixel data is present, and the second flag information indicates that the processed pixel data is not present, said output means outputs the unprocessed pixel data.

56. An image encoding apparatus comprising said image processing apparatus of claim 51.

57. An image decoding apparatus comprising said image processing apparatus of claim 51.

58. An image processing apparatus having padding processing of, for an image object which constructs part of image data having a rectangular shape and has an arbitrary shape, substituting appropriate pixel data into a region outside the image object in the rectangular image region, comprising:

input means for sequentially inputting pixel data in a one-dimensional direction, attribute information representing whether the pixel data is a pixel in or outside the image object, and start flag information representing that the pixel is a first pixel in the one-dimensional direction;

first flag information generation means for generating, from the attribute information, first flag information representing whether unprocessed pixel data which is closest to pixel data of interest and present in the image object is present; and output means for outputting pixel-data for padding processing using the attribute information, start flag information, and first flag information.

59. The apparatus according to claim 58, wherein said output means comprises generation means for generating average data between the processed pixel data and the unprocessed pixel data and selectively outputs desired data from the pixel data of interest, processed pixel data, unprocessed pixel data, and average data in accordance with the attribute information, start flag information, and first flag information.

60. The apparatus according to claim 59, wherein said output means outputs the pixel data for padding processing in accordance with attribute information of an immediately preceding pixel processed before the pixel data of interest.

61. An image processing method having padding processing of, for an image object which constructs part of image data having a rectangular shape and has an arbitrary shape, substituting appropriate pixel data into a region outside the image object in the rectangular image region, comprising the steps of:

sequentially inputting pixel data in a one-dimensional direction and attribute information representing whether the pixel data is a pixel in or outside the image object;

generating, from the attribute information, first flag information representing whether unprocessed pixel data which is closest to pixel data of interest and present in the image object is present;

generating, from the attribute information, second flag information representing whether processed pixel data which is closest to the pixel data of interest and present in the image object is present; and outputting pixel data for padding processing in accordance with the attribute information, first flag information, and second flag information.

62. An image processing method having padding processing of, for an image object which constructs part of image data having a rectangular shape and has an arbitrary shape, substituting appropriate pixel data into a region outside the image object in the rectangular image region, comprising the steps of:

sequentially inputting pixel data in a one-dimensional direction, attribute information representing whether the pixel data is a pixel in or outside the image object, and start flag information representing that the pixel is a first pixel in the one-dimensional direction;

generating, from the attribute information, first flag information representing whether unprocessed pixel data which is closest to pixel data of interest and present in the image object is present; and outputting pixel data for padding processing using the attribute information, start flag information, and first flag information.

63. An image processing apparatus for executing, for each block of image data having shape information representing whether the image data is in an object, padding processing of substituting appropriate pixel data into a region outside the object in units of rows running in a first direction and columns running in a second direction perpendicular to the first direction, comprising:

input means for inputting the image data in units of rows of the block;

first padding means for padding a pixel data group of the input row on the basis of the shape information of the pixel data and storing, for each row, intermediate shape information representing whether significant shape information is present in the row;

storage means for storing the pixel data padded in units of rows by said first padding means in number equal to the number of rows of the block; and second padding means for reading out, in units of columns, the padded row-direction pixel data stored in said storage means, and padding the pixel data in units of columns on the basis of the intermediate shape information of each row obtained by said first padding means, wherein said first padding means obtains the intermediate shape information of each row by calculating an OR of all pieces of shape information contained in each row.

64. The apparatus according to claim 63, wherein the shape information is formed from binary data, and the binary data represents a portion in or outside the object in the image data.

65. An image processing apparatus for executing, for each block of image data having shape information representing whether the image data is in an object, padding processing of substituting appropriate pixel data into a region outside the object in units of rows running in a first direction and columns running in a second direction perpendicular to the first direction, comprising:

input means for inputting the image data in units of rows of the block;

first padding means for padding a pixel data group of the input row on the basis of the shape information of the pixel data and storing, for each row, intermediate shape information representing whether significant shape information is present in the row;

storage means for storing the pixel data padded in units of rows by said first padding means in number equal to the number of rows of the block; and second padding means for reading out, in units of columns, the padded row-direction pixel data stored in said storage means, and padding the pixel data in units of columns on the basis of the intermediate shape information of each row obtained by said first padding means, wherein, when pixel data having pixels in number smaller than the number of pixels of the row of the block is input to said input means, shape information corresponding to said input means without any pixel data input is set to 0.

66. An image processing method of executing, for each block of image data having shape information representing whether the image data is in an object, padding processing of substituting appropriate pixel data into a region outside the object in units of rows running in a first direction and columns running in a second direction perpendicular to the first direction, comprising:

an input step, of inputting the image data to predetermined input means in units of rows of the block;

a first padding step, of padding a pixel data group of the input row on the basis of the shape information of the pixel data and storing, for each row, intermediate shape information representing whether significant shape information is present in the row;

a storage step, of storing, in predetermined storage means, the pixel data padded in units of rows in said first padding step in number equal to the number of rows of the block; and a second padding step, of reading out, in units of columns, the padded row-direction pixel data stored in the predetermined storage means, and padding the pixel data in units of columns on the basis of the intermediate shape information of each row obtained in said first padding step, wherein said first padding step comprises obtaining the intermediate shape information of each row by calculating an OR of all pieces of shape information contained in each row.

67. The method according to claim 66, wherein the shape information is formed from binary data, and the binary data represents a portion in or outside the object in the image data.

68. An image processing method of executing, for each block of image data having shape information representing whether the image data is in an object, padding processing of substituting appropriate pixel data into a region outside the object in units of rows running in a first direction and columns running in a second direction perpendicular to the first direction, comprising:

an input step, of inputting the image data to predetermined input means in units of rows of the block;

a first padding step, of padding a pixel data group of the input row on the basis of the shape information of the pixel data and storing, for each row, intermediate shape information representing whether significant shape information is present in the row;

a storage step, of storing, in predetermined storage means, the pixel data padded in units of rows in said first padding step in number equal to the number of rows of the block; and a second padding step, of reading out, in units of columns, the padded row-direction pixel data stored in the predetermined storage means, and padding the pixel data in units of columns on the basis of the intermediate shape information of each row obtained in said first padding step, further comprising, when pixel data having pixels in number smaller than the number of pixels of the row of the block is input to the input means, setting shape information corresponding to the predetermined input means without any pixel data input to 0.

69. An image processing method for processing image data on the basis of attribute data, comprising:

a first propagation step, of propagating, of a plurality of pixel data which construct one-dimensional image data, pixel data specified by the attribute data in a first direction;

a second propagation step, of propagating, of the plurality of pixel data which construct the one-dimensional image data, the pixel data specified by the attribute data in a second direction opposite to the first direction;

an arithmetic step, of executing arithmetic processing for an output obtained in said first propagation step and an output obtained in said second propagation step to generate a plurality of pixel data which construct image data as a processing result;

a first data processing step, including a step equivalent to said first propagation step, said second propagation step, and said arithmetic step;

a second data processing step, including a step equivalent to said first propagation step, said second propagation step, and said arithmetic step;

a data holding step, of sequentially holding one-dimensional image data obtained in said first data processing step, thereby consequently holding two-dimensional image data; and a data supply step, of sequentially supplying, to said second data processing step, the two-dimensional image data held in said data holding step as one-dimensional image data in a direction different from that of the one-dimensional image data obtained in said first data processing step.

* * * * *

UNITED STATES PATENT AND TRADEMARK OFFICE
CERTIFICATE OF CORRECTION

| | |
|---|---|
| PATENT NO. | : 6,952,501 B2 |
| APPLICATION NO. | : 09/791545 |
| DATED | : October 4, 2005 |
| INVENTOR(S) | : Tadayoshi Nakayama |

It is certified that error appears in the above-identified patent and that said Letters Patent is hereby corrected as shown below:

Drawings
SHEET 39 (under second output Pixel)

FIGURE 39

"VALVE" SHOULD READ --VALUE--.

COLUMN 2

Line 9, "has" should read --have--.

COLUMN 13

Line 46, "input" should read --inputs--.

COLUMN 14

Line 42, "stores" should read --store--.

COLUMN 19

Line 67, "below)," should read --below):--.

COLUMN 34

Line 46, "registers 2503" should read --registers 2503,--.

COLUMN 43

Line 33, "is" should be deleted.

COLUMN 45

Line 30, "ins" should read --in--.

COLUMN 46

Line 52, "maybe" should read --may be--.

UNITED STATES PATENT AND TRADEMARK OFFICE
CERTIFICATE OF CORRECTION

PATENT NO.       : 6,952,501 B2
APPLICATION NO.  : 09/791545
DATED            : October 4, 2005
INVENTOR(S)      : Tadayoshi Nakayama It is certified that error appears in the above-identified patent and that said Letters Patent is hereby corrected as shown below:

COLUMN 48

Line 38, "means," should read --means;--;
      Line 41, "means," should read --means;--; and
      Line 61, "process" should read --processes--.

COLUMN 49

Line 28, "data," should read --data;--.

COLUMN 50

Line 19, "prising" should read --prising:--;
      Line, 21, "means," should read --means;-; and
      Line 60, "data" should read --data,--.

COLUMN 52

Line 51, "data" should read --data,--.

COLUMN 53

Line 36, "data" should read --data,--; and
      Line 63, "data" should read --data,--.

UNITED STATES PATENT AND TRADEMARK OFFICE
CERTIFICATE OF CORRECTION

PATENT NO. : 6,952,501 B2
APPLICATION NO. : 09/791545
DATED : October 4, 2005
INVENTOR(S) : Tadayoshi Nakayama It is certified that error appears in the above-identified patent and that said Letters Patent is hereby corrected as shown below:

<u>COLUMN 54</u>

Line 39, "data" should read --data,--.

<u>COLUMN 55</u>

Line 65, "pixel-data" should read --pixel data--.

Signed and Sealed this

First Day of August, 2006

JON W. DUDAS
*Director of the United States Patent and Trademark Office*